(12) United States Patent
Sepulveda et al.

(10) Patent No.: US 11,243,570 B2
(45) Date of Patent: Feb. 8, 2022

(54) SYSTEMS AND METHODS FOR DISPLAYING GROUPS OF APPLICATIONS VIA INPUTS RECEIVED AT A TOUCH-SENSITIVE SECONDARY DISPLAY

(71) Applicant: Apple Inc., Cupertino, CA (US)

(72) Inventors: Raymond S. Sepulveda, Portland, OR (US); Chun Kin Minor Wong, San Jose, CA (US); Patrick L. Coffman, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/145,146

(22) Filed: Jan. 8, 2021

(65) Prior Publication Data

US 2021/0132661 A1 May 6, 2021

Related U.S. Application Data

(63) Continuation of application No. 16/857,509, filed on Apr. 24, 2020, now Pat. No. 10,915,143, which is a
(Continued)

(51) Int. Cl.
*G06F 1/16* (2006.01)
*G06F 3/0489* (2013.01)

(52) U.S. Cl.
CPC .......... *G06F 1/1643* (2013.01); *G06F 1/1647* (2013.01); *G06F 3/04897* (2013.01)

(58) Field of Classification Search
CPC .. G06F 3/0482; G06F 3/0488; G06F 3/04847; G06F 3/04842; G06F 3/04845;
(Continued)

(56) References Cited

U.S. PATENT DOCUMENTS

2004/0021681 A1 2/2004 Liao
2006/0034042 A1 2/2006 Hisano et al.
(Continued)

OTHER PUBLICATIONS

Volkov, "What if you Could REALLY Customize Your New Touch Bar", https://medium.com/productivity-freak/what-if-you-could-really-customize-your-new-touch-bar-ea42ec66142c, Jan. 15, 2017, 13 pages.
(Continued)

*Primary Examiner* — Dong Hui Liang
(74) *Attorney, Agent, or Firm* — Morgan, Lewis & Bockius LLP

(57) ABSTRACT

Disclosed herein are systems and methods that enable users to customize operation of a touch-sensitive secondary display. An example method includes displaying, at the touch-sensitive secondary display, a system-level affordance for controlling a system-level feature and an affordance for causing display of representations of user-defined workspaces. Receiving a first input at the affordance for causing display of the representations the user-defined workspaces. In response to receiving the first input, displaying, at the touch-sensitive secondary display, a selectable user interface object corresponding to a first window from a first application and a second window from a second application. Receiving a selection, and in response to receiving the second input corresponding to selection of the selectable user interface object corresponding to the first window from the first application and the second window from the second application, displaying the first window from the first application and the second window from the second application.

33 Claims, 71 Drawing Sheets

Related U.S. Application Data continuation of application No. 16/142,633, filed on Sep. 26, 2018, now Pat. No. 10,635,134.

(60) Provisional application No. 62/670,529, filed on May 11, 2018.

(58) Field of Classification Search
CPC ............ G06F 3/04886; G06F 3/04817; G06F 3/0481; G06F 3/0416; G06F 3/017; G06F 3/0412; G06F 3/0236; G06F 3/03547; G06F 1/1643; G06F 1/1447; G06F 1/1616
See application file for complete search history.

(56) References Cited

U.S. PATENT DOCUMENTS

| | | |
|---|---|---|
| 2009/0315867 A1 | 12/2009 | Sakamoto et al. |
| 2010/0298032 A1 | 11/2010 | Lee et al. |
| 2011/0047459 A1 | 2/2011 | Van Der Westhuizen |
| 2011/0055763 A1 | 3/2011 | Utsuki et al. |
| 2011/0210922 A1 | 9/2011 | Griffen |
| 2011/0314405 A1 | 12/2011 | Turner et al. |
| 2012/0274540 A1 | 11/2012 | Inami et al. |
| 2013/0321340 A1 | 12/2013 | Seo et al. |
| 2016/0103610 A1 | 4/2016 | Huh |
| 2017/0010771 A1* | 1/2017 | Bernstein ................ G06F 21/32 |
| 2017/0010847 A1 | 1/2017 | Bernstein et al. |
| 2019/0346884 A1 | 11/2019 | Sepulveda et al. |
| 2019/0346885 A1 | 11/2019 | Sepulveda et al. |
| 2020/0249720 A1 | 8/2020 | Sepulveda et al. |

OTHER PUBLICATIONS

Office Action, dated Aug. 28, 2019, received in U.S. Appl. No. 16/142,633, 13 pages.

Notice of Allowance, dated Jan. 24, 2020, received in U.S. Appl. No. 16/142,633, 8 pages.

Notice of Allowance, dated Oct. 10, 2019, received in U.S. Appl. No. 16/361,127, 9 pages.

Notice of Allowance, dated Sep. 16, 2020, received in U.S. Appl. No. 16/857,509, 15 pages.

* cited by examiner

600

| 602 | Displaying, on a primary display, a first user interface for a first application, the first user interface being in focus on the primary display |

While a touch-sensitive secondary display is operating in an adaptive display mode in which at least some application-specific user interface elements are adaptively selected for display on a respective portion of the touch-sensitive secondary display based on a current state of the first user interface for the application: — 604

Displaying, on the respective portion of the touch-sensitive secondary display, a plurality of application-specific user interface elements that are selected based on the current state of the first user interface for the application;

Receiving a request to operate the touch-sensitive secondary display in a respective persistent display mode for the touch-sensitive secondary display, the respective persistent display mode being distinct from the adaptive display mode (A)

In response to receiving the request, operating the touch-sensitive secondary display in the respective persistent display mode, including updating the respective portion of the touch-sensitive secondary display to display a fixed set of user interface elements — 606

(B)

After changing focus to a second user interface for a second application: — 608

Displaying, on the primary display, the second user interface for the second application; and Maintaining display, on the respective portion of the touch-sensitive secondary display, of the fixed set of user interface elements associated with the respective persistent display mode (C)

---
624 — In response to receiving the request and before operating the touch-sensitive secondary display in the respective persistent display mode:

Displaying UI elements respectively associated with each available display mode for the touch-sensitive secondary display, including a first UI element associated with the adaptive display mode and a second UI element associated with the predefined persistent display mode; and Moving a focus selector from the first user interface element to the second user interface element.

---

626 — The fixed set of UI elements consists of representations of one or more shortcuts chosen by a user that, when selected at the touch-sensitive secondary display, cause activation of a corresponding function associated with the respective shortcut 628 — The fixed set of UI elements consists of representations of function keys chosen by a user that, when selected at the touch-sensitive secondary display, cause activation of a corresponding function associated with the respective function key 630 — The fixed set of UI elements consists of representations of text-entry options chosen by a user that, when selected at the touch-sensitive secondary display, cause a corresponding change to text that is displayed on the primary display 632 — The fixed set of UI elements consists of representations of one or more automated tasks chosen by a user that, when selected at the touch-sensitive secondary display, cause activation of a corresponding series of functions associated with the respective automated task 634 — The fixed set of UI elements consists of are representations of one or more system-level control options chosen by a user that, when selected at the touch-sensitive secondary display, cause activation of a corresponding system-level function

```
┌─────────────────────────────────────────────────────────────────────┐
│ Continuing to operate the touch-sensitive secondary display in the respective  │─636
│ persistent display mode until an additional request is received to operate the │
│ touch-sensitive secondary display in a display mode other than the respecitve  │
│                        persistent display mode                       │
└─────────────────────────────────────────────────────────────────────┘
```

```
┌─────────────────────────────────────────────────────────────────────┐
│ While the touch-sensitive secondary display is operating in the respective     │─638
│ persistent display mode:                                             │
│                                                                       │
│     in accordance with determining that focus has changed to a third user     │
│     interface for a different application, the different application being    │
│     associated with a user-selected display mode for the touch-sensitive      │
│     secondary display:                                               │
│                                                                       │
│         ceasing to operate the touch-sensitive secondary display in the       │
│         respective persistent display mode and instead operating the          │
│         touch-sensitive secondary display in the user-selected display        │
│         mode                                                         │
└─────────────────────────────────────────────────────────────────────┘
```

| the touch-sensitive secondary display has a default display mode, and each application of the plurality of applications for which a representation is displayed within the management user interface is associated with a respective user-selected display mode that is distinct from the default display mode. | 764 |

(A)

↓

| displaying the management user interface comprises displaying each of the concurrently displayed representations for the plurality of applications concurrently with displaying information regarding respective user-selected display modes associated with each of the plurality of applications | 766 |

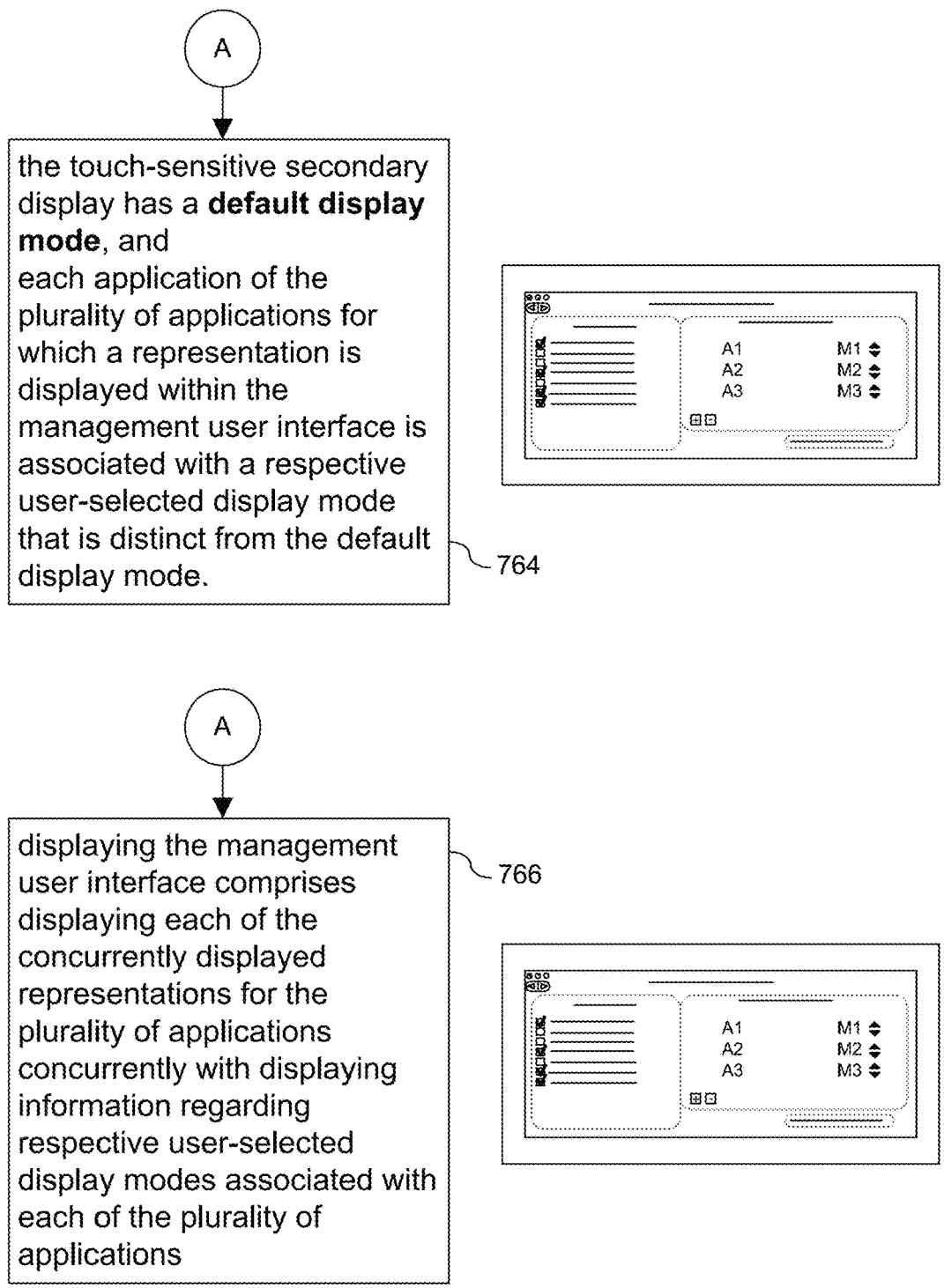

Figure 7E

SYSTEMS AND METHODS FOR DISPLAYING GROUPS OF APPLICATIONS VIA INPUTS RECEIVED AT A TOUCH-SENSITIVE SECONDARY DISPLAY

TECHNICAL FIELD

This application is a continuation of U.S. patent application Ser. No. 16/857,509, filed Apr. 24, 2020, which is a continuation of U.S. patent application Ser. No. 16/142,633, filed Sep. 26, 2018, now U.S. Pat. No. 10,635,134, which claims priority to U.S. Provisional Application Ser. No. 62/670,529, filed May 11, 2018, each of which is hereby incorporated by reference in its entirety.

TECHNICAL FIELD

The disclosed embodiments relate to touch-sensitive secondary display devices and, more specifically, customizing display modes for a touch-sensitive secondary display.

BACKGROUND

Integrating touch-sensitive secondary displays into computing systems has resulted in new ways for users to interact with these systems, and in particular, for the provision of affordances in the secondary displays that are selected dynamically based on context of an application displayed at a primary display of the computing system. In certain instances, however, some users are unable to easily locate desired affordances within the secondary display while using certain applications. As such, there is a need for customization features that allow users to easily switch between different display modes for the secondary display and that also allows users to associate display modes for the secondary display with different applications.

SUMMARY

The embodiments described herein address the above shortcomings by providing devices and methods that allow users to easily switch between different display modes for the touch-sensitive secondary display, and by providing a management user interface that allows users to associate display modes for the touch-sensitive secondary display with various applications. Such devices and methods also reduce the amount of mode switching (e.g., moving one's hands between keyboard and mouse, and also moving one's eyes from keyboard to display) required of a user and thereby reduce the number of inputs required to located desired affordances (e.g., number of inputs required to select menu options is reduced, as explained in more detail below). Such devices and methods also make more relevant information available on a limited screen (e.g., a touch-sensitive secondary display is used to provide affordances that a user and actually needs and these affordances are efficiently presented using limited screen space). Such devices and methods also provide improved man-machine interfaces, e.g., by providing emphasizing effects to make information more discernable on a touch-sensitive secondary display, by providing sustained interactions so that successive inputs from a user directed to either a touch-sensitive secondary display or a primary display cause the device to provide outputs which are then used to facilitate further inputs from the user (e.g., affordances are displayed at the touch-sensitive secondary display that allow users to quickly preview how information will be rendered on a primary display, by providing inputs at the touch-sensitive secondary display, as discussed below), and by requiring fewer interactions from users to achieve desired results. In some instances, the touch-sensitive secondary display is also referred to herein as a dynamic function row (and vice versa). For these reasons and those discussed below, the devices and methods described herein reduce power usage and improve battery life of electronic devices.

In accordance with some embodiments, a method is performed at a computing system with one or more processors, a first housing that includes a primary display, memory, and a second housing (that is distinct from the first housing) at least partially containing a touch-sensitive secondary display that is distinct from the primary display (as discussed below, the second housing and the touch-sensitive secondary display may be components of any device that includes a smaller display than that of the primary display, e.g., the touch-sensitive secondary display is part of a wearable computing device, such as a watch, or the touch-sensitive secondary display is located above a physical keyboard in the second housing). The method includes: displaying, on the primary display, a first user interface for a first application, the first user interface being in focus on the primary display. While the touch-sensitive secondary display is operating in an adaptive display mode in which at least some application-specific user interface elements are adaptively selected for display on a respective portion of the touch-sensitive secondary display based on a current state of the first user interface for the application, the method includes: displaying, on a respective portion of the touch-sensitive secondary display, a plurality of application-specific user interface elements that are selected based on the current state of the first user interface for the application; and receiving a request to operate the touch-sensitive secondary display in a respective persistent display mode for the touch-sensitive secondary display, the respective persistent display mode being distinct from the adaptive display mode. In response to receiving the request, the method includes: operating the touch-sensitive secondary display in the respective persistent display mode, including updating the respective portion of the touch-sensitive secondary display to display a fixed set of user interface elements associated with the respective persistent display mode. After changing focus to a second user interface for a second application, the method includes: displaying, on the primary display, the second user interface for the second application; and maintaining display, on the respective portion of the touch-sensitive secondary display, of the fixed set of user interface elements associated with the respective persistent display mode.

In some instances, users of computing systems are unable to change the display mode of a touch-sensitive secondary display from an adaptive display mode to a persistent display mode. In the adaptive display mode, at least some application-specific user interface elements are selected by the computing system and displayed on the touch-sensitive secondary display based on a state of an application that is currently in focus, while in the persistent display mode a fixed set of user interface elements is continuously/persistently displayed on the touch-sensitive secondary display and the fixed set continues to be displayed even as the state of the application may change. Receiving a request from the user to operate in the predefined persistent display mode provides the user with a convenient way to quickly switch to the persistent display mode. Providing this option to quickly switch between display modes enhances operability of the device and makes the human-machine interface more efficient (e.g., by allowing the users to easily customize their use of the touch-sensitive secondary display without having to waste time manually searching for desired user interface elements that may be difficult to locate or may be unavailable based on certain states of the application).

In accordance with some embodiments, a method is performed at a computing system with one or more processors, a first housing that includes a primary display, memory, and a second housing (that is distinct from the first housing) at least partially containing a touch-sensitive secondary display that is distinct from the primary display (as discussed below, the second housing and the touch-sensitive secondary display may be components of any device that includes a smaller display than that of the primary display, e.g., the touch-sensitive secondary display is part of a wearable computing device, such as a watch, or the touch-sensitive secondary display is located above a physical keyboard in the second housing). The method includes: displaying, on the primary display, a management user interface for the touch-sensitive secondary display, the management user interface including concurrently displayed representations of a plurality of applications, including a representation of a first application that, before being displayed within the management user interface, was associated with one or more display modes of a first plurality of available display modes for the touch-sensitive secondary display, and a representation of a second application that, before being displayed within the management user interface, was associated with one or more display modes of a second plurality of the available display modes for the touch-sensitive secondary display. The method also includes: detecting, via the one or more input devices, one or more inputs that correspond to a request to modify which of the available display modes is associated with the first application. In response to detecting the one or more inputs, the method includes: associating the first application with a first display mode of the available display modes; and updating the management user interface to indicate that the first application is associated with the first display mode of the available display modes for the touch-sensitive secondary display. A change in focus at the primary display to a user interface associated with the first application causes the touch-sensitive secondary display to begin operating in the first display mode.

In some instances, users of computing systems are unable to associate available display modes of a touch-sensitive secondary display with applications displayed on a primary display. Providing a management user interface on the primary display that allows a user to predefine an association between such display modes and applications enhances operability of the device and makes the human-machine interface more efficient (e.g., by allowing the users to predefine an association between a display mode and an application without wasting computing resources during the operation of the application, and thereby allowing users to easily customize their use of the touch-sensitive secondary display without having to waste time manually searching for desired display mode features that may be difficult to locate).

In accordance with some embodiments, a computing system includes a first housing with a primary display unit configured to display user interfaces, a second housing (that is distinct from the first housing) at least partially containing a touch-sensitive secondary display that is distinct from the primary display and that is configured to receive user inputs and to display user interfaces, and a processing unit that is in communication with the primary display unit and the touch-sensitive secondary display unit. The processing unit is configured to: cause display, on the primary display, of a first user interface for a first application, the first user interface being in focus on the primary display; while the touch-sensitive secondary display is operating in an adaptive display mode in which at least some application-specific user interface elements are adaptively selected for display on a respective portion of the touch-sensitive secondary display based on a current state of the first user interface for the application: cause display, on a respective portion of the touch-sensitive secondary display, of a plurality of application-specific user interface elements that are selected based on the current state of the first user interface for the application; and receive a request to operate the touch-sensitive secondary display in a respective persistent display mode for the touch-sensitive secondary display, the respective persistent display mode being distinct from the adaptive display mode; in response to receiving the request: operate the touch-sensitive secondary display in the respective persistent display mode, including updating the respective portion of the touch-sensitive secondary display to display a fixed set of user interface elements associated with the respective persistent display mode and after changing focus to a second user interface for a second application: cause display, on the primary display, of the second user interface for the second application; and maintaining display, on the respective portion of the touch-sensitive secondary display, of the fixed set of user interface elements associated with the respective persistent display mode.

In accordance with some embodiments, a computing system includes a first housing with a primary display unit configured to display user interfaces, a second housing (that is distinct from the first housing) at least partially containing a touch-sensitive secondary display that is distinct from the primary display and that is configured to receive user inputs and to display user interfaces, and a processing unit that is in communication with the primary display unit and the touch-sensitive secondary display unit. The processing unit is configured to: cause display, on the primary display, of a management user interface for the touch-sensitive secondary display, the management user interface including concurrently displayed representations of a plurality of applications, including a representation of a first application that, before being displayed within the management user interface, was associated with one or more display modes of a first plurality of available display modes for the touch-sensitive secondary display, and a representation of a second application that, before being displayed within the management user interface, was associated with one or more display modes of a second plurality of the available display modes for the touch-sensitive secondary display. The processing unit is also configured to: detect, via the one or more input devices, one or more inputs that correspond to a request to modify which of the available display modes is associated with the first application. In response to detecting the one or more inputs, the processing unit is configured to: associate the first application with a first display mode of the available display modes; and update the management user interface to indicate that the first application is associated with the first display mode of the available display modes for the touch-sensitive secondary display. A change in focus at the primary display to a user interface associated with the first application causes the processing unit to begin operating the touch-sensitive secondary display in the first display mode.

In accordance with some embodiments, a computing system includes one or more processors, a first housing with a primary display, a second housing at least partially containing a touch-sensitive secondary display that is distinct from the primary display and optionally containing one or more sensors to detect intensity of contacts with the touch-sensitive secondary surface, and memory storing one or more programs, the one or more programs configured for execution by the one or more processors and the one or more programs include instructions for performing or causing performance of the operations of any of the methods described herein. In accordance with some embodiments, a computer-readable storage medium has stored therein instructions that, when executed by the computing system, cause the computing system to perform or cause performance of the operations of any of the methods described herein. In accordance with some embodiments, a graphical user interface on the primary display of the computing system is provided, and the graphical user interface includes one or more of the elements displayed in any of the methods described herein, which are updated in response to inputs, as described in any of the methods described herein. In accordance with some embodiments, the computing system includes means for performing or causing performance of the operations of any of the methods described herein. In accordance with some embodiments, an information processing apparatus, for use in the computing system, includes means for performing or causing performance of the operations of any of the methods described herein.

Thus, computing systems that include both primary and touch-sensitive secondary displays are provided with faster, more efficient and usable/user-friendly methods and interfaces for allowing users to customize which affordances are displayed at touch-sensitive secondary displays and to customize associations between various display modes for the touch-sensitive secondary display and different applications, thereby improving operability of the computing system by, e.g., allowing users to have sustained interactions with the touch-sensitive secondary display, without wasting time searching for affordances that may be difficult to locate.

BRIEF DESCRIPTION OF DRAWINGS

For a better understanding of the various described embodiments, reference should be made to the Description of Embodiments below, in conjunction with the following drawings in which like reference numerals refer to corresponding parts throughout the figures.

FIGS. 6A-6D show a flowchart of a method of using customized display modes for touch-sensitive secondary displays, in accordance with some embodiments.

FIGS. 7A-7F show a flowchart of interacting with a management user interface for touch-sensitive secondary displays, in accordance with some embodiments.

DESCRIPTION OF EMBODIMENTS

Figure 1A:
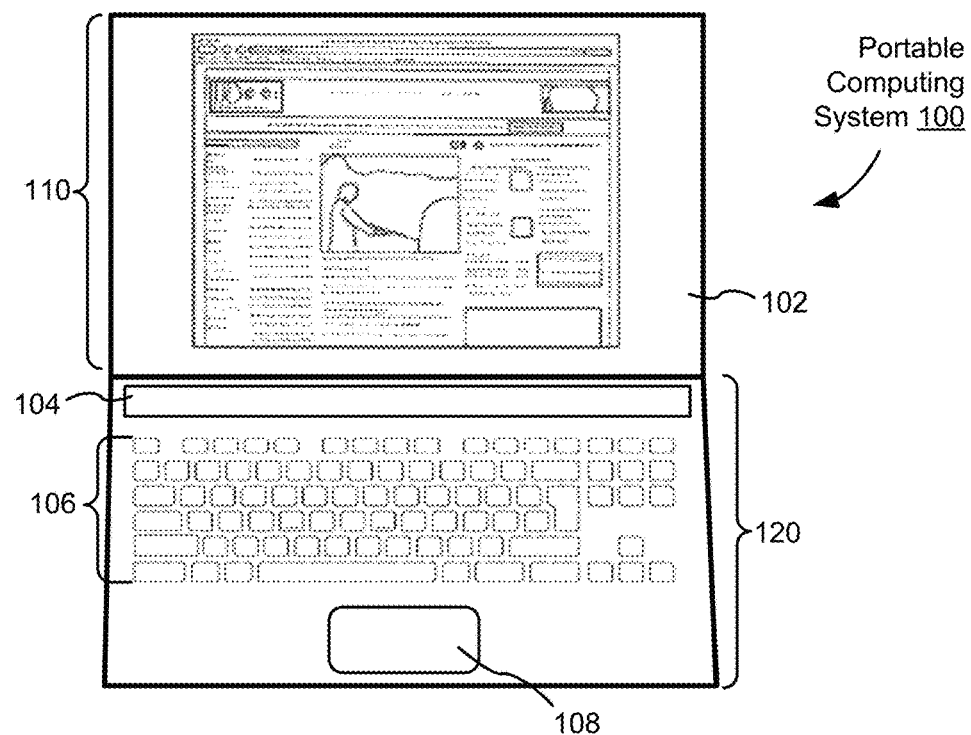
FIG. 1A is an illustrative diagram of a portable computing system (e.g., a laptop computer), in accordance with some embodiments.

FIGS. 1A-1B, 2A-2D, 3A-3E, and 4 provide a description of example devices. FIGS. 5A-5AT are schematics of a display used to illustrate example user interfaces for customizing display modes for touch-sensitive secondary displays. FIGS. 6A-6D and 7A-7F are flowcharts of methods of using customized display modes for touch-sensitive secondary displays and for interacting with a management user interface for touch-sensitive secondary displays, respectively. The user interfaces in FIGS. 5A-5AT are used to illustrate the methods and/or processes in FIGS. 6A-6D and 7A-7F.

Example Devices and Systems

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1B:
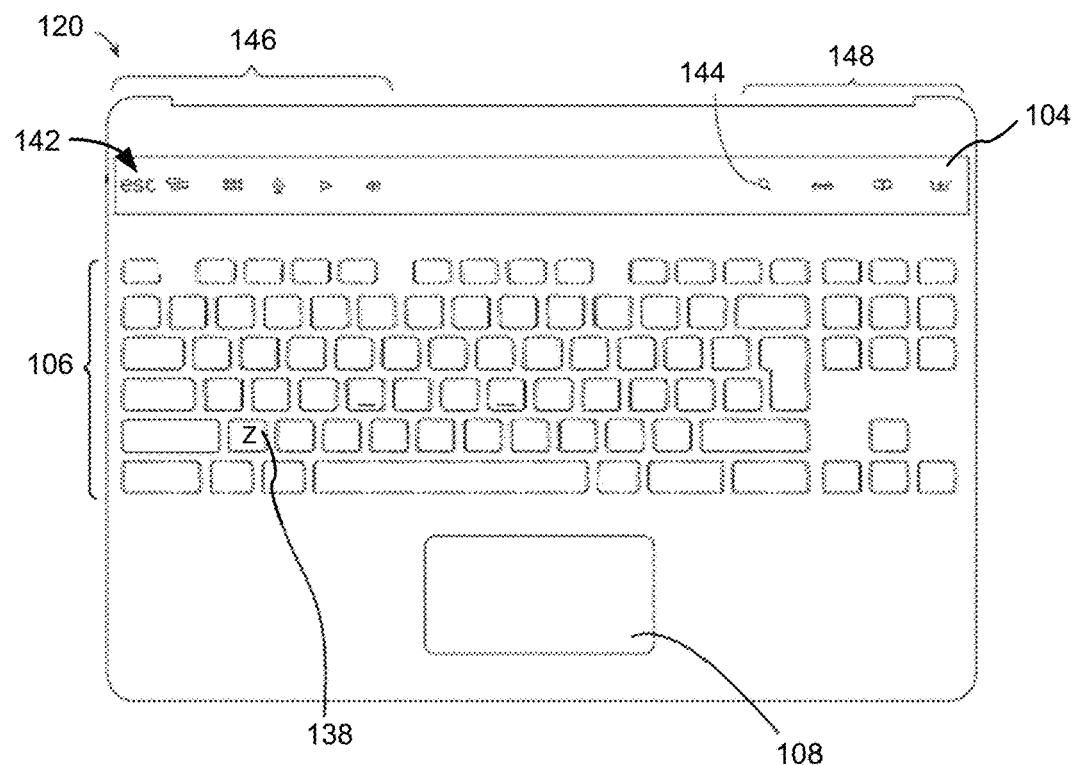
FIG. 1B is an illustrative diagram of a body portion of the portable computing system in FIG. 1A, in accordance with some embodiments.

FIG. 1A is an illustrative diagram of a portable computing system 100, in accordance with some embodiments. Portable computing system 100 may be, for example, a laptop computer, such as a MACBOOK® device, or any other portable computing device. Portable computing system 100 includes: (A) a display portion 110 (also referred to herein as a first housing 110 or housing 110) with a primary display 102; and (B) a body portion 120 (also referred to as a second housing 120 or housing 120) with a dynamic function row 104, a set of physical (i.e., movably actuated) keys 106, and a touchpad 108 partially contained within a same housing. In some embodiments, a biometric sensor 105 (e.g., a fingerprint sensor 105) is also at least partially contained within the body portion 120, and can be positioned directly adjacent to the dynamic function row 104 (as is depicted in FIGS. 5A-5AT. Display portion 110 is typically mechanically, electrically, and communicatively coupled with body portion 120 of portable computing system 100. For example, portable computing system 100 may include a hinge, allowing display portion 110 to be rotated relative to body portion 120. Portable computing system 100 includes one or more processors and memory storing one or more programs for execution by the one or more processors to perform any of the embodiments described herein. In some embodiments, dynamic function row 104, which is described in more detail with reference to FIG. 1B, is a touch screen display using resistive sensing, acoustic sensing, capacitive sensing, optical sensing, infrared sensing, or the like to detect user touch inputs and selections. In some embodiments, primary display 102 of display portion 110 is also a touch screen display.

FIG. 1B is an illustrative diagram of body portion 120 of portable computing system 100 in accordance with some embodiments. Body portion 120 includes a set of physical keys 106 (also referred to herein as "physical keys 106" and "keyboard 106"), a dynamic function row 104, and a touchpad 108 partially contained within a same housing. In some embodiments, dynamic function row 104, which is a touch screen, replaces a function row of the set of physical keys 106 allowing the space consumed by the set of physical keys 106 to be reduced, allowing for a smaller overall body portion 120 or allowing other portions, such as touchpad 108, to be larger. In some embodiments, dynamic function row 104 is approximately 18 inches in length relative to a major dimension of the set of physical keys 106. Although called a "row" for ease of explanation, in some other embodiments, the touch screen comprising dynamic function row 104 in FIG. 1A may take any other form such as a square, circle, a plurality of rows, column, a plurality of columns, a plurality of separate sectors, or the like. Although FIGS. 1A-1B show dynamic function row 104 replacing the function row of the set of physical keys 106, in some other embodiments, dynamic function row 104 may additionally and/or alternatively replace a numpad section, editing/function section, or the like of the set of physical keys 106.

Each physical key of the set of physical keys 106 has at least one associated input. The input may be a printable character, non-printable character, function, or other input. The input associated with a physical key may be shown by a letter, word, symbol, or other indicia shown (e.g., printed) on the surface of the key in Latin script, Arabic characters, Chinese characters, or any other script. For example, the particular physical key indicated at 138 is associated with alphabetic character "z" as indicated by the letter z shown on the key. In another example, a physical key labeled with the word "command" may be associated with a command function. For example, the set of physical keys 106 is associated with a QWERTY, Dvorak, or other keyboard layouts with alphanumeric, numeric, and/or editing/function sections (e.g., standard, extended, or compact) according to ISO/IEC 9995, ANSI-INCITS 154-1988, JIS X 6002-1980, or other similar standards.

A signal corresponding to an input associated with a physical key may be received by the processor of portable computing system 100 (or computing device 202 in FIGS. 2A-2D or peripheral keyboard 206 in FIGS. 2A-2B) when a key has been activated by a user. In an illustrative example, each key of the set of physical keys 106 includes two plates and a spring. A user may activate a key by pressing down on the key, which compresses the spring. When the spring is compressed, the two plates may come into contact, allowing electric current to flow through the connected plates. An input corresponding to the key may be provided to a processor in response to the flow of the current through the connected plates. For example, in response to activation of one of the set of keys 106 of peripheral keyboard 206 in FIG. 2C, an input corresponding to the activated key is provided to computing device 202. It will be recognized that other systems for movably actuated keys could be used.

In some embodiments, dynamic function row 104 is a touch screen display (the dynamic function row is also referred to herein as a touch-sensitive secondary display 104) that displays one or more user-selectable symbols 142 (sometimes also herein called "user interface elements," "user interface components," "affordances," "buttons," or "soft keys"). For example, dynamic function row 104 replaces the function row keys on a typical keyboard. A user may select a particular one of the one or more user-selectable symbols 142 by touching a location on the touch screen display that corresponds to the particular one of the one or more user-selectable symbols 142. For example, a user may select the user-selectable symbol indicated by magnifying glass symbol 144 by tapping dynamic function row 104 such that the user's finger contacts dynamic function row 104 at the position of the magnifying glass indicator 214. In some embodiments, a tap contact or a tap gesture includes touch-down of a contact and lift-off of the contact within a predetermined amount of time (e.g., 250 ms or the like). In some embodiments, the touch screen display of dynamic function row 104 is implemented using resistive sensing, acoustic sensing, capacitive sensing, optical sensing, infrared sensing, or the like to detect user inputs and selections.

When a user selects a particular one of the one or more user-selectable symbols 142, a signal corresponding to the particular one of the one or more user-selectable symbols 142 is generated by dynamic function row 104. For example, when a user taps "esc" on dynamic function row 104, dynamic function row 104 transmits a signal indicating a user input corresponding to an escape function to the processor of portable computing system 100 (or computing device 202 in FIGS. 2A-2D).

In some embodiments, when a particular one of the one or more user-selectable symbols 142 is selected, dynamic function row 104 transmits a signal corresponding to a position on the touch screen display where the particular one of the one or more user-selectable symbols 142 is displayed, to the processor of portable computing system 100 (or computing device 202 in FIGS. 2A-2D). For example, dynamic function row 104 may transmit a signal including a position value (0 to 20) depending on the position on the touch screen display of the particular one of the one or more user-selectable symbols 142 that was selected. In the illustrative example of FIG. 1B, the "esc" symbol may have a position value of 0, magnifying glass symbol 144 may have a position value of 16, and so on. A processor of portable computing system 100 (or computing device 202 in FIGS. 2A-2D) may receive the signal indicating the position value of the selected user-selectable symbol and interpret the position value using contextual information, such as an element of a graphical user interface displayed on primary display 102 of display portion 110 (or peripheral display device 204, FIGS. 2A-2D) that is currently active or that has focus.

Each of the one or more user-selectable symbols 142 may include an indicator, such as a symbol (e.g., a magnifying glass symbol as shown at 144), an abbreviated word (e.g., "esc"), an unabbreviated word, a character, an image, an animated image, a video, or the like. In some embodiments, a respective one of the one or more user-selectable symbols 142 is capable of receiving user input(s).

An input may be associated with each of the one or more user-selectable symbols 142. The input may be a function, character, numerical value, and the like. A respective one of the one or more user-selectable symbols 142 may include an indicator that corresponds to the input for the respective one of the one or more user-selectable symbols 142. For example, in FIG. 1B, the user-selectable symbol with the abbreviated word "esc" indicates to the user that an escape function is associated with the user-selectable symbol. A function associated with the one or more user-selectable symbols 142 may be activated when the user selects a user-selectable symbol. For example, an escape function may be activated when a user selects the user-selectable symbol with the indicator "esc." Activation of the function may have different effects depending on the current state of portable computing system 100 (or computing device 202 in FIGS. 2A-2D). For example, when a dialog box is open on primary display 102 of display portion 110 (or peripheral display device 204, FIGS. 2A-2D), activating an escape function on dynamic function row 104 may close the dialog box. In another example, when a game application is being executed by a processor of portable computing system 100 (or computing device 202 in FIGS. 2A-2D), activating an escape function on dynamic function row 104 may pause the game.

In some embodiments, functions may be associated with combinations of movably actuated keys and/or user-selectable symbols. For example, simultaneous actuation of a command key and "c" key (i.e., command+c) may be associated with a "copy" function. In another example, simultaneous actuation of the command key and selection of the user-selectable symbol with the indicator "esc" (i.e., command+esc) may activate a function to open a particular application such as a media player application. In yet another example, simultaneous selection of two user-selectable symbols (e.g., the user-selectable symbol with the indicator "esc" and the user-selectable symbol 144 with the magnifying glass indicator) may result in activation of a function, such as a specialized search function.

In some embodiments, a first subset 146 of the one or more user-selectable symbols 142 of dynamic function row 104 may be associated with one group of functions and a second subset 148 of the one or more user-selectable symbols 142 of dynamic function row 104 may be associated with a second group of functions. For example, the user-selectable symbols in first subset 146 may be global functions (e.g., system-level functions or affordances), and the user-selectable symbols in second subset 148 may be application-specific functions. As such, the user-selectable symbols in second subset 148 change when the focus shifts from a first element of a graphical user interface displayed on primary display 102 (e.g., a first window corresponding to an Internet browser application) to a second element of the graphical user interface (e.g., a second window corresponding to an e-mail application). In contrast, the user-selectable symbols in first subset 146 are maintained when the focus shifts from the first element of the graphical user interface to the second element of the graphical user interface.

In some embodiments, the user-selectable symbols in second subset 148 are determined based on an active user interface element display on primary display 102 that is in focus. In some embodiments, the term "in focus" can refer to the active element of the user interface (e.g., a window associated with an application, a particular toolbar or menu associated with an application, or the operating system) that is currently in the foreground and actively running or is controllable by input received from a user of the computing system such as a key press, mouse click, voice command, gestural motion, or the like.

In some embodiments, the first subset 146 of the one or more user-selectable symbols 142 corresponding to global user-selectable symbols occupies a first area of dynamic function row 104 (e.g., the left half of dynamic function row 104), and the second subset 148 of the one or more user-selectable symbols 142 occupies a second area of dynamic function row 104 (e.g., the right half of dynamic function row 104). It will be realized that other proportions of dynamic function row 104 may be allocated to the first subset 146 and the second subset 148. In some embodiments, when no application has focus, the second area of dynamic function row 104 may not include any user-selectable symbols. In some embodiments, dynamic function row 104 includes three or more subsets of user-selectable symbols. In some embodiments, dynamic function row 104 includes a single set of user-selectable symbols that are not divided into subsets. While a single row of user-selectable symbols are shown in dynamic function row 104 in FIG. 1B, it will be recognized that dynamic function row 104 may include multiple rows of user-selectable symbols.

In some embodiments, the change in focus changes which element of the graphical user interface displayed on primary display 102 of display portion 110 (or peripheral display device 204, FIGS. 2A-2D) is active and which element will receive user input. The user input may be received from a keyboard, mouse, touchpad, or other user input device. Additionally and/or alternatively, in some embodiments, the change in focus changes an element that is shown in the foreground of a graphical user interface displayed on primary display 102 of display portion 110 (or peripheral display device 204, FIGS. 2A-2D).

In some embodiments, the change in focus occurs in response to user input, for example, in response to user selection of an element of a graphical user interface (e.g., a different window) displayed on primary display 102 of display portion 110 (or peripheral display device 204, FIGS. 2A-2D) or in response to user selection of a user-selectable symbol (e.g., one of the affordances/symbols displayed on dynamic function row 104). The user selection may be a key stroke, a mouse click, a mouse over, a command+tab input, or the like. In some embodiments, the change in focus occurs in response to a determination by an operating system of portable system 100 (or computing device 202 in FIGS. 2A-2D). For example, when a user closes an application window that has focus, the operating system may give focus to a different application, such as an application that had focus prior to the closed application window. In another example, when a user closes an application window that has focus, the operating system may give focus to a dialog box prompting the user to save changes made to a document via the application.

In some embodiments, the change in focus may be a change from one element associated with an application to another element associated with the same application (e.g., from an e-mail composition window of an e-mail application to an inbox list window of an e-mail application or from one tab of an Internet browser application to another tab of an Internet browser application). In some embodiments, the change in focus may be a change from an element associated with one application to an element associated with another application (e.g., from an Internet browser window to an e-mail application window). Further, in some embodiments, the change in focus may be a change from an element associated with an application to an element associated with an operating system, such as a system dialog box, a system setting control (e.g., volume control), a window associated with a file/folder navigation application (e.g., Apple Inc.'s FINDER application), etc. Additionally, focus may also be directed to a dialog box, file directory, setting control (e.g., volume control), or any other element of a graphical user interface for which information can be presented to a user and/or user input can be received.

Figure 2A:
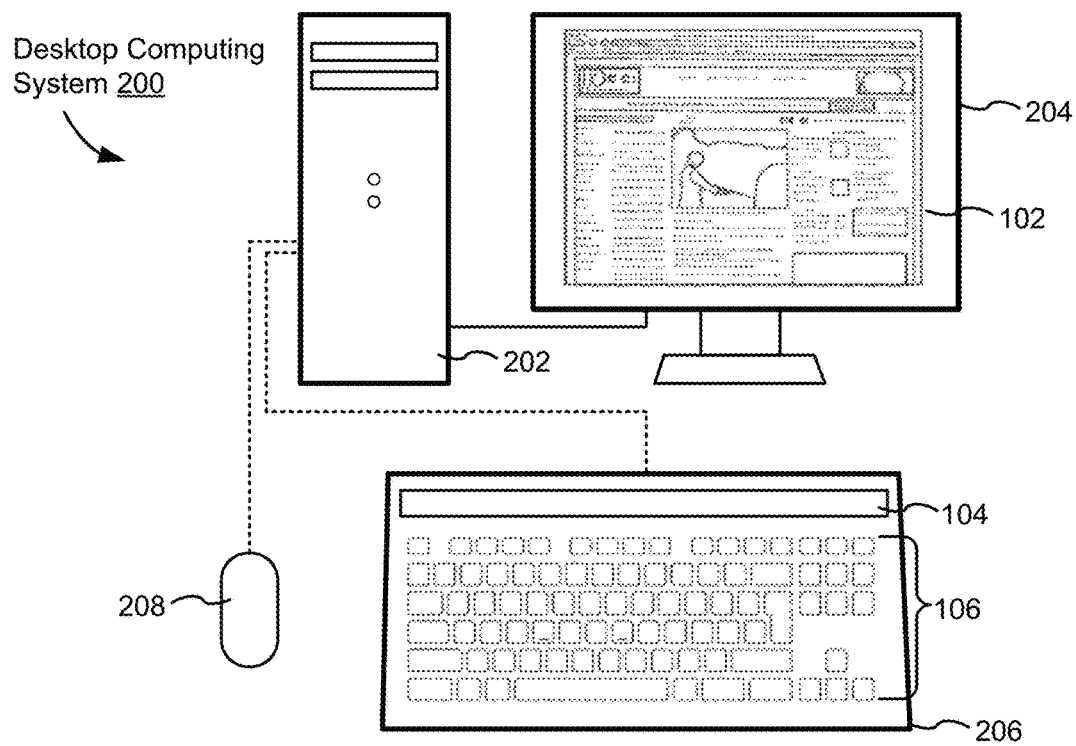
FIG. 2A is an illustrative diagram of a first implementation of a desktop computing system, in accordance with some embodiments.

FIG. 2A is an illustrative diagram of a first implementation of desktop computing system 200 in accordance with some embodiments. Desktop computing system 200 includes a computing device 202, a peripheral display device 204 with primary display 102, a peripheral keyboard 206, and a peripheral mouse 208. Computing device 202 includes one or more processors and memory storing one or more programs for execution by the one or more processors. In some embodiments, peripheral display device 204 may be integrated with computing device 202 such as an iMAC® device. In some embodiments, primary display 102 of peripheral display device 204 is a touch screen display. In FIG. 2A, peripheral display device 204 (also referred to herein as a first housing 204 or housing 204), peripheral keyboard 206, and peripheral mouse 208 are communicatively coupled to computing device 202 via a wired connection, such as USB or PS/2, or via a wireless communication link, using a communication protocol such as Bluetooth, Wi-Fi, or the like. For example, peripheral keyboard 206 (also referred to herein as second housing 206 or housing 206) is not more than fifteen feet from computing device 202 (e.g. approximately three feet away). In FIG. 2A, peripheral keyboard 206 includes dynamic function row 104 and a set of physical keys 106 at least partially contained within a same housing. In some embodiments, dynamic function row 104, which is described in more detail with reference to FIG. 1B, is a touch screen display. In some embodiments, peripheral keyboard 206 includes one or more processors and memory storing one or more programs that may be executed by the one or more processors of peripheral keyboard 206 to perform any of the embodiments described herein. In some embodiments, peripheral keyboard 206 relays signals indicating user inputs (e.g., key strokes and selections of user-selectable symbols/affordances displayed by dynamic function row 104) to computing device 202.

Figure 2B:
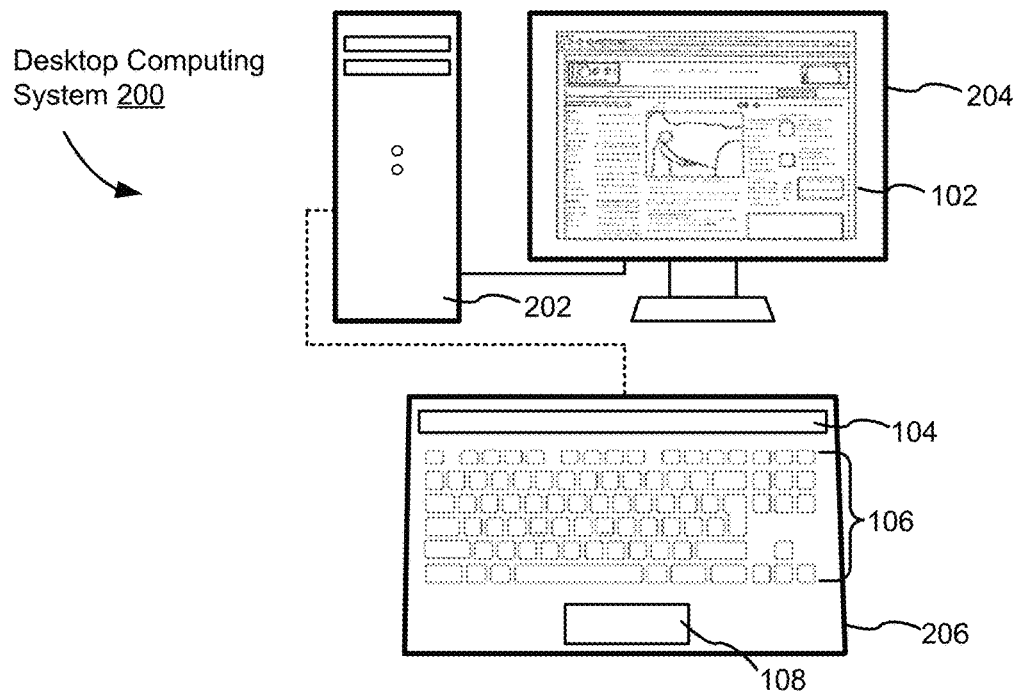
FIG. 2B is an illustrative diagram of a second implementation of a desktop computing system, in accordance with some embodiments.

FIG. 2B is an illustrative diagram of a second implementation of desktop computing system 200 in accordance with some embodiments. In FIG. 2B, desktop computing system 200 includes a computing device 202, a peripheral display device 204 with primary display 102, and a peripheral keyboard 206. In FIG. 2B, peripheral display device 204 and peripheral keyboard 206 are communicatively coupled to computing device 202 via a wired connection, such as USB or PS/2, or via a wireless communication link, using a communication protocol such as Bluetooth, Wi-Fi, or the like. In FIG. 2B, peripheral keyboard 206 includes dynamic function row 104, a set of physical keys 106, and touchpad 108 at least partially contained within a same housing. In some embodiments, dynamic function row 104, which is described in more detail with reference to FIG. 1B, is a touch screen display. In some embodiments, peripheral keyboard 206 includes one or more processors and memory storing one or more programs that may be executed by the one or more processors of peripheral keyboard 206 to perform any of the embodiments described herein. In some embodiments, peripheral keyboard 206 relays signals indicating user inputs (e.g., key strokes, user interactions with touchpad 108, and selections of user-selectable symbols/affordances displayed by dynamic function row 104) to computing device 202.

Figure 2C:
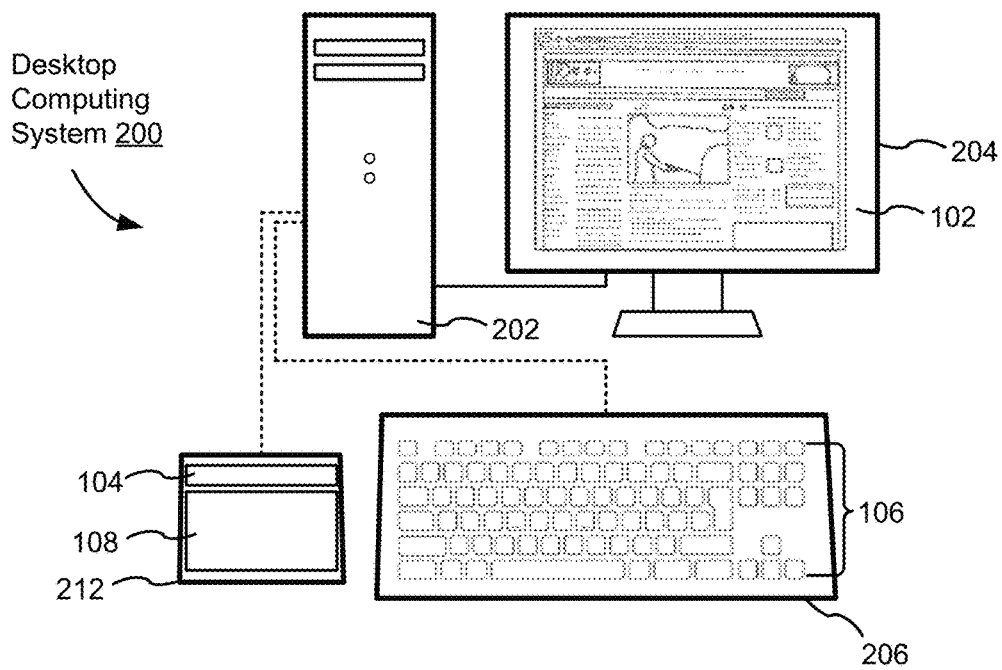
FIG. 2C is an illustrative diagram of a third implementation of a desktop computing system, in accordance with some embodiments.

FIG. 2C is an illustrative diagram of a third implementation of desktop computing system 200 in accordance with some embodiments. In FIG. 2C, desktop computing system 200 includes a computing device 202, a peripheral display device 204 with primary display 102, a peripheral keyboard 206, and a first peripheral input mechanism 212. In FIG. 2C, peripheral display device 204, peripheral keyboard 206, and the first peripheral input mechanism 212 are communicatively coupled to computing device 202 via a wired connection, such as USB or PS/2, or via a wireless communication link, using a communication protocol such as Bluetooth, Wi-Fi, or the like. In FIG. 2C, peripheral keyboard 206 includes a set of physical keys 106, and the first peripheral input mechanism 212 includes dynamic function row 104 and touchpad 108 at least partially contained within a same housing. In some embodiments, dynamic function row 104, which is described in more detail with reference to FIG. 1B, is a touch screen display. In some embodiments, the first peripheral input mechanism 212 includes one or more processors and memory storing one or more programs that may be executed by the one or more processors of the first peripheral input mechanism 212 to perform any of the embodiments described herein. In some embodiments, the first peripheral input mechanism 212 relays signals indicating user inputs (e.g., user interactions with touchpad 108 and user selections of user-selectable symbols/affordances displayed by dynamic function row 104) to computing device 202.

Figure 2D:
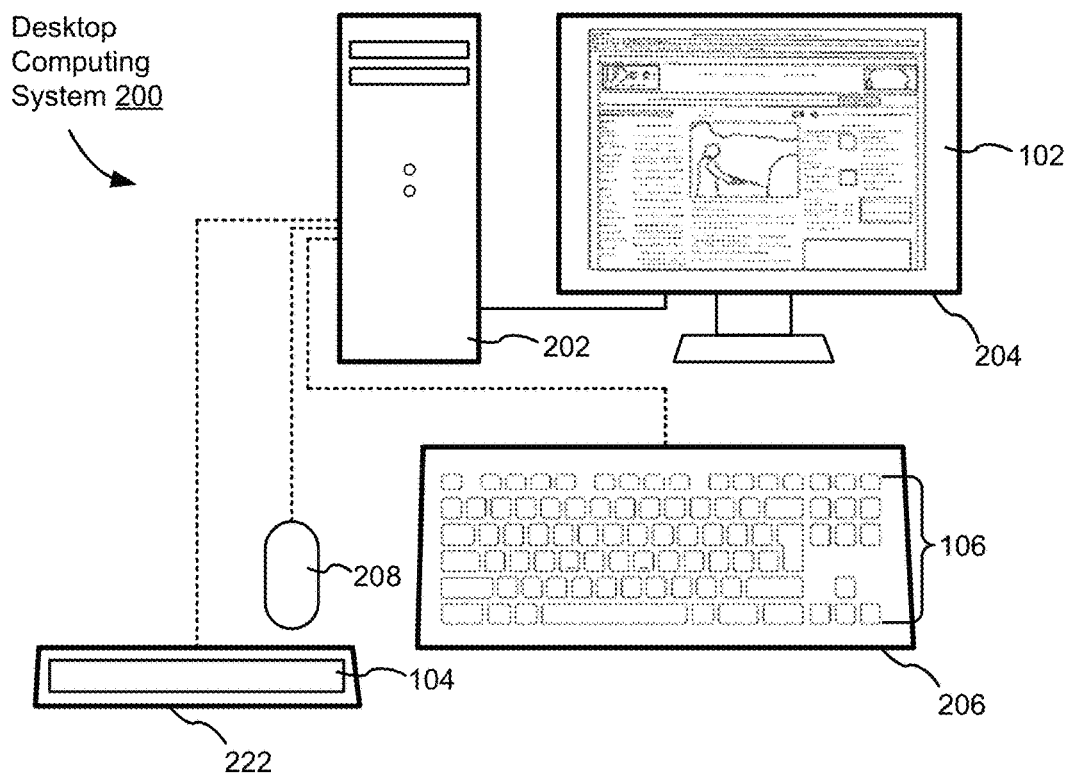
FIG. 2D is an illustrative diagram of a fourth implementation of a desktop computing system, in accordance with some embodiments.

FIG. 2D is an illustrative diagram of a fourth implementation of desktop computing system 200 in accordance with some embodiments. In FIG. 2D, desktop computing system 200 includes a computing device 202, a peripheral display device 204 with primary display 102, a peripheral keyboard 206, a peripheral mouse 208, and a second peripheral input mechanism 222. In FIG. 2D, peripheral display device 204, peripheral keyboard 206, peripheral mouse 208, and the second peripheral input mechanism 222 are communicatively coupled to computing device 202 via a wired connection, such as USB or PS/2, or via a wireless communication link, using a communication protocol such as Bluetooth, Wi-Fi, or the like. In FIG. 2A, peripheral keyboard 206 includes dynamic function row 104 and a set of physical keys 106. In FIG. 2D, peripheral keyboard 206 includes a set of physical keys 106, and the second peripheral input mechanism 222 includes dynamic function row 104 at least partially contained within the housing of the second peripheral input mechanism 222. In some embodiments, dynamic function row 104, which is described in more detail with reference to FIG. 1B, is a touch screen display. In some embodiments, the second peripheral input mechanism 222 includes one or more processors and memory storing one or more programs that may be executed by the one or more processors of the second peripheral input mechanism 222 to perform any of the embodiments described herein. In some embodiments, the second peripheral input mechanism 222 relays signals indicating user inputs (e.g., user selections of user-selectable symbols/affordances displayed by dynamic function row 104) to computing device 202.

Figure 3A:
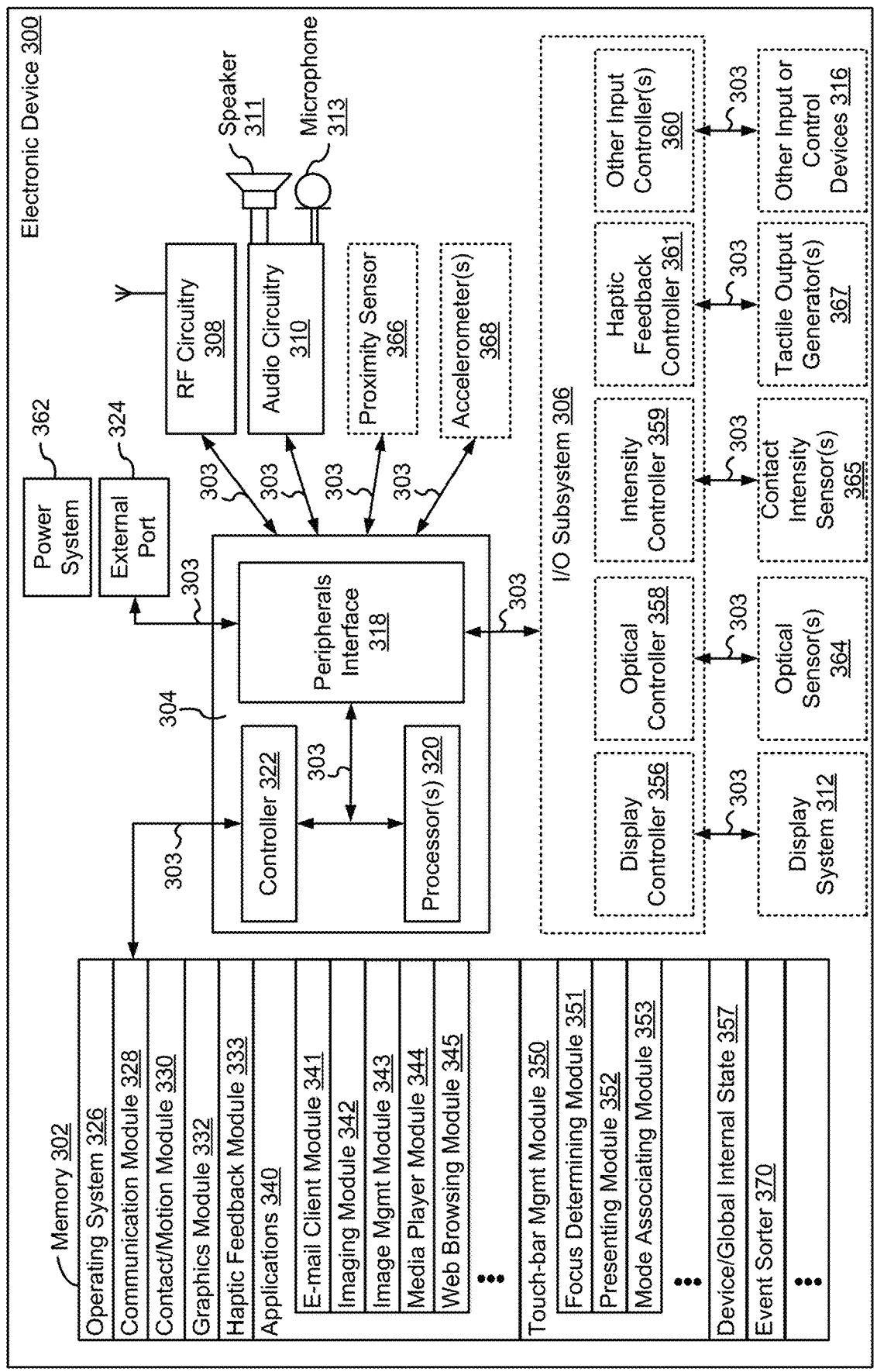
FIG. 3A is a block diagram of an electronic device, in accordance with some embodiments.

FIG. 3A is a block diagram of an electronic device 300, in accordance with some embodiments. In some embodiments, electronic device 300 is a portable electronic device, such as a laptop (e.g., portable computing system 100, FIG. 1A). In some embodiments, electronic device 300 is not a portable device, but is a desktop computer (e.g., computing device 202 of desktop computing system 200, FIGS. 2A-2D), which is communicatively coupled with a peripheral display system (e.g., peripheral display device 204, FIGS. 2A-2D) and optionally a peripheral touch-sensitive surface (e.g., a touchpad 108, FIGS. 2B-2C and/or a touch-sensitive display, such as peripheral display device 204, FIGS. 2A-2D and/or dynamic function row 104, FIGS. 2A-2D).

Electronic device 300 typically supports a variety of applications, such as one or more of the following: a drawing application, a presentation application, a word processing application, a website creation application, a disk authoring application, a spreadsheet application, a gaming application, a video conferencing application, an e-mail application, an instant messaging application, an image management application, a digital camera application, a digital video camera application, a web browser application, and/or a media player application.

The various applications that are executed on electronic device 300 optionally use at least one common physical user-interface device, such as the touch-sensitive surface. One or more functions of the touch-sensitive surface as well as corresponding information displayed by electronic device 300 are, optionally, adjusted and/or varied from one application to the next and/or within an application. In this way, a common physical architecture (such as the touch-sensitive surface) of electronic device 300 optionally supports the variety of applications with user interfaces that are intuitive and transparent to the user.

Electronic device 300 includes memory 302 (which optionally includes one or more computer readable storage mediums), memory controller 322, one or more processing units (CPU(s)) 320, peripherals interface 318, RF circuitry 308, audio circuitry 310, speaker 311, microphone 313, input/output (I/O) subsystem 306, other input or control devices 316, and external port 324. Electronic device 300 optionally includes a display system 312 (e.g., primary display 102 of display portion 110, FIG. 1A and/or dynamic function row 104, FIGS. 1A-1B), which may be a touch-sensitive display (sometimes also herein called a "touch screen" or a "touch screen display"). Electronic device 300 optionally includes one or more optical sensors 364. Electronic device 300 optionally includes one or more intensity sensors 365 for detecting intensity of contacts on a touch-sensitive surface such as touch-sensitive display or a touchpad. Electronic device 300 optionally includes one or more tactile output generators 367 for generating tactile outputs on a touch-sensitive surface such as touch-sensitive display or a touchpad (e.g., touchpad 108, FIGS. 1A-1B). These components optionally communicate over one or more communication buses or signal lines 303.

As used in the specification, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or touch/track pad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that electronic device 300 is only an example and that electronic device 300 optionally has more or fewer components than shown, optionally combines two or more components, or optionally has a different configuration or arrangement of the components. The various components shown in FIG. 3A are implemented in hardware, software, firmware, or a combination thereof, including one or more signal processing and/or application specific integrated circuits.

Memory 302 optionally includes high-speed random access memory and optionally also includes non-volatile memory, such as one or more magnetic disk storage devices, flash memory devices, or other non-volatile solid-state memory devices. Access to memory 302 by other components of electronic device 300, such as CPU(s) 320 and peripherals interface 318, is, optionally, controlled by memory controller 322. Peripherals interface 318 can be used to couple input and output peripherals to CPU(s) 320 and memory 302. The one or more processing units 320 run or execute various software programs and/or sets of instructions stored in memory 302 to perform various functions for electronic device 300 and to process data. In some embodiments, peripherals interface 318, CPU(s) 320, and memory controller 322 are, optionally, implemented on a single chip, such as chip 304. In some other embodiments, they are, optionally, implemented on separate chips.

RF (radio frequency) circuitry 308 receives and sends RF signals, also called electromagnetic signals. RF circuitry 308 converts electrical signals to/from electromagnetic signals and communicates with communications networks and other communications devices via the electromagnetic signals. RF circuitry 308 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 308 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g, and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 310, speaker 311, and microphone 313 provide an audio interface between a user and electronic device 300. Audio circuitry 310 receives audio data from peripherals interface 318, converts the audio data to an electrical signal, and transmits the electrical signal to speaker 311. Speaker 311 converts the electrical signal to human-audible sound waves. Audio circuitry 310 also receives electrical signals converted by microphone 313 from sound waves. Audio circuitry 310 converts the electrical signals to audio data and transmits the audio data to peripherals interface 318 for processing. Audio data is, optionally, retrieved from and/or transmitted to memory 302 and/or RF circuitry 308 by peripherals interface 318. In some embodiments, audio circuitry 310 also includes a headset jack. The headset jack provides an interface between audio circuitry 310 and removable audio input/output peripherals, such as output-only headphones or a headset with both output (e.g., a headphone for one or both ears) and input (e.g., a microphone).

I/O subsystem 306 couples the input/output peripherals of electronic device 300, such as display system 312 and other input or control devices 316, to peripherals interface 318. I/O subsystem 306 optionally includes display controller 356, optical sensor controller 358, intensity sensor controller 359, haptic feedback controller 361, and one or more other input controllers 360 for other input or control devices. The one or more other input controllers 360 receive/send electrical signals from/to other input or control devices 316. The other input or control devices 316 optionally include physical buttons (e.g., push buttons, rocker buttons, etc.), dials, slider switches, joysticks, click wheels, and so forth. In some alternate embodiments, other input controller(s) 360 are, optionally, coupled with any (or none) of the following: a keyboard, infrared port, USB port, and a pointer device such as a mouse. The one or more physical buttons optionally include an up/down button for volume control of speaker 311 and/or microphone 313.

Display system 312 (e.g., primary display 102 of display portion 110, FIG. 1A and/or dynamic function row 104, FIGS. 1A-1B) provides an output interface (and, optionally, an input interface when it is a touch-sensitive display) between electronic device 300 and a user. Display controller 356 receives and/or sends electrical signals from/to display system 312. Display system 312 displays visual output to the user. The visual output optionally includes graphics, text, icons, video, and any combination thereof (collectively termed "graphics"). In some embodiments, some or all of the visual output corresponds to user-interface objects/elements.

In some embodiments, display system 312 (e.g., primary display 102 of display portion 110, FIG. 1A and/or dynamic function row 104, FIGS. 1A-1B) is a touch-sensitive display with a touch-sensitive surface, sensor, or set of sensors that accepts input from the user based on haptic and/or tactile contact. As such, display system 312 and display controller 356 (along with any associated modules and/or sets of instructions in memory 302) detect contact (and any movement or breaking of the contact) on display system 312 and convert the detected contact into interaction with user-interface objects (e.g., one or more soft keys, icons, web pages, or images) that are displayed on display system 312. In one example embodiment, a point of contact between display system 312 and the user corresponds to an area under a finger of the user.

Display system 312 (e.g., primary display 102 of display portion 110, FIG. 1A and/or dynamic function row 104, FIGS. 1A-1B) optionally uses LCD (liquid crystal display) technology, LPD (light emitting polymer display) technology, LED (light emitting diode) technology, or OLED (organic light emitting diode) technology, although other display technologies are used in other embodiments. In some embodiments, when display system 312 is a touch-sensitive display, display system 312 and display controller 356 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with display system 312. In one example embodiment, projected mutual capacitance sensing technology is used, such as that found in the iPHONE®, iPODTOUCH®, and iPAD® from Apple Inc. of Cupertino, Calif.

Display system 312 (e.g., primary display 102 of display portion 110, FIG. 1A and/or dynamic function row 104, FIGS. 1A-1B) optionally has a video resolution in excess of 400 dpi (e.g., 500 dpi, 800 dpi, or greater). In some embodiments, display system 312 is a touch-sensitive display with which the user optionally makes contact using a stylus, a finger, and so forth. In some embodiments, the user interface is designed to work primarily with finger-based contacts and gestures. In some embodiments, electronic device 300 translates the rough finger-based input into a precise pointer/cursor position or command for performing the actions desired by the user.

In some embodiments, in addition to display system 312, electronic device 300 optionally includes a touchpad (e.g., touchpad 108, FIGS. 1A-1B) for activating or deactivating particular functions. In some embodiments, the touchpad is a touch-sensitive area of electronic device 300 that, unlike display system 312, does not display visual output. In some embodiments, when display system 312 is a touch-sensitive display, the touchpad is, optionally, a touch-sensitive surface that is separate from display system 312, or an extension of the touch-sensitive surface formed by display system 312.

Electronic device 300 also includes power system 362 for powering the various components. Power system 362 optionally includes a power management system, one or more power sources (e.g., battery, alternating current (AC), etc.), a recharging system, a power failure detection circuit, a power converter or inverter, a power status indicator (e.g., a light-emitting diode (LED)) and any other components associated with the generation, management and distribution of power in portable devices.

Electronic device 300 optionally also includes one or more optical sensors 364 coupled with optical sensor controller 358 in I/O subsystem 306. Optical sensor(s) 364 optionally includes charge-coupled device (CCD) or complementary metal-oxide semiconductor (CMOS) phototransistors. Optical sensor(s) 364 receive light from the environment, projected through one or more lens, and converts the light to data representing an image. In conjunction with imaging module 342, optical sensor(s) 364 optionally capture still images or video. In some embodiments, an optical sensor is located on the front of electronic device 300 so that the user's image is, optionally, obtained for video-conferencing while the user views the other video conference participants on display system 312.

Electronic device 300 optionally also includes one or more contact intensity sensor(s) 365 coupled with intensity sensor controller 359 in I/O subsystem 306. Contact intensity sensor(s) 365 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 365 receives contact intensity information (e.g., pressure information or a proxy for pressure information) from the environment. In some embodiments, at least one contact intensity sensor is collocated with, or proximate to, a touch-sensitive surface (e.g., touchpad 108, FIGS. 1A-1B or display system 312 when it is a touch-sensitive display).

Electronic device 300 optionally also includes one or more tactile output generators 367 coupled with haptic feedback controller 361 in I/O subsystem 306. Tactile output generator(s) 367 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor(s) 365 receives tactile feedback generation instructions from haptic feedback module 333 and generates tactile outputs that are capable of being sensed by a user of electronic device 300. In some embodiments, at least one tactile output generator is collocated with, or proximate to, a touch-sensitive surface (e.g., touchpad 108, FIGS. 1A-1B or display system 312 when it is a touch-sensitive display) and, optionally, generates a tactile output by moving the touch-sensitive surface vertically (e.g., in/out of a surface of electronic device 300) or laterally (e.g., back and forth in the same plane as a surface of electronic device 300).

Electronic device 300 optionally also includes one or more proximity sensors 366 coupled with peripherals interface 318. Alternately, proximity sensor(s) 366 are coupled with other input controller(s) 360 in I/O subsystem 306. Electronic device 300 optionally also includes one or more accelerometers 368 coupled with peripherals interface 318. Alternately, accelerometer(s) 368 are coupled with other input controller(s) 360 in I/O subsystem 306.

In some embodiments, the software components stored in memory 302 include operating system 326, communication module 328 (or set of instructions), contact/motion module 330 (or set of instructions), graphics module 332 (or set of instructions), applications 340 (or sets of instructions), and touch-bar management module 350 (or sets of instructions). Furthermore, in some embodiments, memory 302 stores device/global internal state 357 (or sets of instructions), as shown in FIG. 3A. Device/global internal state 357 includes one or more of: active application state, indicating which applications, if any, are currently active and/or in focus; display state, indicating what applications, views or other information occupy various regions of display system 312 (e.g., primary display 102 of display portion 110, FIG. 1A and/or dynamic function row 104, FIGS. 1A-1B) and/or a peripheral display system (e.g., primary display 102 of peripheral display device 204, FIGS. 2A-2D and/or dynamic function row 104, FIGS. 2A-2D); sensor state, including information obtained from various sensors and input or control devices 316 of electronic device 300; and location information concerning the location and/or attitude of electronic device 300.

Operating system 326 (e.g., DARWIN, RTXC, LINUX, UNIX, OS X, WINDOWS, or an embedded operating system such as VXWorks) includes various software components and/or drivers for controlling and managing general system tasks (e.g., memory management, storage device control, power management, etc.) and facilitates communication between various hardware and software components.

Communication module 328 facilitates communication with other devices (e.g., computing device 202, FIGS. 2A-2D; peripheral mouse 208, FIGS. 2A and 2D; peripheral keyboard 206, FIGS. 2A-2B; first peripheral input mechanism 212, FIG. 2C; and/or second peripheral input mechanism 222, FIG. 2D) over one or more external ports 324 and/or RF circuitry 308 and also includes various software components for sending/receiving data via RF circuitry 308 and/or external port 324. External port 324 (e.g., Universal Serial Bus (USB), FIREWIRE, etc.) is adapted for coupling directly to other devices or indirectly over a network (e.g., the Internet, wireless LAN, etc.). In some embodiments, external port 324 is a multi-pin (e.g., 30-pin) connector that is the same as, or similar to and/or compatible with the 30-pin connector used on iPod® devices.

Contact/motion module 330 optionally detects contact with display system 312 when it is a touch-sensitive display (in conjunction with display controller 356) and other touch sensitive devices (e.g., a touchpad or physical click wheel). Contact/motion module 330 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 330 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 330 also detects contact on a touchpad (e.g., touchpad 108, FIGS. 1A-1B).

In some embodiments, contact/motion module 330 uses a set of one or more intensity thresholds to determine whether an operation has been performed by a user (e.g., to determine whether a user has selected or "clicked" on an affordance). In some embodiments at least a subset of the intensity thresholds are determined in accordance with software parameters (e.g., the intensity thresholds are not determined by the activation thresholds of particular physical actuators and can be adjusted without changing the physical hardware of electronic device 300). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 330 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap contact includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and in some embodiments also followed by detecting a finger-up (lift off) event.

Graphics module 332 includes various known software components for rendering and causing display of graphics on primary display 102 (e.g., primary display 102 of display portion 110, FIG. 1A or primary display 102 of peripheral display device 204, FIGS. 2A-2D) or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like. In some embodiments, graphics module 332 stores data representing graphics to be used. Each graphic is, optionally, assigned a corresponding code. Graphics module 332 receives, from applications etc., one or more codes specifying graphics to be displayed along with, if necessary, coordinate data and other graphic property data, and then generates screen image data to output to display controller 356.

Haptic feedback module 333 includes various software components for generating instructions used by tactile output generator(s) 367 to produce tactile outputs at one or more locations on electronic device 300 in response to user interactions with electronic device 300.

Applications 340 optionally include the following modules (or sets of instructions), or a subset or superset thereof:
  e-mail client module 341 (sometimes also herein called "mail app" or "e-mail app") for receiving, sending, composing, and viewing e-mails;
  imaging module 342 for capturing still and/or video images;
  image management module 343 (sometimes also herein called "photo app") for editing and viewing still and/or video images;
  media player module 344 (sometimes also herein called "media player app") for playback of audio and/or video; and
  web browsing module 345 (sometimes also herein called "web browser") for connecting to and browsing the Internet.

Examples of other applications 340 that are, optionally, stored in memory 302 include messaging and communications applications, word processing applications, other image editing applications, drawing applications, presentation applications, JAVA-enabled applications, encryption applications, digital rights management applications, voice recognition applications, and voice replication applications.

In conjunction with one or more of RF circuitry 308, display system 312 (e.g., primary display 102 of display portion 110, FIG. 1A and/or dynamic function row 104, FIGS. 1A-1B), display controller 356, and contact module 330, graphics module 332, e-mail client module 341 includes executable instructions to create, send, receive, and manage e-mail in response to user instructions. In conjunction with image management module 343, e-mail client module 341 makes it very easy to create and send e-mails with still or video images taken with imaging module 342.

In conjunction with one or more of display system 312 (e.g., primary display 102 of display portion 110, FIG. 1A and/or dynamic function row 104, FIGS. 1A-1B), display controller 356, optical sensor(s) 364, optical sensor controller 358, contact module 330, graphics module 332, and image management module 343, imaging module 342 includes executable instructions to capture still images or video (including a video stream) and store them into memory 302, modify characteristics of a still image or video, or delete a still image or video from memory 302.

In conjunction with one or more of display system 312 (e.g., primary display 102 of display portion 110, FIG. 1A and/or dynamic function row 104, FIGS. 1A-1B), display controller 356, contact module 330, graphics module 332, and imaging module 342, image management module 343 includes executable instructions to arrange, modify (e.g., edit), or otherwise manipulate, label, delete, present (e.g., in a digital slide show or album), and store still and/or video images.

In conjunction with one or more of display system 312 (e.g., primary display 102 of display portion 110, FIG. 1A and/or dynamic function row 104, FIGS. 1A-1B), display controller 356, contact module 330, graphics module 332, audio circuitry 310, speaker 311, RF circuitry 308, and web browsing module 345, media player module 344 includes executable instructions that allow the user to download and play back recorded music and other sound files stored in one or more file formats, such as MP3 or AAC files, and executable instructions to display, present or otherwise play back videos (e.g., on primary display 102 of display portion 110, FIG. 1A or primary display 102 of peripheral display device 2014, FIGS. 2A-2B connected via external port 324).

In conjunction with one or more of RF circuitry 308, display system 312 (e.g., primary display 102 of display portion 110, FIG. 1A and/or dynamic function row 104, FIGS. 1A-1B), display controller 356, contact module 330, and graphics module 332, web browsing module 345 includes executable instructions to browse the Internet in accordance with user instructions, including searching, linking to, receiving, and displaying web pages or portions thereof, as well as attachments and other files linked to web pages.

Touch-bar management module 350 includes: focus determining module 351, presenting module 352, and mode associating module 353. The touch-bar management module 350 manages operations of the touch-sensitive secondary display 104 and, in particular, determines when to operate the touch-sensitive secondary display in various display modes. An example algorithm used by the touch-bar management module 350, in some embodiments, to determine which display mode in which to operate the touch-sensitive secondary display 104 is shown in FIG. 8.

Figure 8:
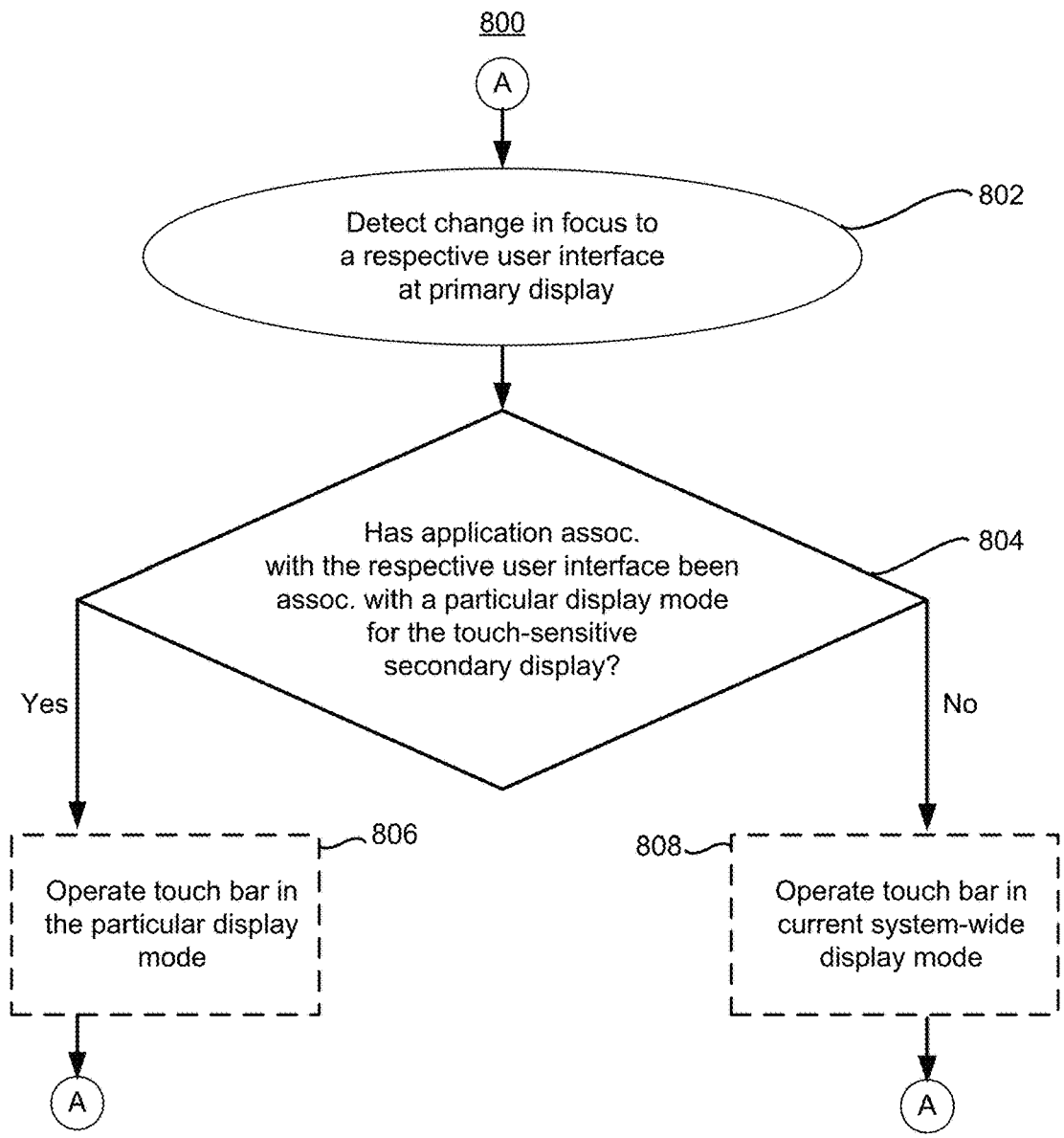
FIG. 8 shows a flowchart of selecting a display mode in which to operate the touch-sensitive secondary display, in accordance with some embodiments.

With reference now to FIG. 8, in some embodiments, focus determining module 351 is configured to detect (802) (and/or receive information about) a change in focus to a respective user interface within a graphical user interface displayed by display system 312 (e.g., primary display 102 of display portion 110, FIG. 1A) or a peripheral display system (e.g., peripheral display device 204, FIGS. 2A-2D).

In some embodiments, after the focus determining module 351 has detected that the respective user interface is in focus, the mode associating module 353 can then determine (804) whether an application associated with the user interface has been associated with a particular display mode for the touch-sensitive secondary display (e.g., using a touch-bar management user interface, as is discussed in detail below in reference to method 700). In accordance with a determination that the application has been associated with the respective display mode for the touch-sensitive secondary display (804—Yes), then the presenting module 352 is configured to cause the secondary display to operate in the particular display mode (806). In accordance with a determination that the application has not been associated with a respective display mode for the touch-sensitive secondary display (804—No), then the presenting module 352 is configured to cause the secondary display to operate in a current system-wide display mode for the touch-sensitive secondary display (808) (e.g., a persistent display mode selected by a user after a mode-switching input is provided, as is explained below in reference to method 600 and/or a current default display mode that is defined by the system, such as an adaptive display mode).

In some embodiments, the method 800 then returns back to operation 802 each time that a change in focus is detected at the primary display, so that the touch-bar management module 350 can again determine an appropriate display mode in which to operate the touch-sensitive secondary display after each change in focus is detected. The method 800 can be used in conjunction with method 600 described in more detail below, such that as various focus changes are detected at the primary display algorithm 800 is utilized to ensure that the secondary display is operated in the proper display mode after these various focus changes.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 302 optionally stores a subset of the modules and data structures identified above. Furthermore, memory 302 optionally stores additional modules and data structures not described above.

Figure 3B:
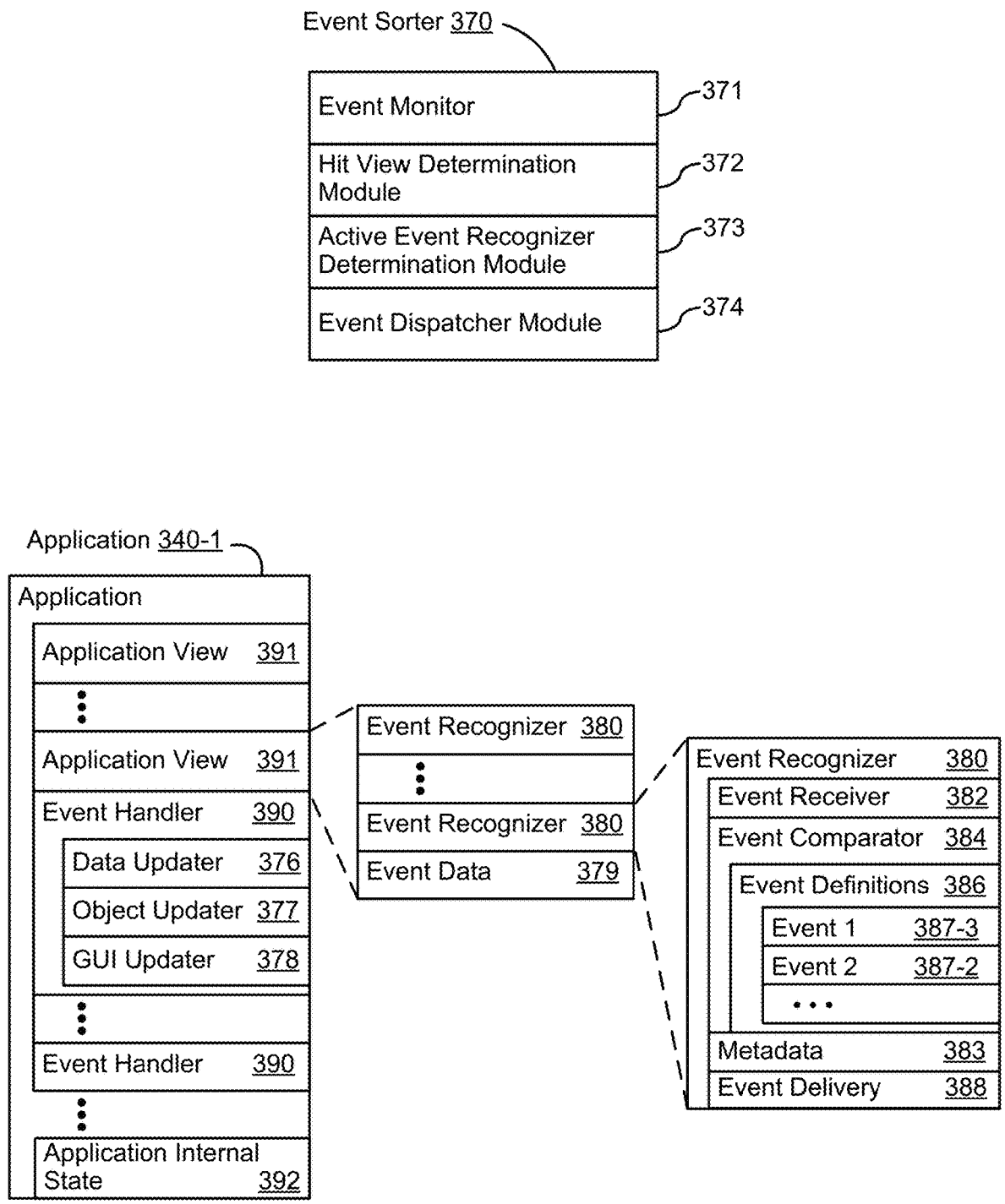
FIG. 3B is a block diagram of components for event handling of FIG. 3A, in accordance with some embodiments.

FIG. 3B is a block diagram of components for event handling of FIG. 3A, in accordance with some embodiments. In some embodiments, memory 302 (FIG. 3A) includes event sorter 370 (e.g., in operating system 326) and an application 340-1 (e.g., any of the aforementioned applications 341, 342, 343, 344, or 345).

Event sorter 370 receives event information and determines the application 340-1 and application view 391 of application 340-1 to which to deliver the event information. Event sorter 370 includes event monitor 371 and event dispatcher module 374. In some embodiments, application 340-1 includes application internal state 392, which indicates the current application view(s) displayed on display system 312 (e.g., primary display 102 of display portion 110, FIG. 1A and/or dynamic function row 104, FIGS. 1A-1B) when the application is active or executing. In some embodiments, device/global internal state 357 is used by event sorter 370 to determine which application(s) is (are) currently active or in focus, and application internal state 392 is used by event sorter 370 to determine application views 391 to which to deliver event information.

In some embodiments, application internal state 392 includes additional information, such as one or more of: resume information to be used when application 340-1 resumes execution, user interface state information that indicates information being displayed or that is ready for display by application 340-1, a state queue for enabling the user to go back to a prior state or view of application 340-1, and a redo/undo queue of previous actions taken by the user.

Event monitor 371 receives event information from peripherals interface 318. Event information includes information about a sub-event (e.g., a user touch on display system 312 when it is a touch-sensitive display, as part of a multi-touch gesture). Peripherals interface 318 transmits information it receives from I/O subsystem 306 or a sensor, such as proximity sensor(s) 366, accelerometer(s) 368, and/or microphone 313 (through audio circuitry 310). Information that peripherals interface 318 receives from I/O subsystem 306 includes information from display system 312 when it is a touch-sensitive display or another touch-sensitive surface (e.g., touchpad 108, FIGS. 1A-1B).

In some embodiments, event monitor 371 sends requests to the peripherals interface 318 at predetermined intervals. In response, peripherals interface 318 transmits event information. In other embodiments, peripheral interface 318 transmits event information only when there is a significant event (e.g., receiving an input above a predetermined noise threshold and/or for more than a predetermined duration).

In some embodiments, event sorter 370 also includes a hit view determination module 372 and/or an active event recognizer determination module 373.

Hit view determination module 372 provides software procedures for determining where a sub-event has taken place within one or more views, when display system 312 displays more than one view, where views are made up of controls and other elements that a user can see on the display.

Another aspect of the user interface associated with an application is a set of views, sometimes herein called application views or user interface windows, in which information is displayed and touch-based gestures occur. The application views (of an application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 372 receives information related to sub-events of a touch-based gesture. When an application has multiple views organized in a hierarchy, hit view determination module 372 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 373 determines which view or views within a view hierarchy should receive a particular sequence of sub-events. In some embodiments, active event recognizer determination module 373 determines that only the hit view should receive a particular sequence of sub-events. In other embodiments, active event recognizer determination module 373 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 374 dispatches the event information to an event recognizer (e.g., event recognizer 380). In embodiments including active event recognizer determination module 373, event dispatcher module 374 delivers the event information to an event recognizer determined by active event recognizer determination module 373. In some embodiments, event dispatcher module 374 stores in an event queue the event information, which is retrieved by a respective event receiver 382.

In some embodiments, operating system 326 includes event sorter 370. Alternatively, application 340-1 includes event sorter 370. In yet other embodiments, event sorter 370 is a stand-alone module, or a part of another module stored in memory 302, such as contact/motion module 330.

In some embodiments, application 340-1 includes a plurality of event handlers 390 and one or more application views 391, each of which includes instructions for handling touch events that occur within a respective view of the application's user interface. Each application view 391 of the application 340-1 includes one or more event recognizers 380. Typically, an application view 391 includes a plurality of event recognizers 380. In other embodiments, one or more of event recognizers 380 are part of a separate module, such as a user interface kit (not shown) or a higher level object from which application 340-1 inherits methods and other properties. In some embodiments, a respective event handler 390 includes one or more of: data updater 376, object updater 377, GUI updater 378, and/or event data 379 received from event sorter 370. Event handler 390 optionally utilizes or calls data updater 376, object updater 377 or GUI updater 378 to update the application internal state 392. Alternatively, one or more of the application views 391 includes one or more respective event handlers 390. Also, in some embodiments, one or more of data updater 376, object updater 377, and GUI updater 378 are included in an application view 391.

A respective event recognizer 380 receives event information (e.g., event data 379) from event sorter 370, and identifies an event from the event information. Event recognizer 380 includes event receiver 382 and event comparator 384. In some embodiments, event recognizer 380 also includes at least a subset of: metadata 383, and event delivery instructions 388 (which optionally include sub-event delivery instructions).

Event receiver 382 receives event information from event sorter 370. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 384 compares the event information to predefined event or sub-event definitions and, based on the comparison, determines an event or sub-event, or determines or updates the state of an event or sub-event. In some embodiments, event comparator 384 includes event definitions 386. Event definitions 386 contain definitions of events (e.g., predefined sequences of sub-events), for example, event 1 (387-1), event 2 (387-2), and others. In some embodiments, sub-events in an event 387 include, for example, touch begin, touch end, touch movement, touch cancellation, and multiple touching. In one example, the definition for event 1 (387-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (387-2) is a dragging on a displayed object. The dragging, for example, comprises a touch (or contact) on the displayed object for a predetermined phase, a movement of the touch across display system 312 when it is a touch-sensitive display, and lift-off of the touch (touch end). In some embodiments, the event also includes information for one or more associated event handlers 390.

In some embodiments, event definition 387 includes a definition of an event for a respective user-interface object. In some embodiments, event comparator 384 performs a hit test to determine which user-interface object is associated with a sub-event. For example, in an application view in which three user-interface objects are displayed on display system 312, when a touch is detected on display system 312 when it is a touch-sensitive display, event comparator 384 performs a hit test to determine which of the three user-interface objects is associated with the touch (sub-event). If each displayed object is associated with a respective event handler 390, the event comparator uses the result of the hit test to determine which event handler 390 should be activated. For example, event comparator 384 selects an event handler associated with the sub-event and the object triggering the hit test.

In some embodiments, the definition for a respective event 387 also includes delayed actions that delay delivery of the event information until after it has been determined whether the sequence of sub-events does or does not correspond to the event recognizer's event type.

When a respective event recognizer 380 determines that the series of sub-events do not match any of the events in event definitions 386, the respective event recognizer 380 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 380 includes metadata 383 with configurable properties, flags, and/or lists that indicate how the event delivery system should perform sub-event delivery to actively involved event recognizers. In some embodiments, metadata 383 includes configurable properties, flags, and/or lists that indicate how event recognizers interact, or are enabled to interact, with one another. In some embodiments, metadata 383 includes configurable properties, flags, and/or lists that indicate whether sub-events are delivered to varying levels in the view or programmatic hierarchy.

In some embodiments, a respective event recognizer 380 activates event handler 390 associated with an event when one or more particular sub-events of an event are recognized. In some embodiments, a respective event recognizer 380 delivers event information associated with the event to event handler 390. Activating an event handler 390 is distinct from sending (and deferred sending) sub-events to a respective hit view. In some embodiments, event recognizer 380 throws a flag associated with the recognized event, and event handler 390 associated with the flag catches the flag and performs a predefined process.

In some embodiments, event delivery instructions 388 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 376 creates and updates data used in application 340-1. For example, data updater 376 stores a video file used by media player module 344. In some embodiments, object updater 377 creates and updates objects used by application 340-1. For example, object updater 377 creates a new user-interface object or updates the position of a user-interface object. GUI updater 378 updates the GUI. For example, GUI updater 378 prepares display information and sends it to graphics module 332 for display on display system 312 (e.g., primary display 102 of display portion 110, FIG. 1A and/or dynamic function row 104, FIGS. 1A-1B).

In some embodiments, event handler(s) 390 includes or has access to data updater 376, object updater 377, and GUI updater 378. In some embodiments, data updater 376, object updater 377, and GUI updater 378 are included in a single module of an application 340-1 or application view 391. In other embodiments, they are included in two or more software modules.

It shall be understood that the foregoing discussion regarding event handling of user touches on touch-sensitive displays also applies to other forms of user inputs to operate electronic device 300 with input-devices, not all of which are initiated on touch screens. For example, mouse movement and mouse button presses, optionally coordinated with single or multiple keyboard presses or holds; contact movements such as taps, drags, scrolls, etc., on touchpads; pen stylus inputs; movement of the device; oral instructions; detected eye movements; biometric inputs; and/or any combination thereof are optionally utilized as inputs corresponding to sub-events which define an event to be recognized.

Figure 4:
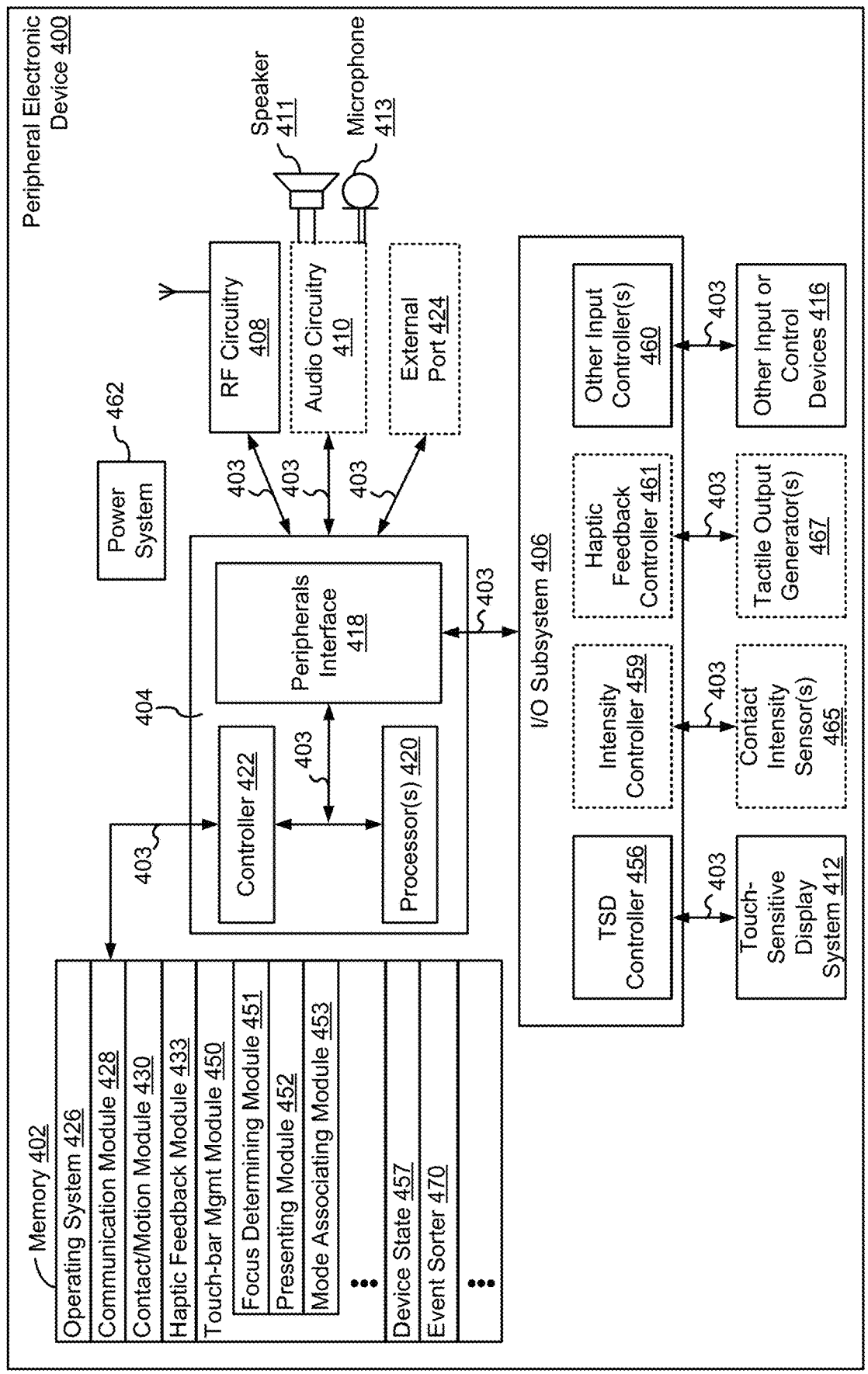
FIG. 4 is a block diagram of a peripheral electronic device, in accordance with some embodiments.
Figure 5A:
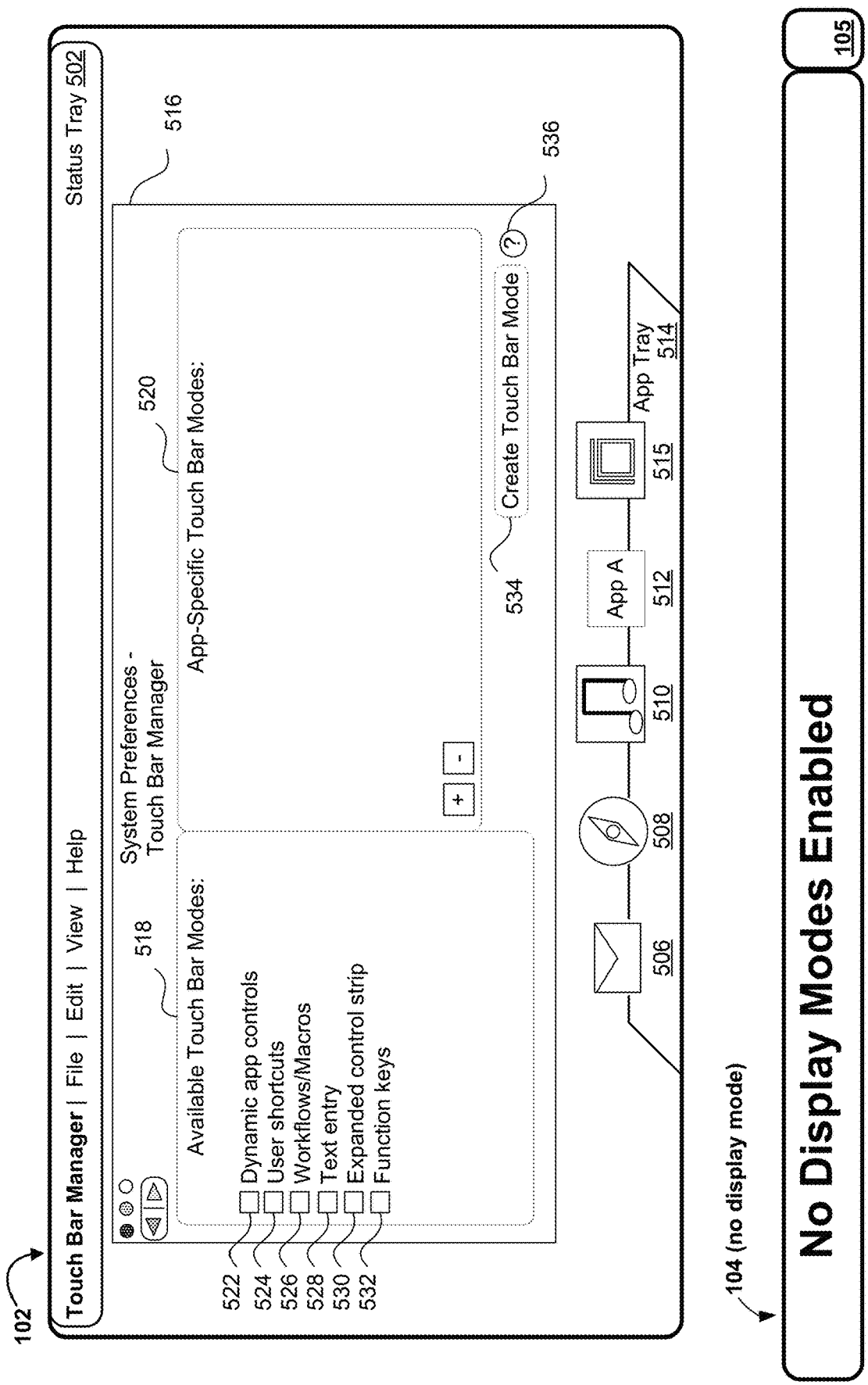
FIGS. 5A-5AT are schematics of primary and secondary displays used to illustrate example user interfaces for allowing users to customize display modes for touch-sensitive secondary displays, in accordance with some embodiments.

FIG. 4 shows a block diagram of a peripheral electronic device 400, in accordance with some embodiments. In some embodiments, peripheral electronic device 400 is a peripheral input and output device that at least partially contains a dynamic function row 104 and a physical input mechanism, such as a set of physical keys (e.g., the set of physical keys 106, FIGS. 2A-2B) and/or a touchpad (e.g., touchpad 108, FIGS. 2B-2C), within a same housing. Examples of peripheral electronic device 400 includes: peripheral keyboard (e.g., peripheral keyboard 206, FIGS. 2A-2B), a peripheral touch-sensitive surface (e.g., first peripheral input mechanism 212, FIG. 2C), or other peripheral input mechanisms (e.g., second peripheral input mechanism 222, FIG. 2D). Peripheral electronic device 400 is communicatively coupled with computing device 202 (FIGS. 2A-2D). For example, peripheral electronic device 400 is communicatively coupled with computing device 202 via a wired connection, such as USB or PS/2, or via a wireless communication link, using a communication protocol such as Bluetooth, Wi-Fi, or the like. Peripheral electronic device 400 may rely on some of the components or procedures in electronic device 300 (FIG. 3A) or some of these components or procedures may be completed by, located in, or housed by peripheral electronic device 400 instead of electronic device 300.

In some embodiments, peripheral electronic device 400 includes one or more of memory 402 (which optionally includes one or more computer readable storage mediums), memory controller 422, one or more processing units (CPU(s)) 420, peripherals interface 418, RF circuitry 408, audio circuitry 410, speaker 411, microphone 413, input/output (I/O) subsystem 406, other input or control devices 416, and external port 424. Peripheral electronic device 400 includes a touch-sensitive display system 412 (e.g., dynamic function row 104, FIGS. 2A-2D) (sometimes also herein called a "touch-sensitive display," a "touch screen," or a "touch screen display").

Peripheral electronic device 400 optionally includes one or more intensity sensors 465 for detecting intensity of contacts on a touch-sensitive surface such as touch-sensitive display system 412 or a touchpad (e.g., touchpad 108, FIGS. 2B-2C). Peripheral electronic device 400 optionally includes one or more tactile output generators 467 for generating tactile outputs on a touch-sensitive surface such as touch-sensitive display system 412 or a touchpad (e.g., touchpad 108, FIGS. 2B-2C). These components optionally communicate over one or more communication buses or signal lines 403.

Memory 402 optionally includes high-speed random access memory and optionally also includes non-volatile memory, such as one or more magnetic disk storage devices, flash memory devices, or other non-volatile solid-state memory devices. Access to memory 402 by other components of peripheral electronic device 400, such as CPU(s) 420 and peripherals interface 418, is, optionally, controlled by memory controller 422. Peripherals interface 418 can be used to couple CPU(s) 420 and memory 402 to I/O subsystem 406 and other circuitry. The one or more processing units 420 run or execute various software programs and/or sets of instructions stored in memory 402 to perform various functions for peripheral electronic device 400 and to process data. In some embodiments, peripherals interface 418, CPU(s) 420, and memory controller 422 are, optionally, implemented on a single chip, such as chip 404. In some other embodiments, they are, optionally, implemented on separate chips.

RF (radio frequency) circuitry 408 receives and sends RF signals, also called electromagnetic signals. RF circuitry 408 converts electrical signals to/from electromagnetic signals and communicates with communications networks and other communications devices via the electromagnetic signals. RF circuitry 408 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The wireless communication optionally uses any of a plurality of communications standards, protocols and technologies, including but not limited to near field communication (NFC), Bluetooth, Wireless Fidelity (Wi-Fi) (e.g., IEEE 802.11a, IEEE 802.11b, IEEE 802.11g, and/or IEEE 802.11n), Wi-MAX, or any other suitable communication protocol, including communication protocols not yet developed as of the filing date of this document.

Optional audio circuitry 410, speaker 411, and microphone 413 provide an audio interface between a user and peripheral electronic device 400. Audio circuitry 410 receives audio data from peripherals interface 418, converts the audio data to an electrical signal, and transmits the electrical signal to speaker 411. Speaker 411 converts the electrical signal to human-audible sound waves. Audio circuitry 410 also receives electrical signals converted by microphone 413 from sound waves. Audio circuitry 410 converts the electrical signals to audio data and transmits the audio data to peripherals interface 418 for processing. Audio data is, optionally, retrieved from and/or transmitted to memory 402 and/or RF circuitry 408 by peripherals interface 418. In some embodiments, audio circuitry 410 also includes a headset jack. The headset jack provides an interface between audio circuitry 410 and removable audio input/output peripherals, such as output-only headphones or a headset with both output (e.g., a headphone for one or both ears) and input (e.g., a microphone).

I/O subsystem 406 couples the input/output peripherals of peripheral electronic device 400, such as touch-sensitive display system 412 (e.g., dynamic function row 104, FIGS. 2A-2D), to peripherals interface 418. I/O subsystem 406 optionally includes display controller 456, intensity sensor controller 459, haptic feedback controller 461, and one or more input controllers 460 for other input or control devices 416. The one or more other input controllers 460 receive/send electrical signals from/to other input or control devices 416. The other input or control devices 416 optionally include physical buttons (e.g., push buttons, rocker buttons, etc.), dials, slider switches, joysticks, click wheels, a set of physical keys, a touchpad, and so forth.

Touch-sensitive display system 412 (e.g., dynamic function row 104, FIGS. 2A-2D) provides an input/output interface between peripheral electronic device 400 and a user. Touch-sensitive display (TSD) controller 456 receives and/or sends electrical signals from/to touch-sensitive display system 412. Touch-sensitive display system 412 displays visual output to the user. The visual output optionally includes graphics, text, icons, video, and any combination thereof (collectively termed "graphics"). In some embodiments, some or all of the visual output corresponds to user-interface objects/elements.

Touch-sensitive display system 412 (e.g., dynamic function row 104, FIGS. 2A-2D) includes a touch-sensitive surface, sensor, or set of sensors that accepts input from the user based on haptic and/or tactile contact. As such, touch-sensitive display system 412 and TSD controller 456 (along with any associated modules and/or sets of instructions in memory 402) detect contact (and any movement or breaking of the contact) on touch-sensitive display system 412 and convert the detected contact into signals used to select or control user-interface objects (e.g., one or more soft keys, icons, web pages, or images) that are displayed on touch-sensitive display system 412. In one example embodiment, a point of contact between touch-sensitive display system 412 and the user corresponds to an area of touch-sensitive display system 412 in contact with a finger of the user.

Touch-sensitive display system 412 (e.g., dynamic function row 104, FIGS. 2A-2D) optionally uses LCD (liquid crystal display) technology, LPD (light emitting polymer display) technology, LED (light emitting diode) technology, or OLED (organic light emitting diode) technology, although other display technologies are used in other embodiments. Touch-sensitive display system 412 and TSD controller 456 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 412. In one example embodiment, projected mutual capacitance sensing technology is used, such as that found in the iPHONE®, iPODTOUCH®, and iPAD® from Apple Inc. of Cupertino, Calif.

Touch-sensitive display system 412 (e.g., dynamic function row 104, FIGS. 2A-2D) optionally has a video resolution in excess of 400 dpi (e.g., 500 dpi, 800 dpi, or greater). In some embodiments, the user makes contact with touch-sensitive display system 412 using a stylus, a finger, and so forth. In some embodiments, the user interface is designed to work primarily with finger-based contacts and gestures.

In some embodiments, in addition to touch-sensitive display system 412, peripheral electronic device 400 optionally includes a touchpad (e.g., touchpad 108, FIGS. 2B-2C). In some embodiments, the touchpad is a touch-sensitive area of peripheral electronic device 400 that, unlike touch-sensitive display system 412, does not display visual output. In some embodiments, the touchpad is, optionally, a touch-sensitive surface that is separate from touch-sensitive display system 412, or an extension of the touch-sensitive surface formed by touch-sensitive display system 412.

Peripheral electronic device 400 also includes power system 462 for powering the various components. Power system 462 optionally includes a power management system, one or more power sources (e.g., battery, alternating current (AC), etc.), a recharging system, a power failure detection circuit, a power converter or inverter, a power status indicator (e.g., a light-emitting diode (LED)) and any other components associated with the generation, management and distribution of power in portable devices.

Peripheral electronic device 400 optionally also includes one or more contact intensity sensors 465 coupled with intensity sensor controller 459 in I/O subsystem 406. Contact intensity sensor(s) 465 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 465 receives contact intensity information (e.g., pressure information or a proxy for pressure information) from the environment. In some embodiments, at least one contact intensity sensor is collocated with, or proximate to, a touch-sensitive surface (e.g., touch-sensitive display system 412 and/or touchpad 108, FIGS. 2B-2C).

Peripheral electronic device 400 optionally also includes one or more tactile output generators 467 coupled with haptic feedback controller 461 in I/O subsystem 406. Tactile output generator(s) 467 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor(s) 465 receives tactile feedback generation instructions from haptic feedback module 433 and generates tactile outputs that are capable of being sensed by a user of peripheral electronic device 400. In some embodiments, at least one tactile output generator is collocated with, or proximate to, a touch-sensitive surface (e.g., touch-sensitive display system 412 and/or touchpad 108, FIGS. 2B-2C) and, optionally, generates a tactile output by moving the touch-sensitive surface vertically (e.g., in/out of a surface of peripheral electronic device 400) or laterally (e.g., back and forth in the same plane as a surface of peripheral electronic device 400).

In some embodiments, the software components stored in memory 402 include operating system 426, communication module 428 (or set of instructions), contact/motion module 430 (or set of instructions), and dynamic function row module 450 (or sets of instructions). Furthermore, in some embodiments, memory 402 stores device state 457 including the display state, indicating what views or other information occupy various regions of touch-sensitive display system 412 (e.g., dynamic function row 104, FIGS. 2A-2D).

Operating system 426 includes various software components and/or drivers for controlling and managing general system tasks (e.g., memory management, storage device control, power management, etc.) and facilitates communication between various hardware and software components.

Communication module 428 facilitates communication with other devices (e.g., computing device 202, FIGS. 2A-2D) over one or more external ports 424 and/or RF circuitry 408 and also includes various software components for sending/receiving data via RF circuitry 408 and/or external port 424. External port 424 (e.g., Universal Serial Bus (USB), FIREWIRE, etc.) is adapted for coupling directly to other devices or indirectly over a network (e.g., the Internet, wireless LAN, etc.).

Contact/motion module 430 optionally detects contact with touch-sensitive display system 412 and other touch sensitive devices (e.g., a touchpad or physical click wheel). Contact/motion module 430 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 430 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 430 also detects contact on a touchpad (e.g., touchpad 108, FIGS. 2B-2C).

In some embodiments, contact/motion module 430 uses a set of one or more intensity thresholds to determine whether an operation has been performed by a user (e.g., to determine whether a user has selected or "clicked" on an affordance). In some embodiments at least a subset of the intensity thresholds are determined in accordance with software parameters (e.g., the intensity thresholds are not determined by the activation thresholds of particular physical actuators and can be adjusted without changing the physical hardware of peripheral electronic device 400). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 430 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap contact includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and in some embodiments also followed by detecting a finger-up (lift off) event.

Haptic feedback module 433 includes various software components for generating instructions used by tactile output generator(s) 467 to produce tactile outputs at one or more locations on peripheral electronic device 400 in response to user interactions with peripheral electronic device 400.

Touch-bar management module 450 includes analogous components and functions in an equivalent fashion as the touch-bar management module 350 described above. For the sake of brevity, therefore, details regarding operation of the touch-bar management module are not repeated here as the descriptions supplied above with respect to touch-bar management module 350 to the module 450 (and its components) as well.

In some embodiments, memory 402 includes event sorter 470 (e.g., in operating system 426). In some embodiments, event sorter 470 performs the same functions as event sorter 370 (FIG. 3B) and includes a subset or superset of the modules, procedures, and instructions of event sorter 370 (FIG. 3B). As such, event sorter 470 will not be described for the sake of brevity.

It should be appreciated that peripheral electronic device 400 is only an example and that peripheral electronic device 400 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

Each of the above identified modules correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 402 optionally stores a subset of the modules and data structures identified above. Furthermore, memory 402 optionally stores additional modules and data structures not described above.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of the portable computing system 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

In some embodiments one or more predefined intensity thresholds are used to determine whether a particular input satisfies an intensity-based criterion. For example, the one or more predefined intensity thresholds include (i) a contact detection intensity threshold $IT_0$, (ii) a light press intensity threshold $IT_L$, (iii) a deep press intensity threshold $IT_D$ (e.g., that is at least initially higher than $I_L$), and/or (iv) one or more other intensity thresholds (e.g., an intensity threshold $I_H$ that is lower than $I_L$). In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 3C:
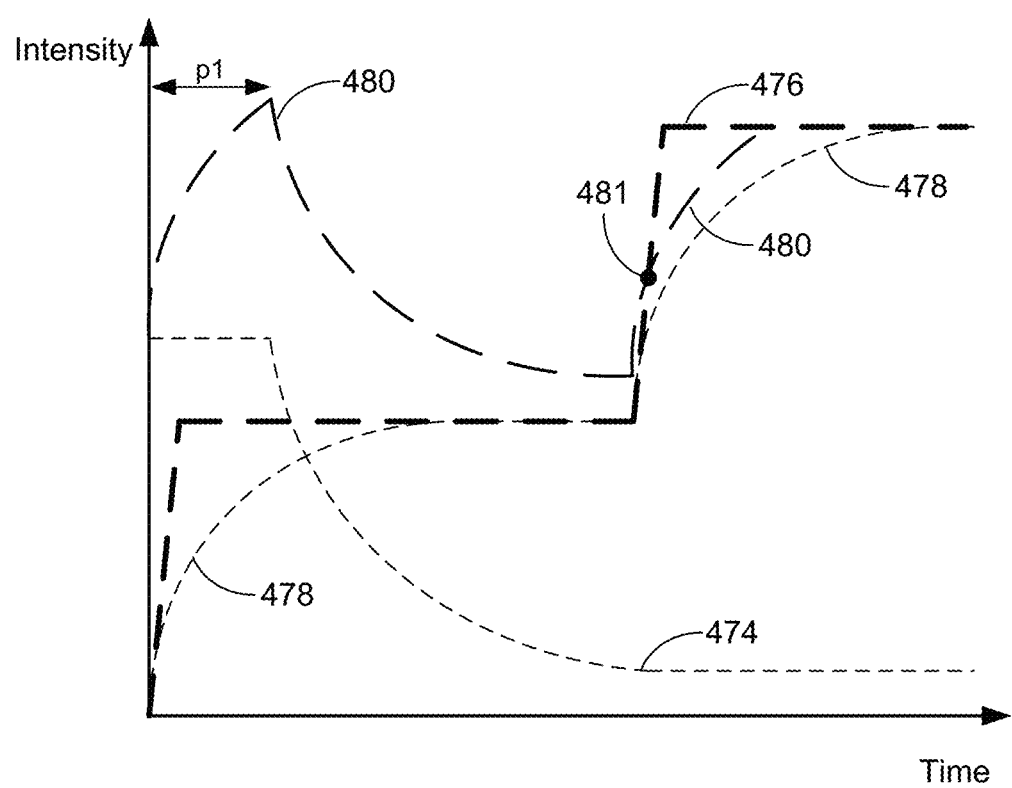
FIGS. 3C-3E illustrate examples of dynamic intensity thresholds in accordance with some embodiments.

For example, FIG. 3C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 3C), the "deep press" response is triggered.

Figure 3D:
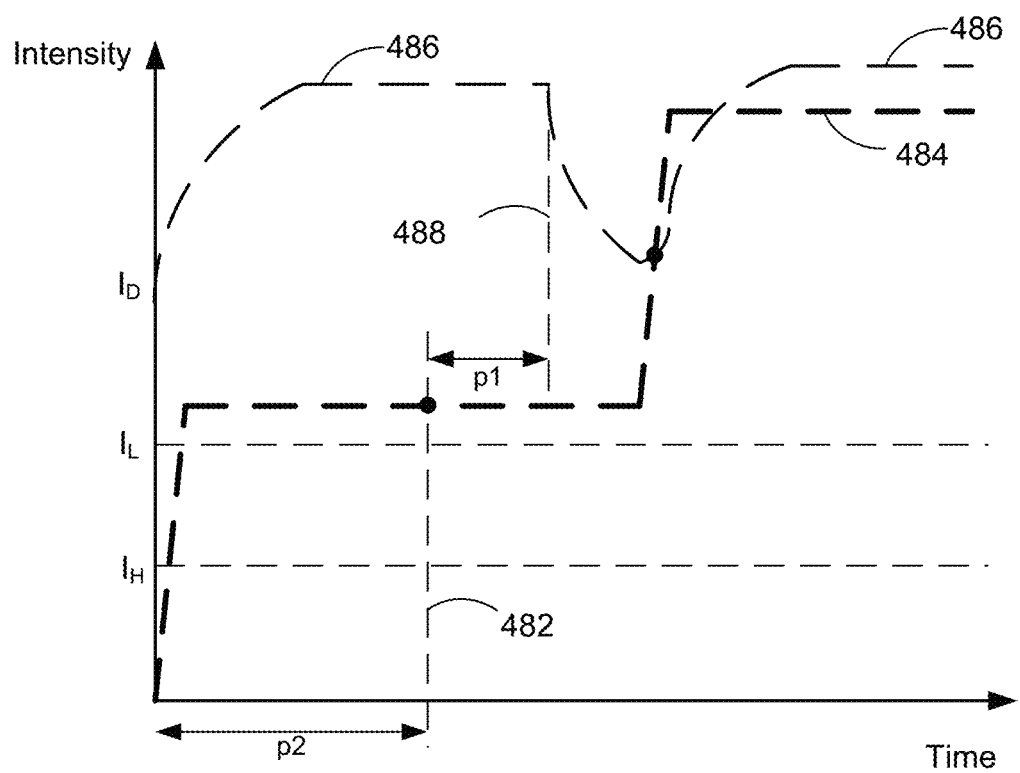

FIG. 3D illustrates another dynamic intensity threshold 486 (e.g., intensity threshold $I_D$). FIG. 3D also illustrates two other intensity thresholds: a first intensity threshold $I_H$ and a second intensity threshold $I_L$. In FIG. 3D, although touch input 484 satisfies the first intensity threshold $I_H$ and the second intensity threshold $I_L$ prior to time p2, no response is provided until delay time p2 has elapsed at time 482. Also in FIG. 3D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 3E:
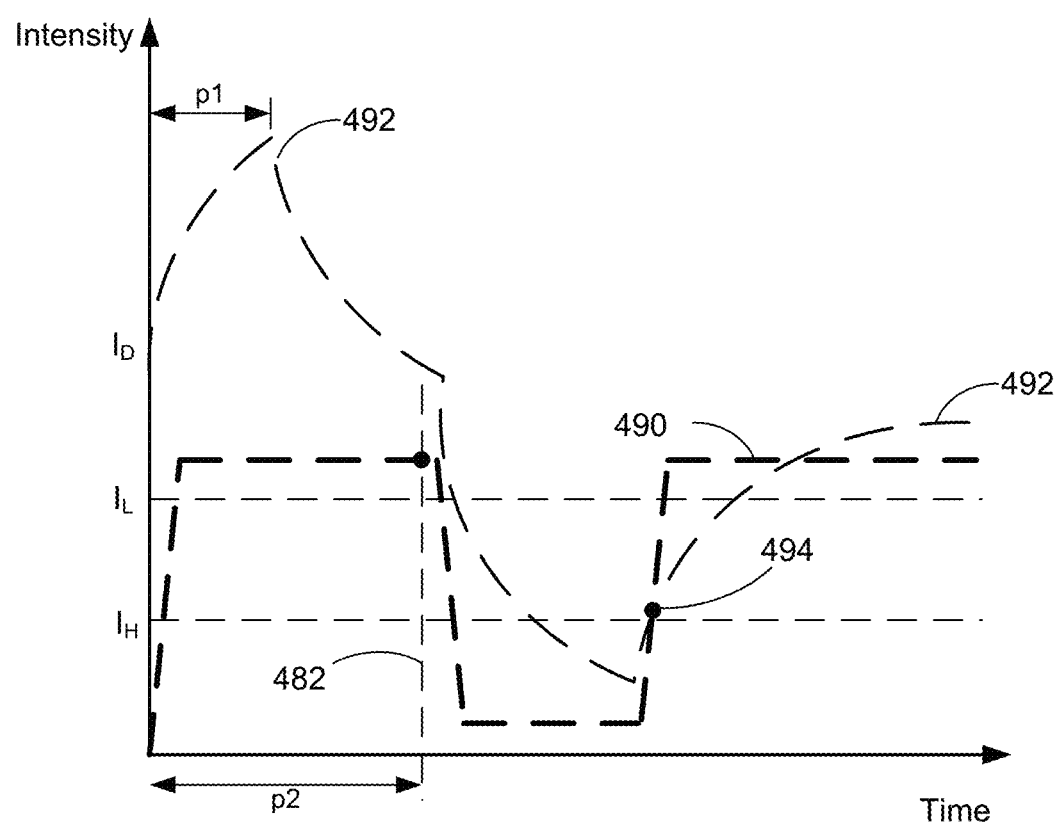

FIG. 3E illustrate yet another dynamic intensity threshold 492 (e.g., intensity threshold $I_D$). In FIG. 3E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UIs") and associated processes that may be implemented by portable computing system 100 (FIG. 1A) or desktop computing system 200 (FIGS. 2A-2D). In some embodiments, primary display 102 is implemented in display portion 110 of portable computing system 100 (FIG. 1A). Alternatively, in some embodiments, primary display 102 is implemented in peripheral display device 204 (FIGS. 2A-2D). In some embodiments, dynamic function row 104 is a touch-sensitive secondary display implemented in body portion 120 of portable computing system 100 (FIGS. 1A-1B). Alternatively, in some embodiments, dynamic function row 104 is a touch-sensitive secondary display implemented in peripheral keyboard 206 (FIGS. 2A-2B), first peripheral input mechanism 212 (FIG. 2C), or second peripheral input mechanism 222 (FIG. 2D).

FIGS. 5A-5AT are schematics of primary and secondary displays used to illustrate example user interfaces for customizing display modes for a secondary display and for interacting with a management user interface for the secondary display, in accordance with some embodiments. The user interfaces in these figures are used to illustrate the methods and/or processes described below, including the methods in FIGS. 6A-6D and 7A-7F. One of ordinary skill in the art will appreciate that the following user interfaces are merely examples. Moreover, one of ordinary skill in the art will appreciate that a different layout with additional or fewer affordances, user interface elements, or graphics may be used in practice.

FIG. 5A illustrates primary display 102 displaying a user interface 516 that allows a user to associate various display modes for a touch-sensitive secondary display (also referred to herein as a "touch bar"), to select which touch bar display modes are available, and to create new touch bar display modes. In this description, the user interface 516 is referred to as a touch-bar management user interface.

FIGS. 5A-5AT also illustrate that a biometric sensor 105 (e.g., a fingerprint sensor 105) can be positioned adjacent to the touch-sensitive display 104 in certain embodiments. This biometric sensor 105 may be included within a same housing that at least partially contains the secondary display 104 and a set of keyboard keys 106.

As is explained in more detail below, at various points in time, there may be different display modes for the touch bar that are available for use system-wide (referred to as "available display modes" or "available touch bar display modes") based on which checkboxes are checked within the touch-bar management user interface (e.g., checkboxes 522 to 532 in user interface 516, FIG. 5A), one of these available display modes will be a current system-wide default display mode (referred to as the "system-wide default display mode") that is set based on a system default setting or based on an explicit request to change the system-wide default display mode, and respective applications may each be associated by a user with one of the available display modes (e.g., using the user interface portion 520, FIG. 5A). In some embodiments, the system default setting for the system-wide default display mode is an adaptive display mode in which user interface elements are displayed within the touch bar based on a current state of a user interface that is in focus on the primary display, and this system default display mode setting may be changed to define a new system-wide default display mode by providing a mode-switching input (e.g., by pressing a function key at a keyboard) and selecting the new system-wide default display mode (e.g., a user can toggle between display modes on the secondary display).

For ease of explanation, some of the FIGS. 5A-5AT indicate a display mode in which the secondary display 104 is currently operating. For example, FIG. 5AI has a parenthetical next to reference numeral 104 to indicate that the secondary display 104 is currently operating in a workflows/macros display mode. Other of the FIGS. 5A-5AT include similar explanatory parentheticals.

In FIG. 5A, a first portion 518 of the touch-bar management user interface 516 allows a user to select the available display modes. Selecting a checkbox within this first portion 518 causes an associated touch-bar display mode to be included with the available display modes, which ensures that the associated touch-bar display mode is available system-wide for any application that is compatible with the associated touch-bar display mode. For example, as pictured in FIG. 5B, selecting the checkbox 522 using an input 538 causes the "dynamic app controls" touch-bar display mode to be made available system-wide for use with compatible applications (i.e., any application that supports use of the dynamic app controls display mode by exchanging information with an operating system to allow for dynamic updating of affordances displayed with the secondary display as a state of the application changes).

FIG. 5A also shows that the touch-bar management user interface 516 includes a second portion 520 adjacent to the first portion 518, the second portion 520 allows a user to associate individual applications with a particular touch bar display mode of the available touch bar display modes (e.g., only those display modes for which an associated checkbox has been checked within the first portion 518 are available to be associated with applications). As to creation of new touch bar display modes, such functionality is offered by selecting the button 534 that, when selected, initiates a process for creating a new touch bar display mode (as is explained in more detail below).

In some embodiments, one or more of the checkboxes shown in the first portion 518 may be greyed-out, such that the system always ensures that at least one display mode will be available for the touch-sensitive secondary display 104 (e.g., this prevents users from disabling all display modes for the secondary display 104). As an example, in some embodiments, the checkbox 522 is greyed-out, so that users are unable to deselect the dynamic app controls display mode. As another example, in some embodiments, the checkbox 532 is greyed-out, so that users are unable to deselect the function keys display mode. In some other embodiments, both of the checkboxes 522 and 532 are greyed-out.

Figure 5B:
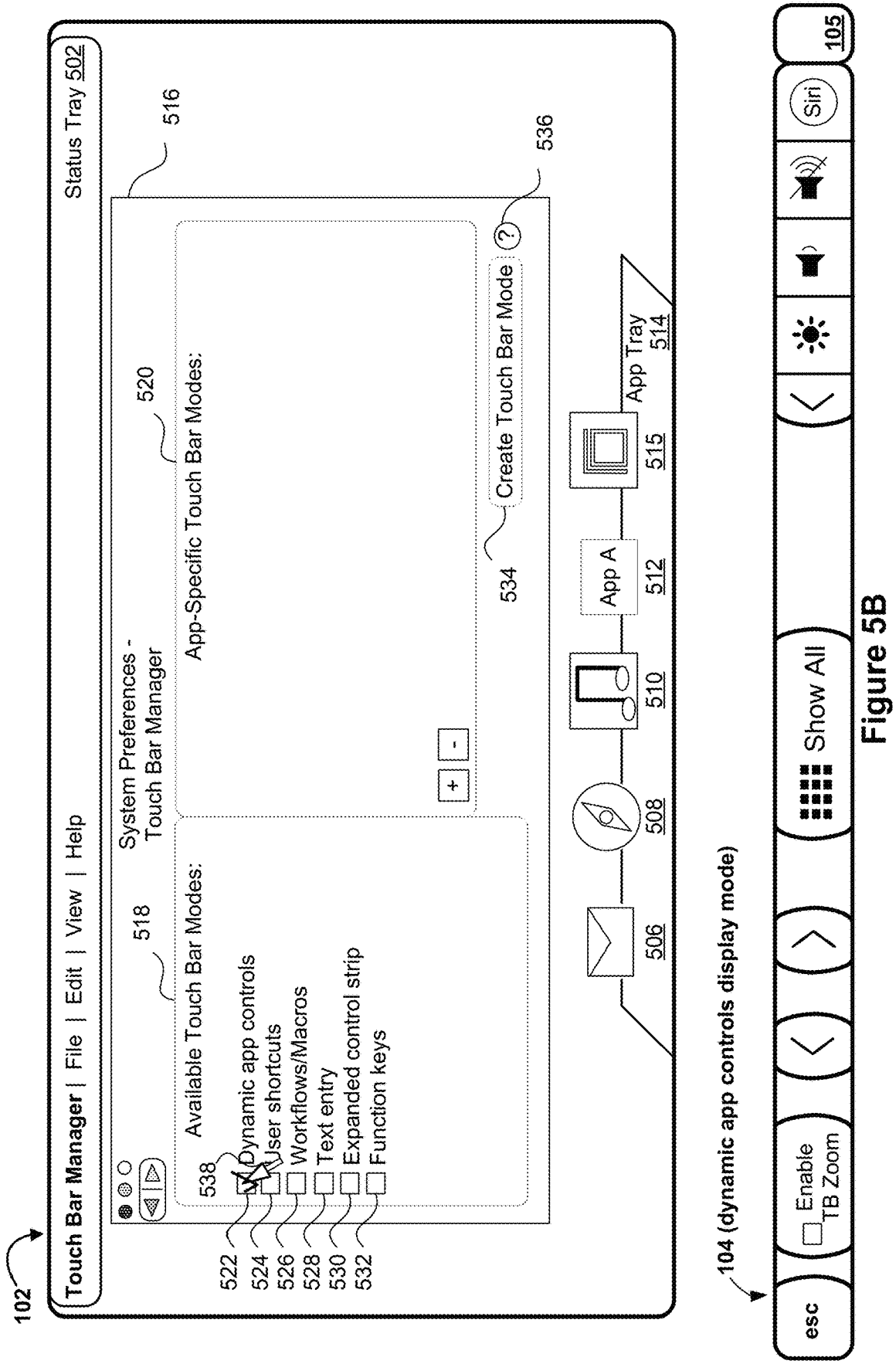
Figure 5C:
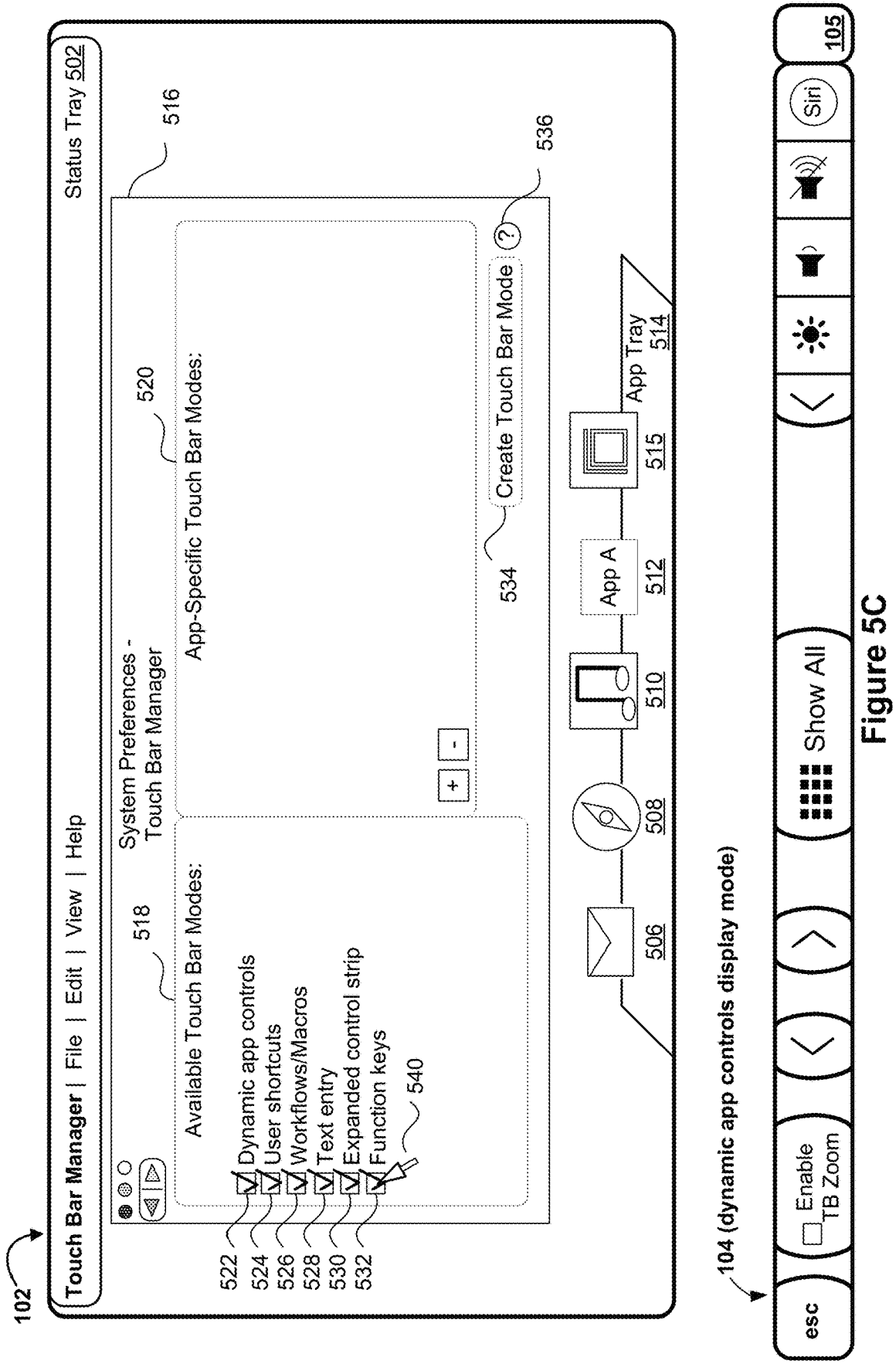
Figure 5D:
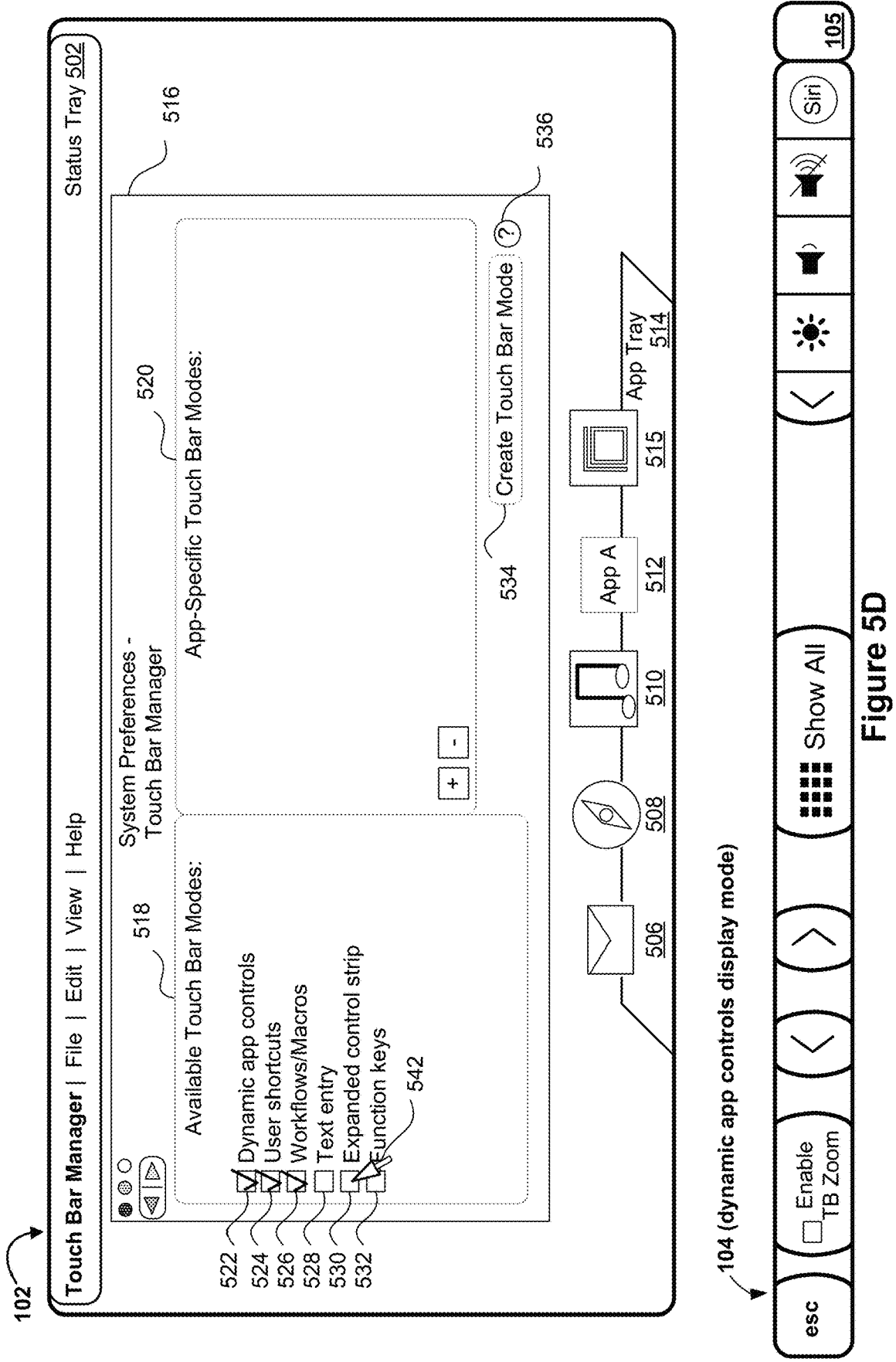
Figure 5D:

FIG. 5B shows an example of a user selecting as an available display mode a single touch bar display mode by checking checkbox 522 using user input 538. Next, FIG. 5C shows that the user has selected all checkboxes 522, 524, 526, 528, 530, and 532 thereby causing each of the touch bar display modes associated therewith to added as available display modes. FIG. 5D also shows that a user can un-check certain checkboxes (checkboxes 528, 530, and 532 in the example illustrated in FIG. 5D have been un-checked using a series of inputs 542) to remove the display modes associated therewith from being included as available display modes (e.g., "text entry," "expanded control strip," and "function keys" display modes are removed from being available system-wide in the example of FIG. 5D).

Figures 1, 5E:
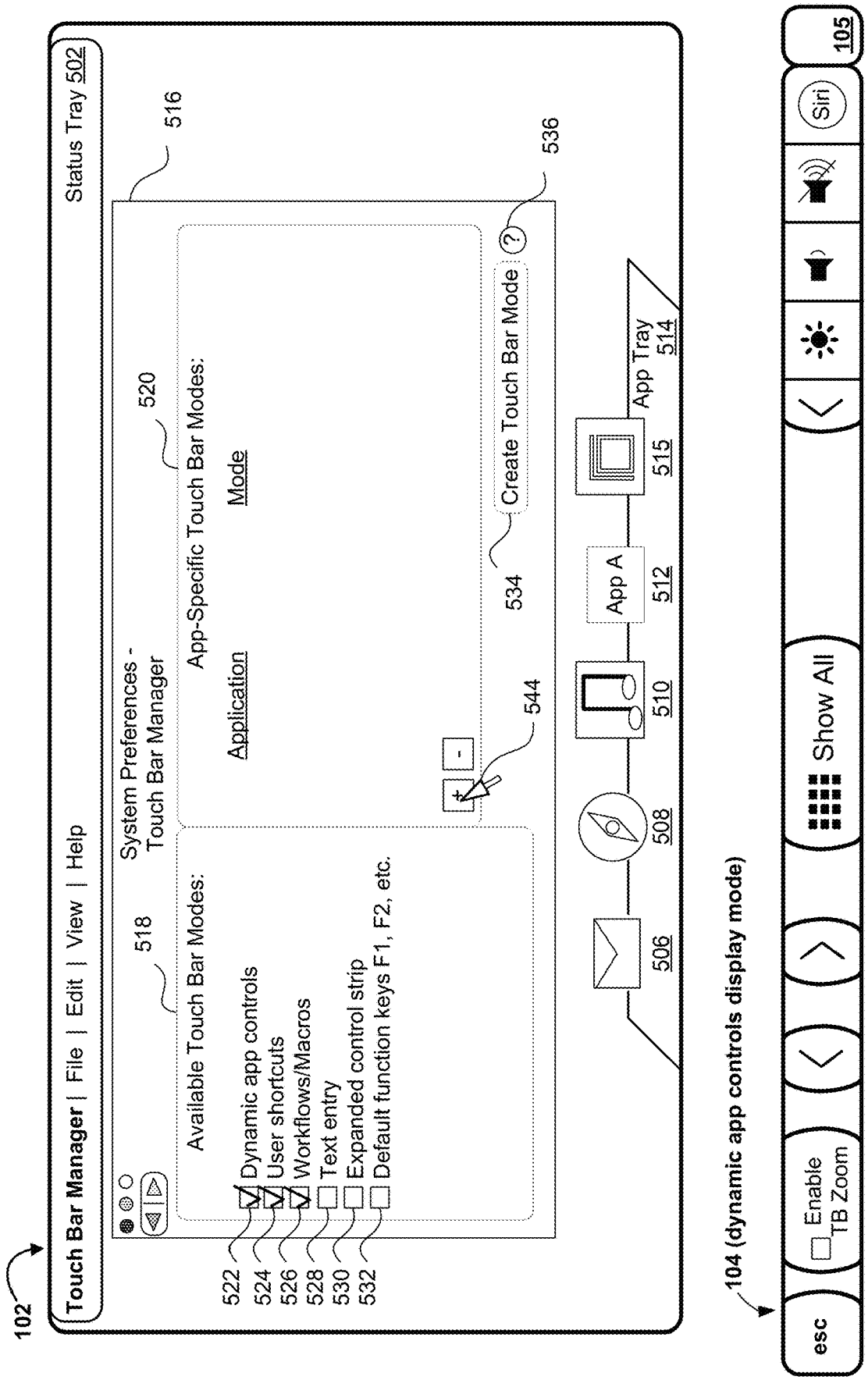
Figures 2, 5E:
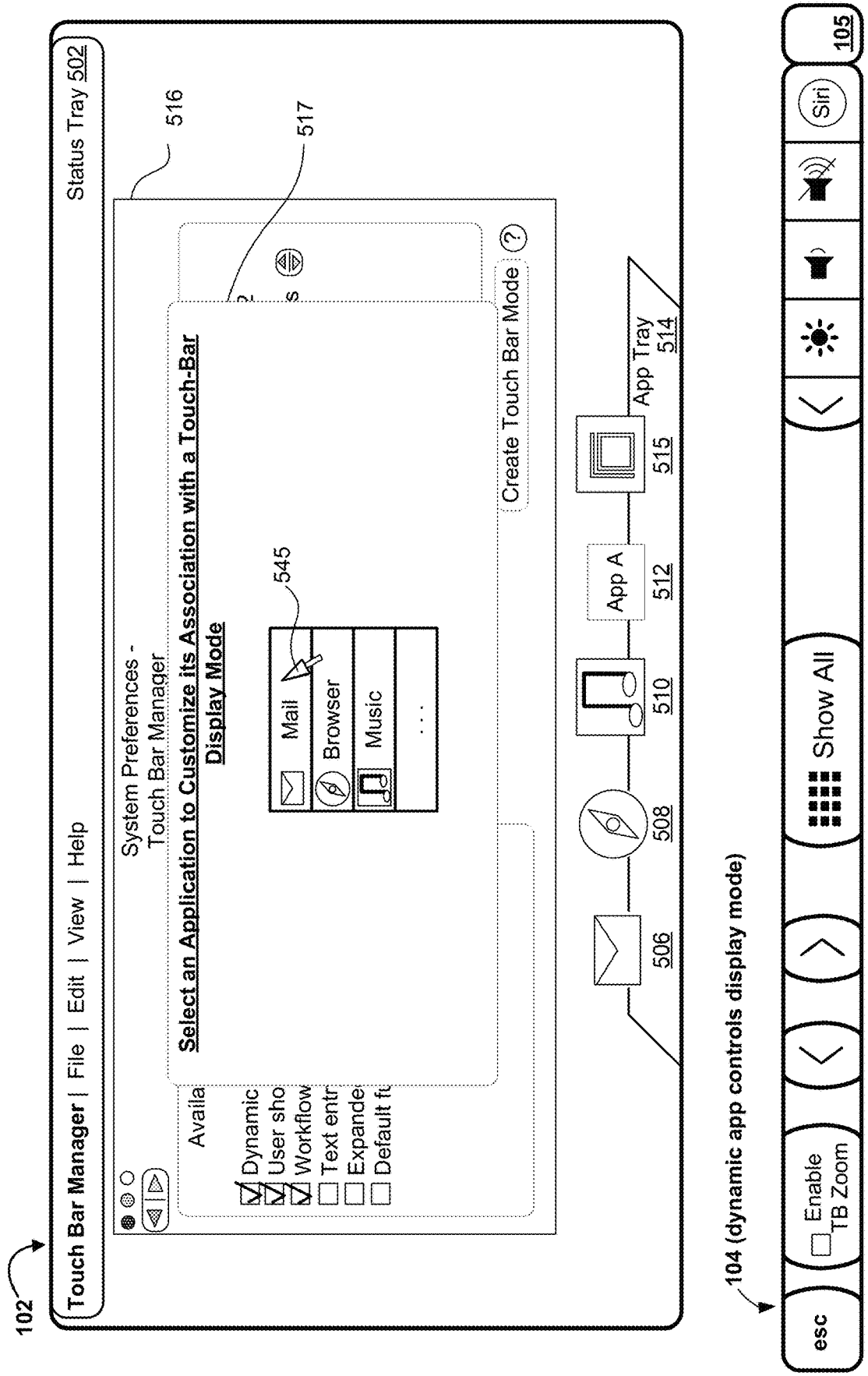

Turning to FIG. 5E-1, the user has selected, using input 544, the "+" affordance shown within second portion 520 of the touch-bar management user interface. In response to this selection, an overlay window 517 is displayed on the primary display 102, as is shown in FIG. 5E-2. The overlay window 517 allows the user to select an application, which is then included within the second portion 520 of the touch-bar management user interface 516. For example, as shown in FIG. 5E-2, the user selects, using input 545, a user interface element associated with a Mail application from within the overlay window 517.

Figures 3, 5E:
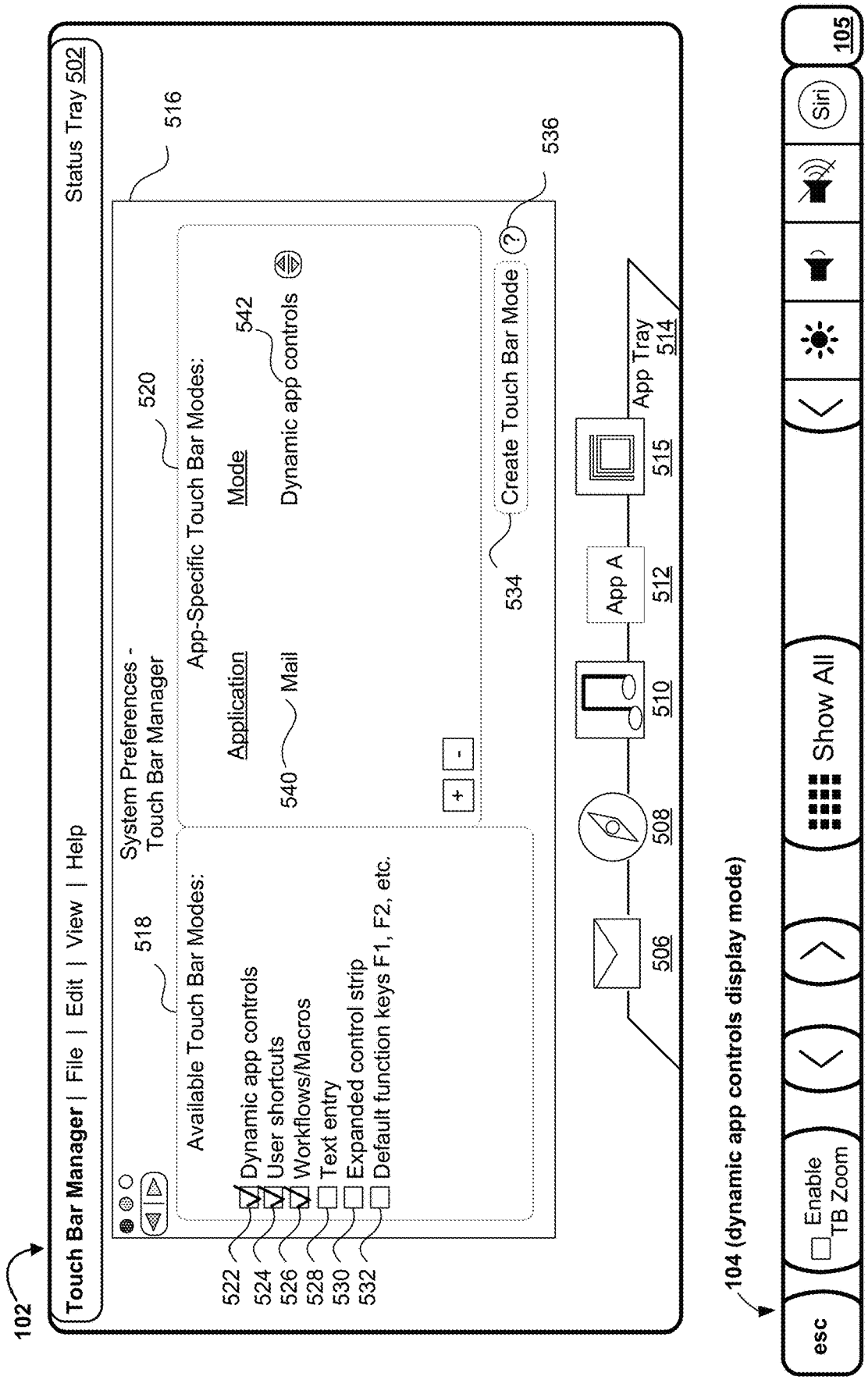

Then, FIG. 5E-3 shows that the mail application is included within the second portion 520 of the touch-bar management user interface, along with either no display mode (i.e., it still needs to be selected by the user) or a default display mode with which the mail application is now associated. For example, as shown in FIG. 5E-3, the default display mode is dynamic app controls, and that default mode is now associated with the mail application (in some other embodiments, discussed below in reference to FIGS. 5T-1 to 5T-4, users may choose a display mode to associate with the selected application directly within an alternative implementation of the overlay window 517). The association between the mail application and the dynamic app controls display mode ensures that when the mail application is opened, the secondary display is also operated in the dynamic app controls display mode.

Figure 5F:
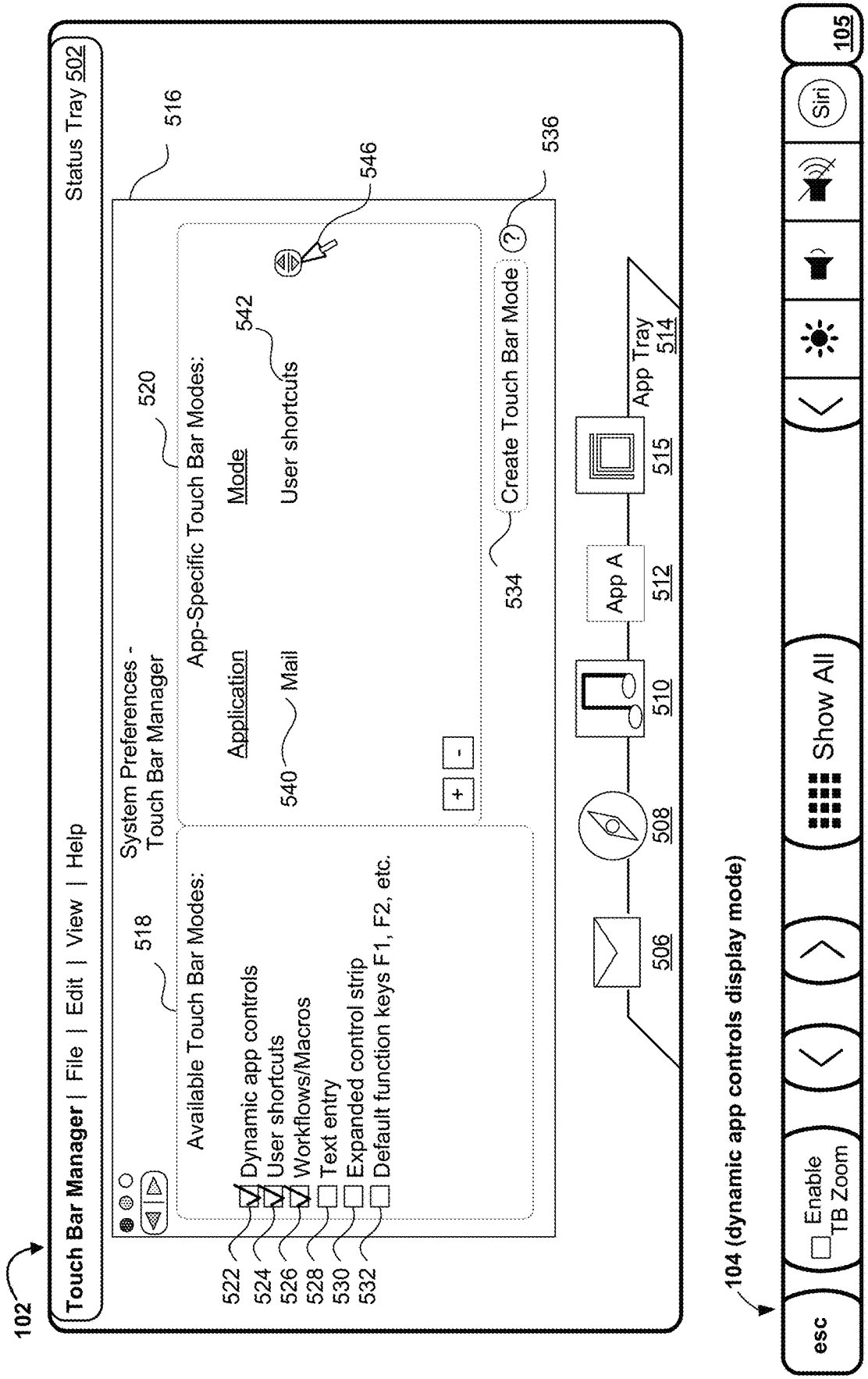

Users are also able to easily switch which display mode is associated with each of the applications that are included within the second portion 520. For example, as shown in FIG. 5F, the user is able to provide input 546 at the downward pointing caret icon, which then causes the display mode to change to a user shortcuts display mode instead of the previously-associated dynamic app controls display mode.

Figure 5G:
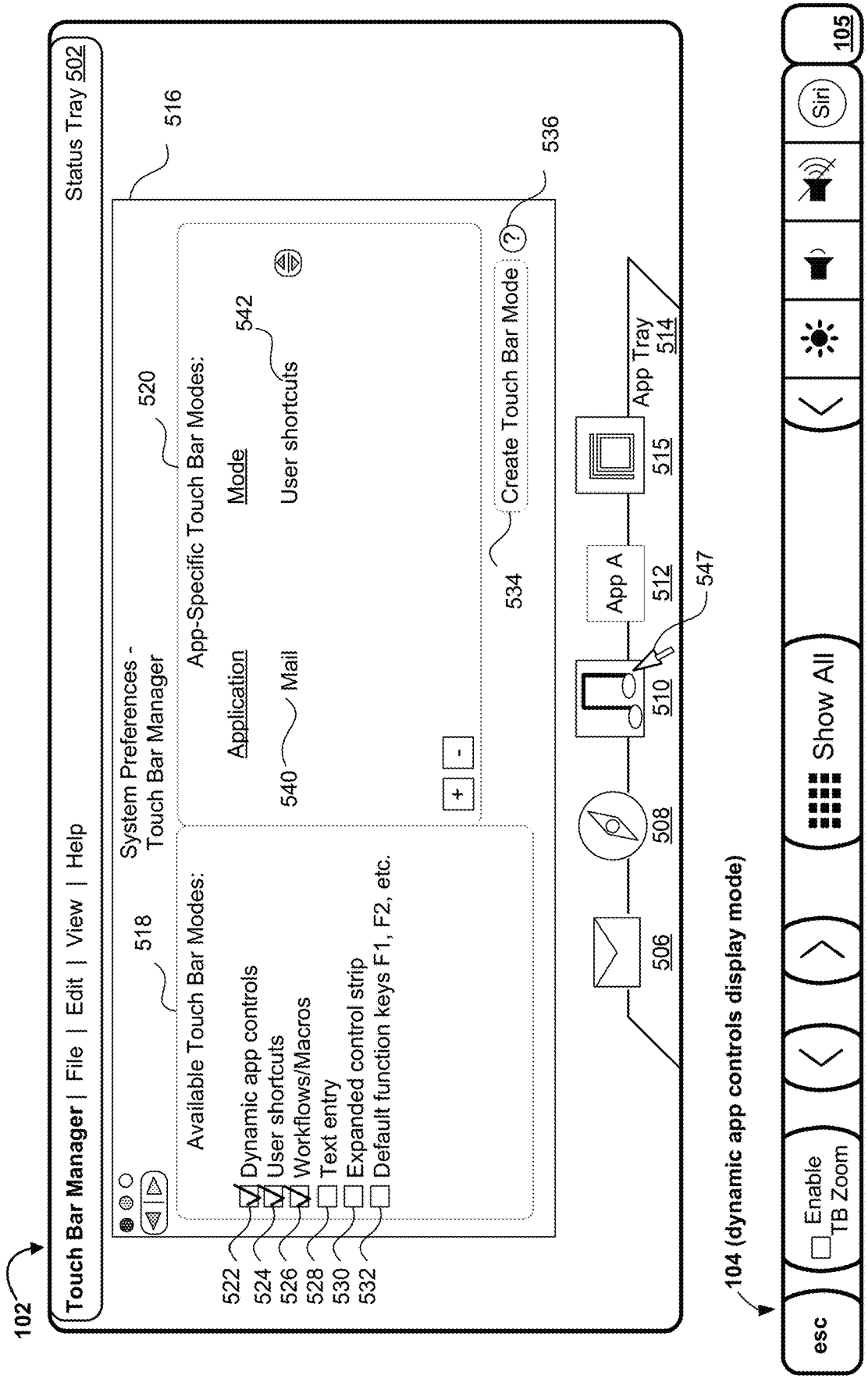

FIG. 5G illustrates that a user input 547 is provided at an affordance 510 associated with an application that has not been associated with any individual display modes (in this example, a music player application). In response to this input, in FIG. 5H, the music player application 548 is displayed on the primary display 102. In conjunction with displaying the music player application 548, the secondary display 104 continues to operate in the dynamic app controls mode (the music player application has not been individually associated with a touch-bar display mode, so the current system-wide default display mode is used), in which at least a portion of the secondary display 104 is updated to display application-specific affordances for the music player application (e.g., the secondary display 104 now displays affordances for "Album A," Album B," and "Party Shuffle," each of which controls functions available within the music player application.

Figure 5H:
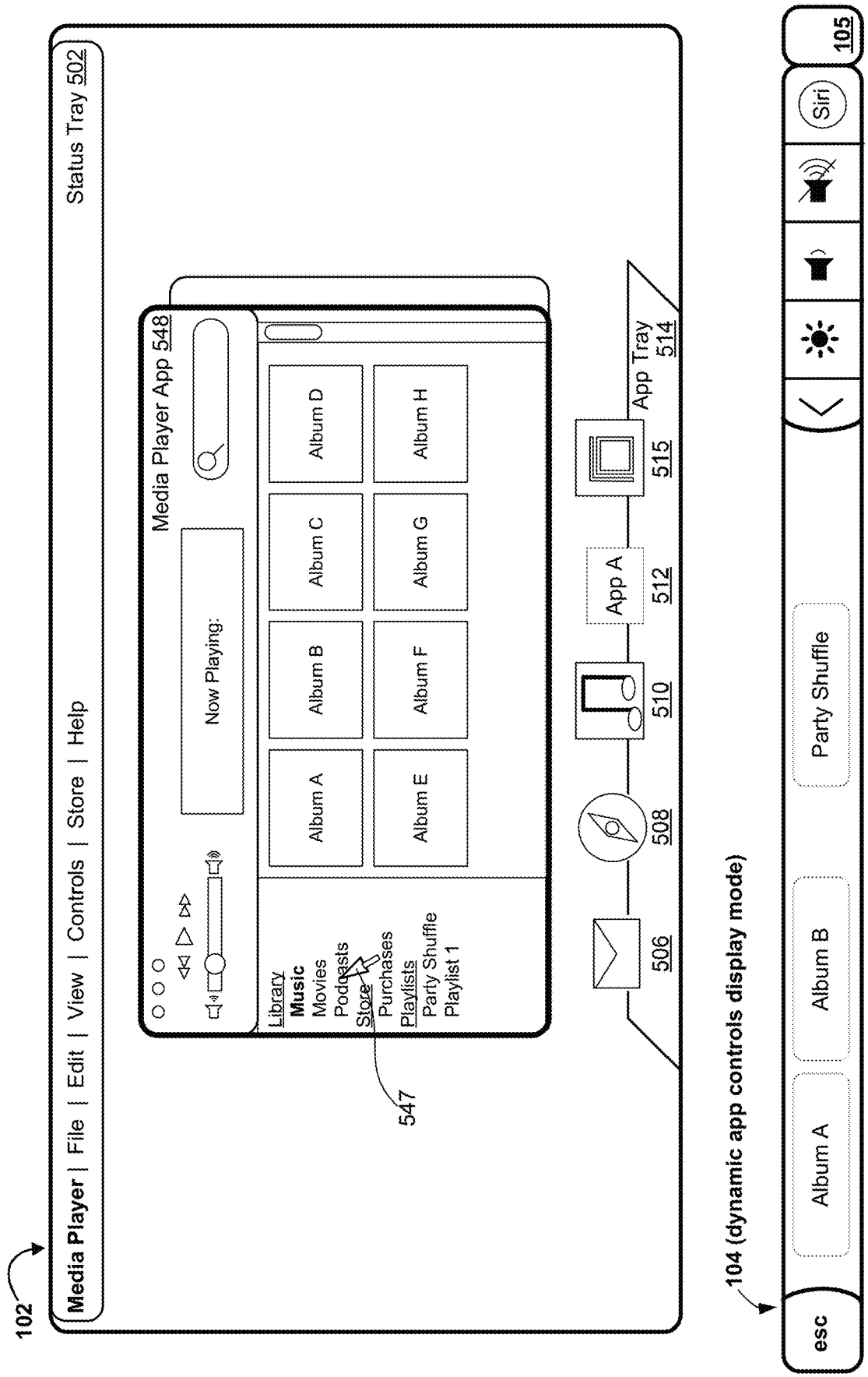

In FIG. 5H, the user has also selected "Podcasts" (using input 547) to switch which library is displayed within the music player application. In response to the input 547, Figure SI shows that the music player application displayed on primary display 102 has been updated to show representations of various podcasts and the touch-sensitive secondary display 104 has been updated to display affordances associated with at least some of these representations. In other words, because the secondary display 104 is operating in the dynamic app controls display mode, the affordances displayed within the secondary display 104 change as a state of the user interface displayed on the primary display 102 changes.

As discussed herein, some users prefer to have display modes for the touch-sensitive secondary display 104 that do not change based on the application's (or an associated user interface's) state. As such, the embodiments described herein allow users to associate certain applications with persistent display modes for the touch-sensitive secondary display, and also allow users to easily switch between adaptive (e.g., a mode like the dynamic app controls mode discussed above) and persistent display modes (e.g., a mode like the user shortcuts display mode discussed below).

Figure 5I:
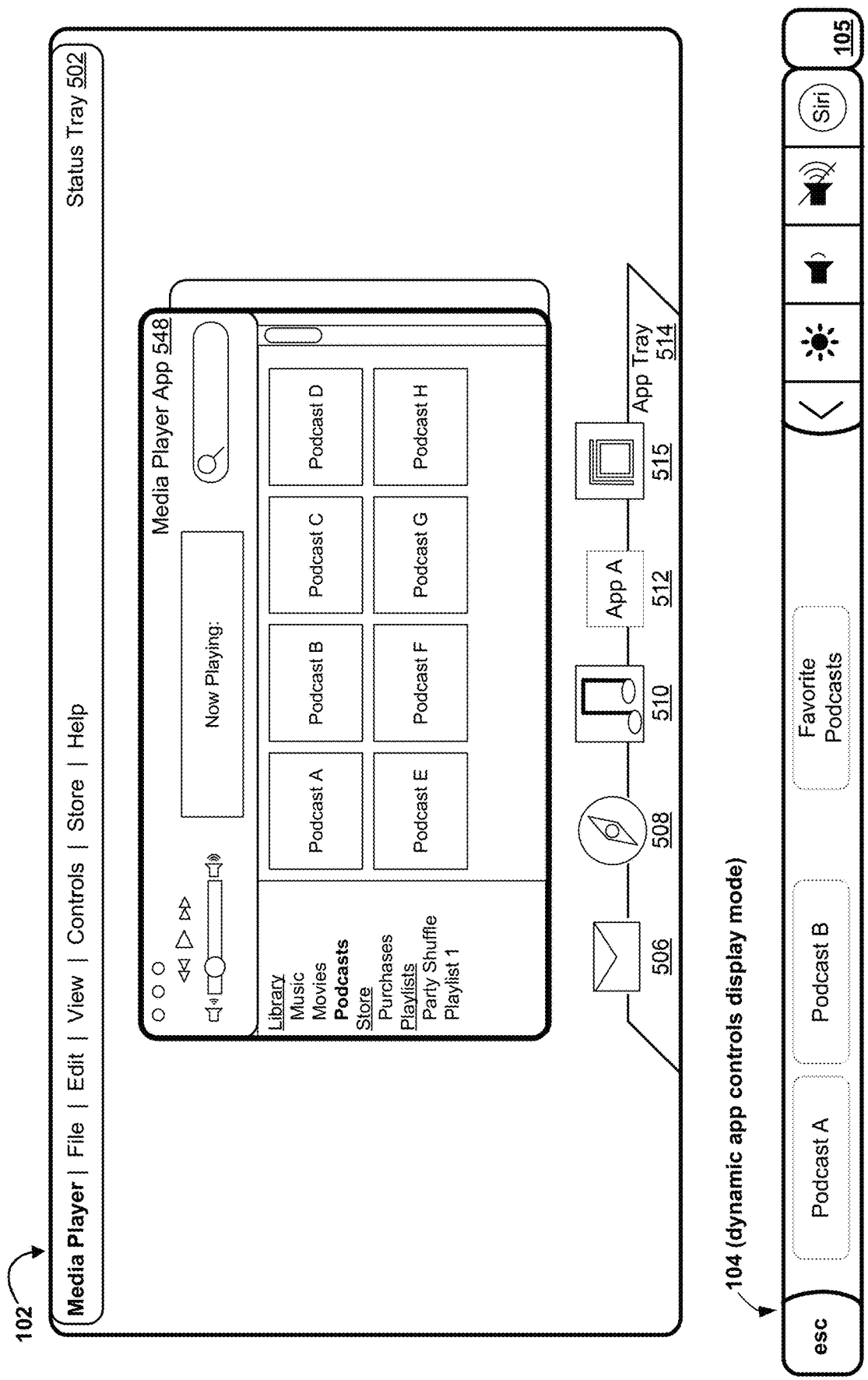
Figure 5J:
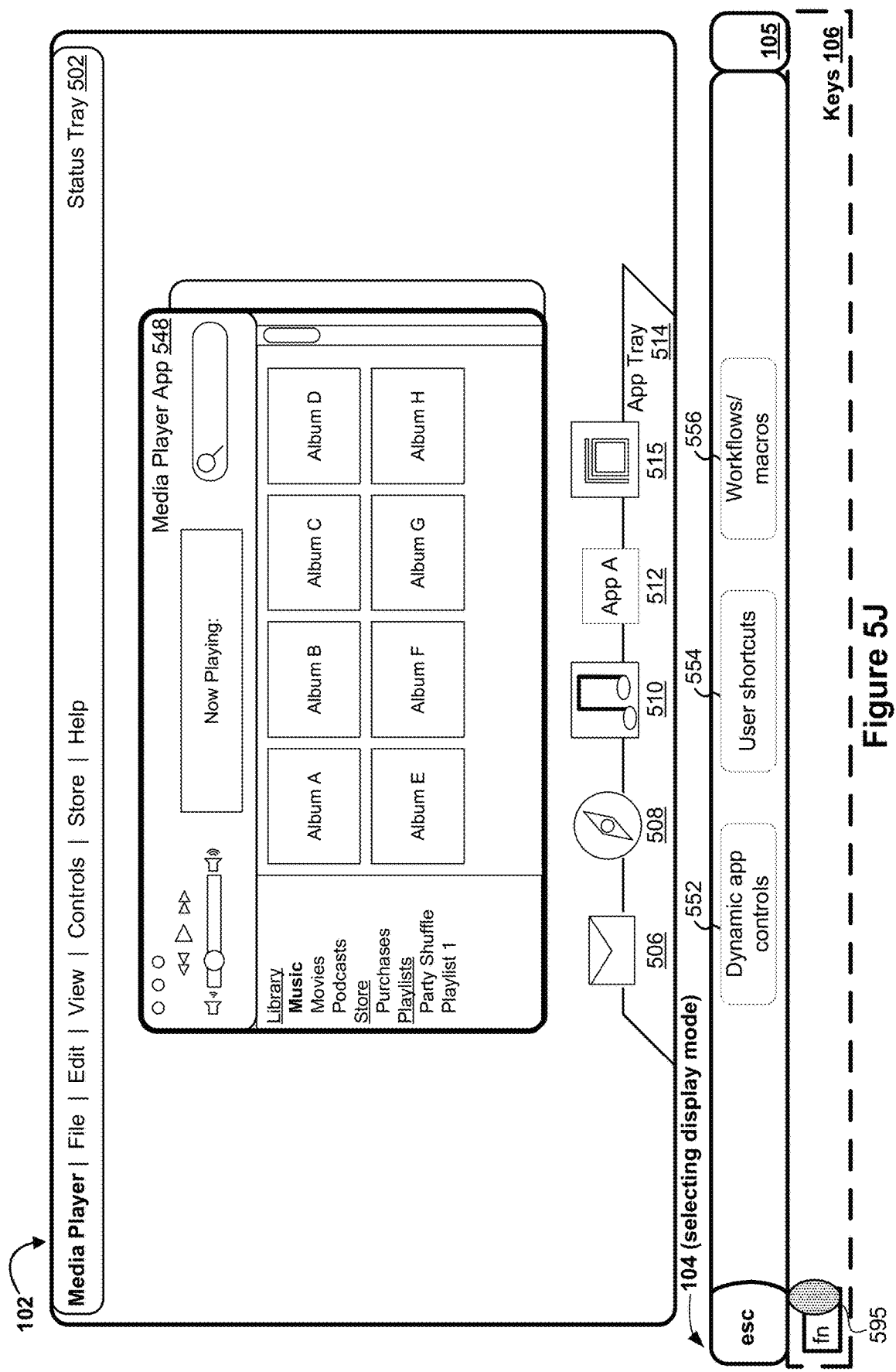
Figure 5K:
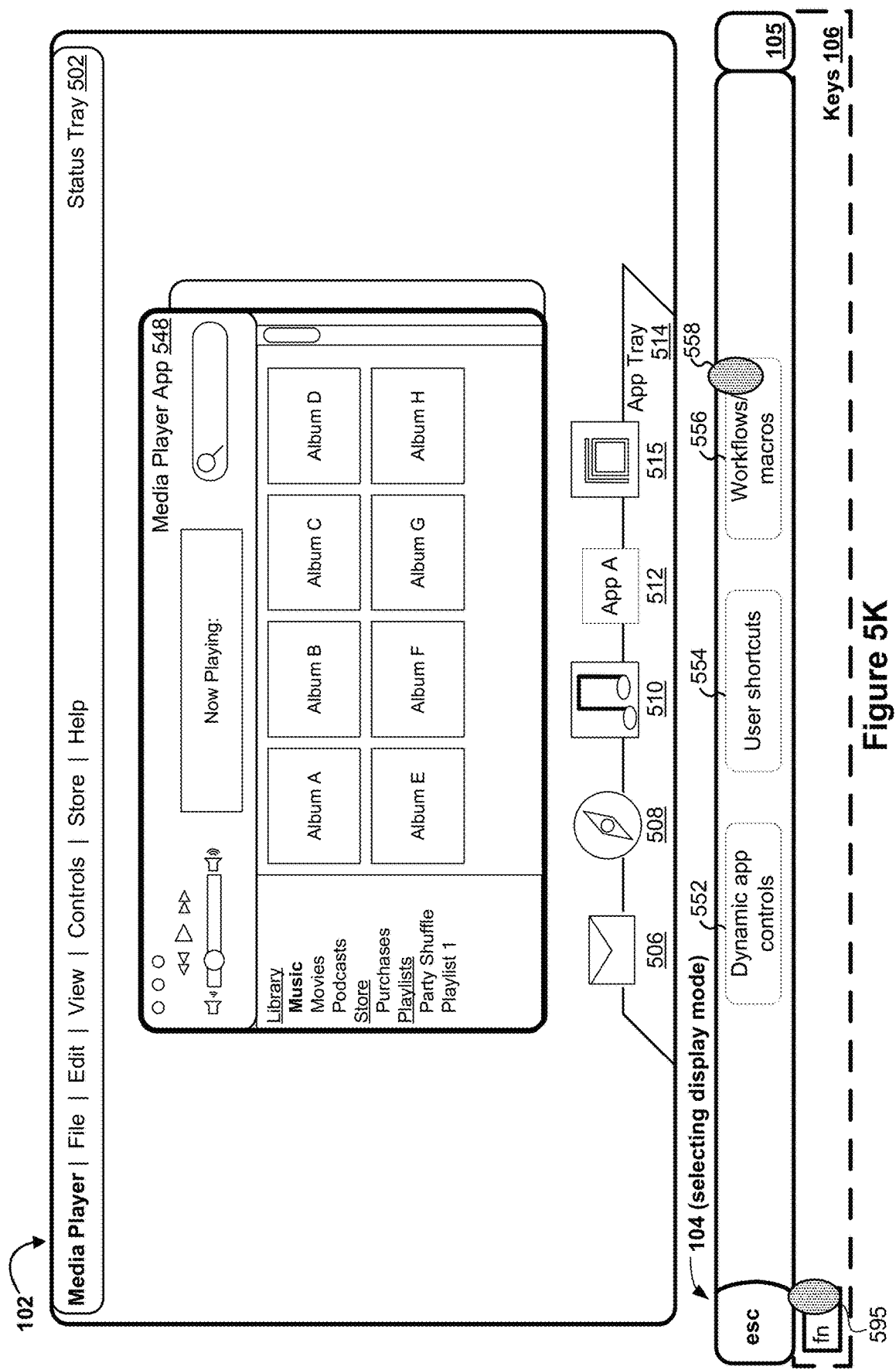
Figure 5L:
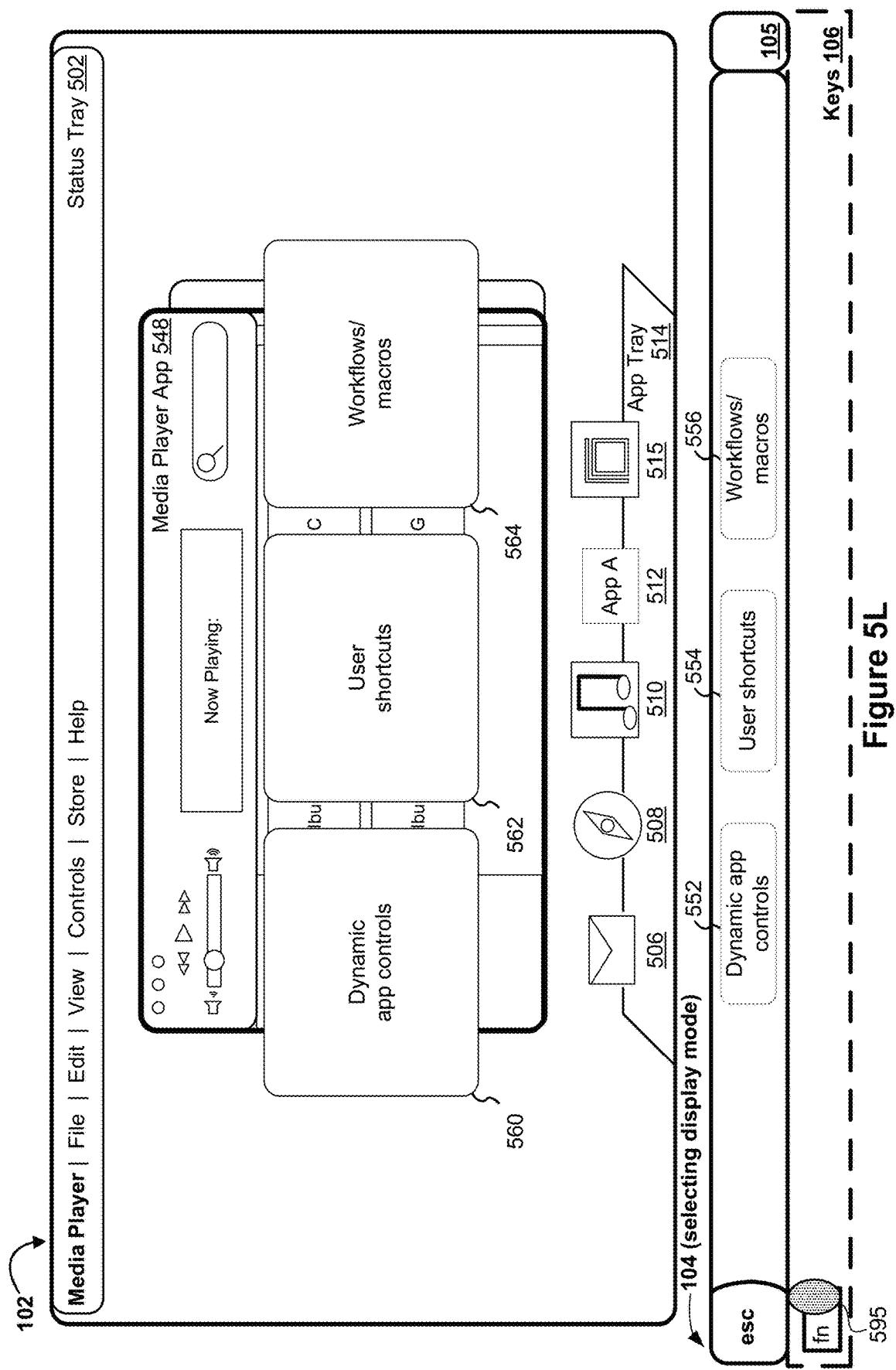
Figure 5M:
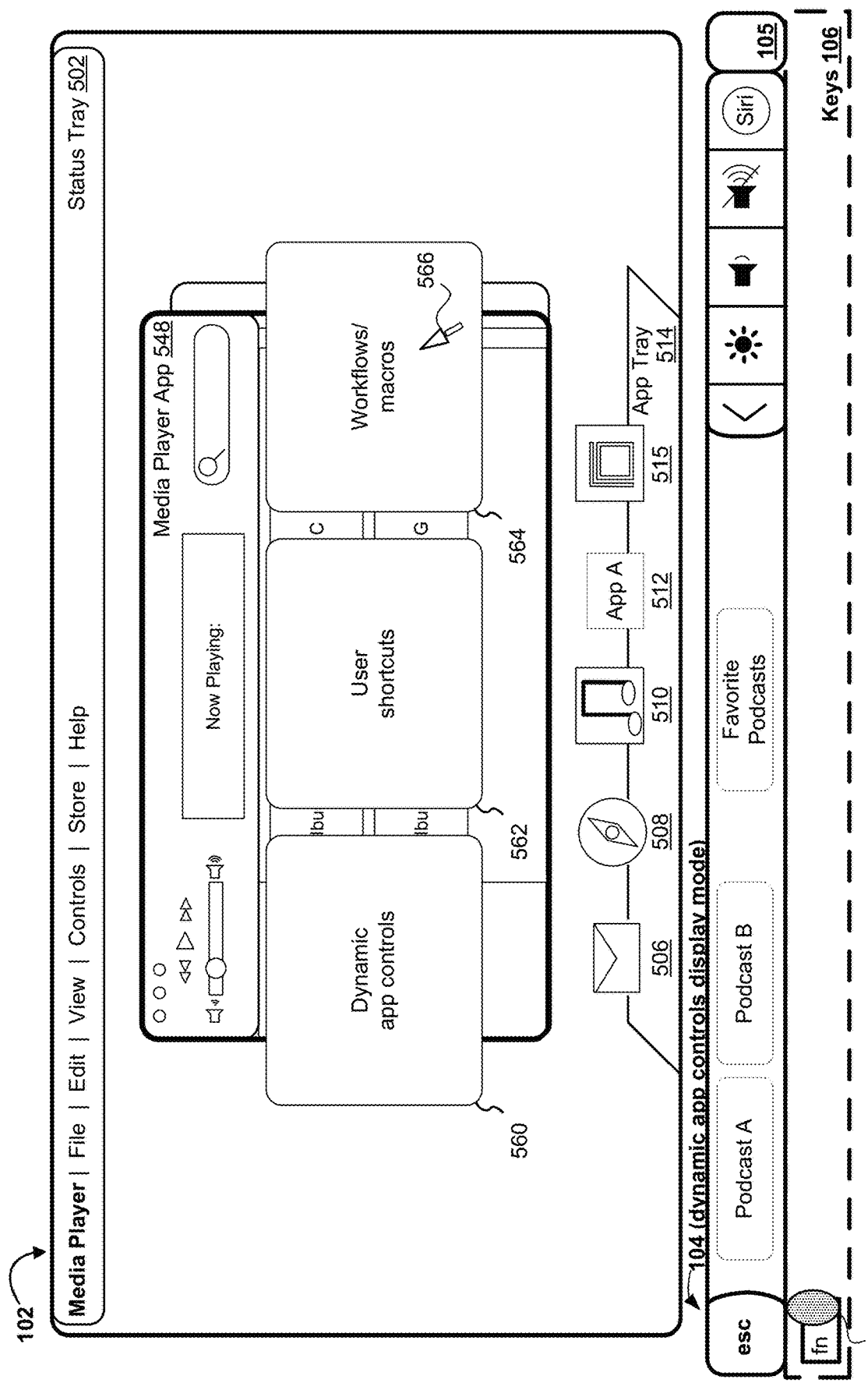

In FIG. 5J, the user has provided a mode-switching input the causes selectable options 552, 554, 556 for each available display mode for the secondary display to be displayed (either on the secondary display 104, as shown in FIG. 5J-5K, on the primary display 102 as shown in FIG. 5M, or on a combination of both displays as shown in FIG. 5L). For example, in some embodiments, the mode-switching input (e.g., input 595) is a press of a function key on a keyboard (e.g., a keyboard with keys 106 that is located adjacent to the touch-sensitive secondary display) and, in response, selectable options for each of the available display modes are then displayed.

Turning to 5K, while the mode-switching input is still being provided (e.g., input 595 at the illustrated function key of the keys 106, FIG. 5K), the user then selects one of the selectable options for the available display modes, e.g., the selectable option 556 for the workflows/macros display mode, using input 558, as is shown in FIG. 5K. In embodiments in which the available options are displayed on the primary display (alternatively or in addition to the display on the secondary display), then the user can also select one of the selectable options on the primary display (e.g., selecting selectable option 564 using input 566, as is shown in FIG. 5M).

In response to the mode-switching input and to selection of one of the selectable options, the secondary display is then switched to operate in the selected new display mode (e.g., the workflows/macros display mode in the present example) and the selected new display mode replaces the dynamic app controls mode as the current system-wide default display mode for the touch-sensitive secondary display. For example, in FIG. 5N, the secondary display 104 is switched to operate in the workflows/macros display mode. As pictured, the workflows/macros display mode includes a first user interface element 5602 that, when selected, causes the system to execute an associated workflow (e.g., to take a screenshot of the primary display and to then attach that screen to an email, all in response to one click at the user interface element 5602); a second user interface element 5604 that, when selected, causes the system to execute an associated workflow (e.g., to save a current window to file and to place that saved file on the desktop, all in response to one click at the user interface element 5604).

Figure 5N:
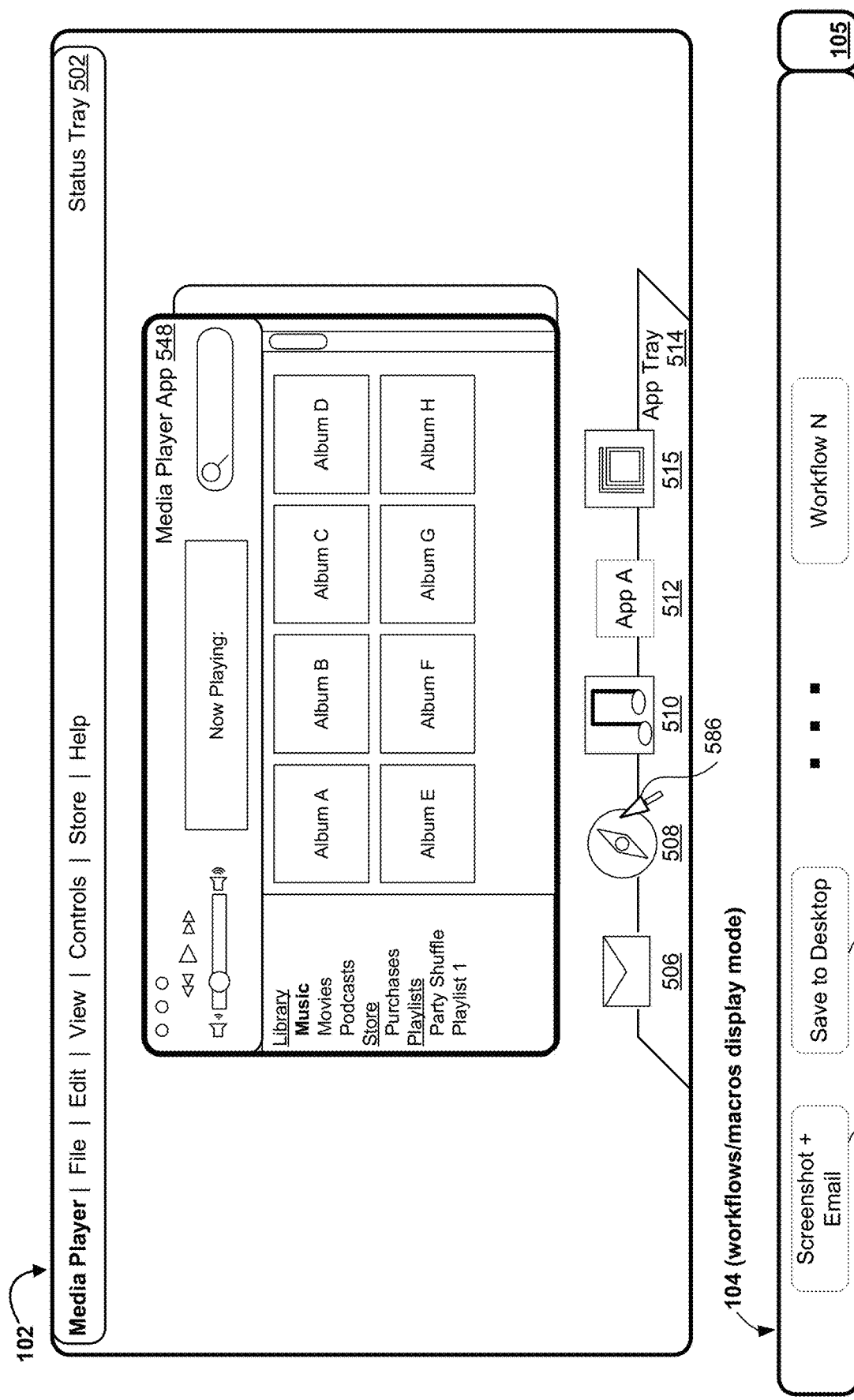
Figure 5O:
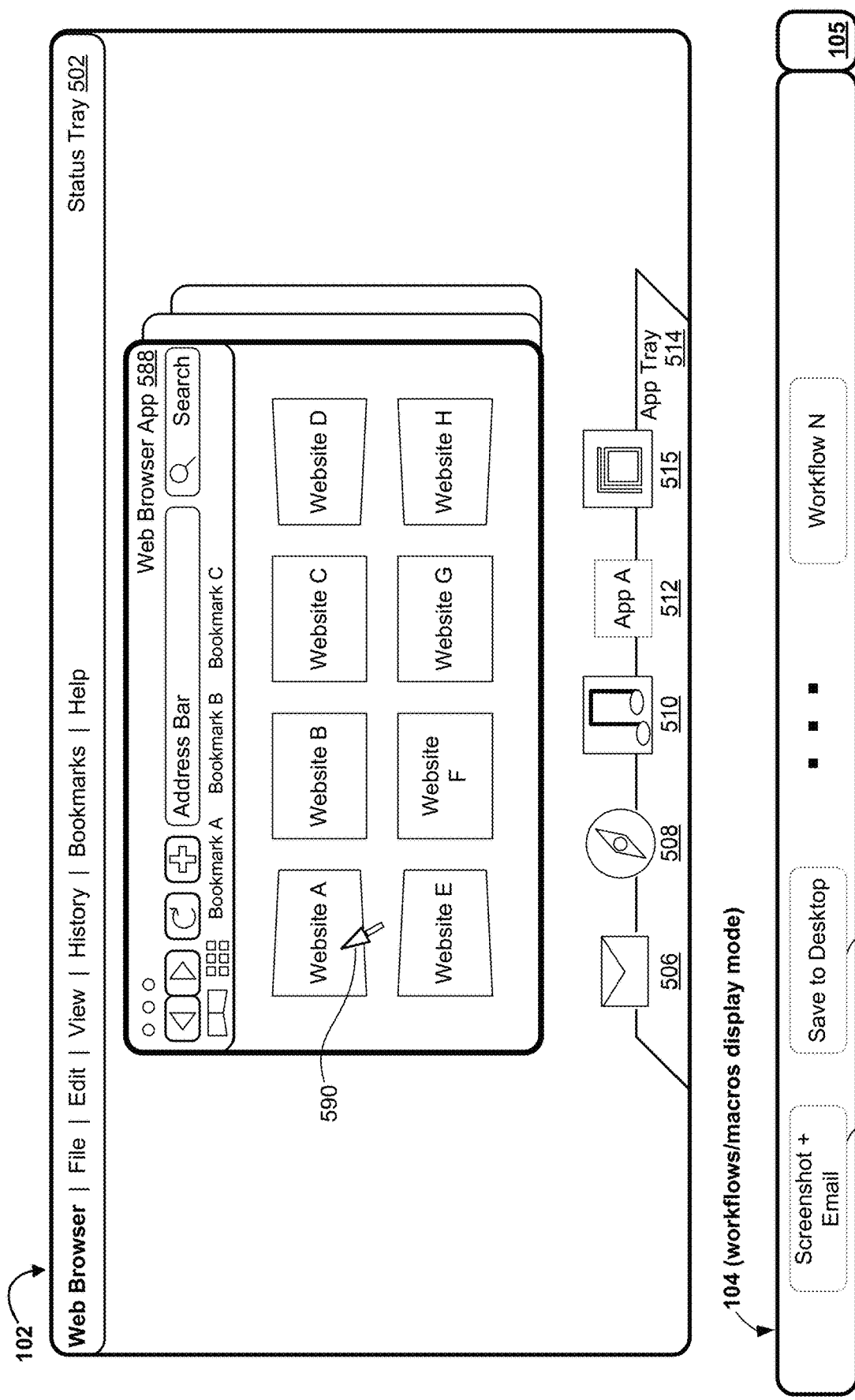
Figure 5P:
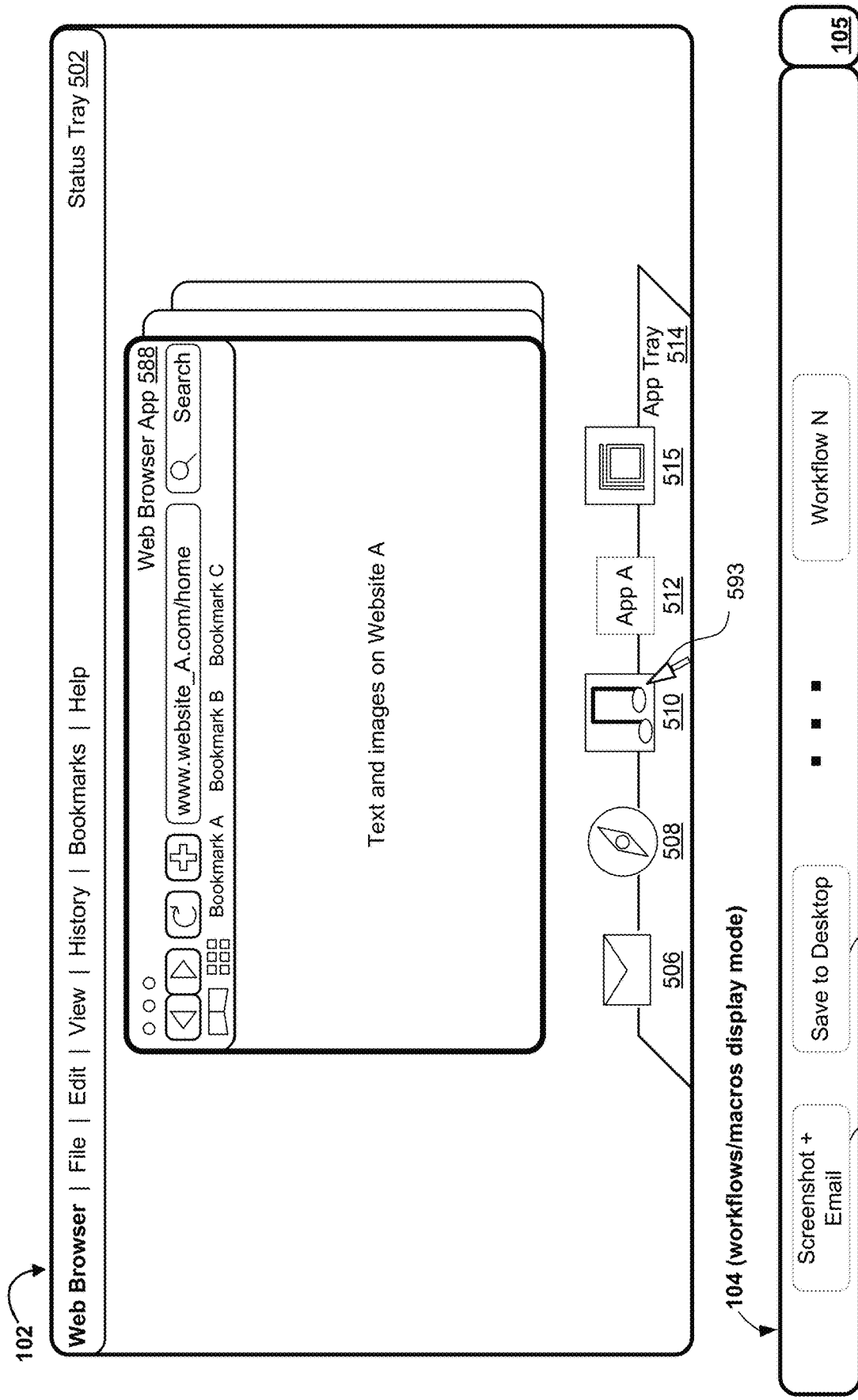

As shown in FIGS. 5N-5P, the user may then provide inputs at the primary display and the secondary display will continue to operate in the workflows/macros display mode until the user either changes the current system-wide default display mode or the user switches to an application that has been associated with some other display mode. For example, in FIG. 5N, the user provides input 586 selecting a web browser icon and, in response, the primary display is updated to display a user interface for the web browser application (FIG. 5O) and the secondary display still continues to operate in the workflows/macros display mode. Additionally, users may provide inputs within individual applications and the touch bar will continue to operate in the workflows/macros display mode (e.g., as shown in FIG. 5P, the user provides an input 590 to open a Website A and, in response, the primary display is updated to display content for website A and the secondary display 104 continues to operate in the workflows/macros display mode).

Figure 5Q:
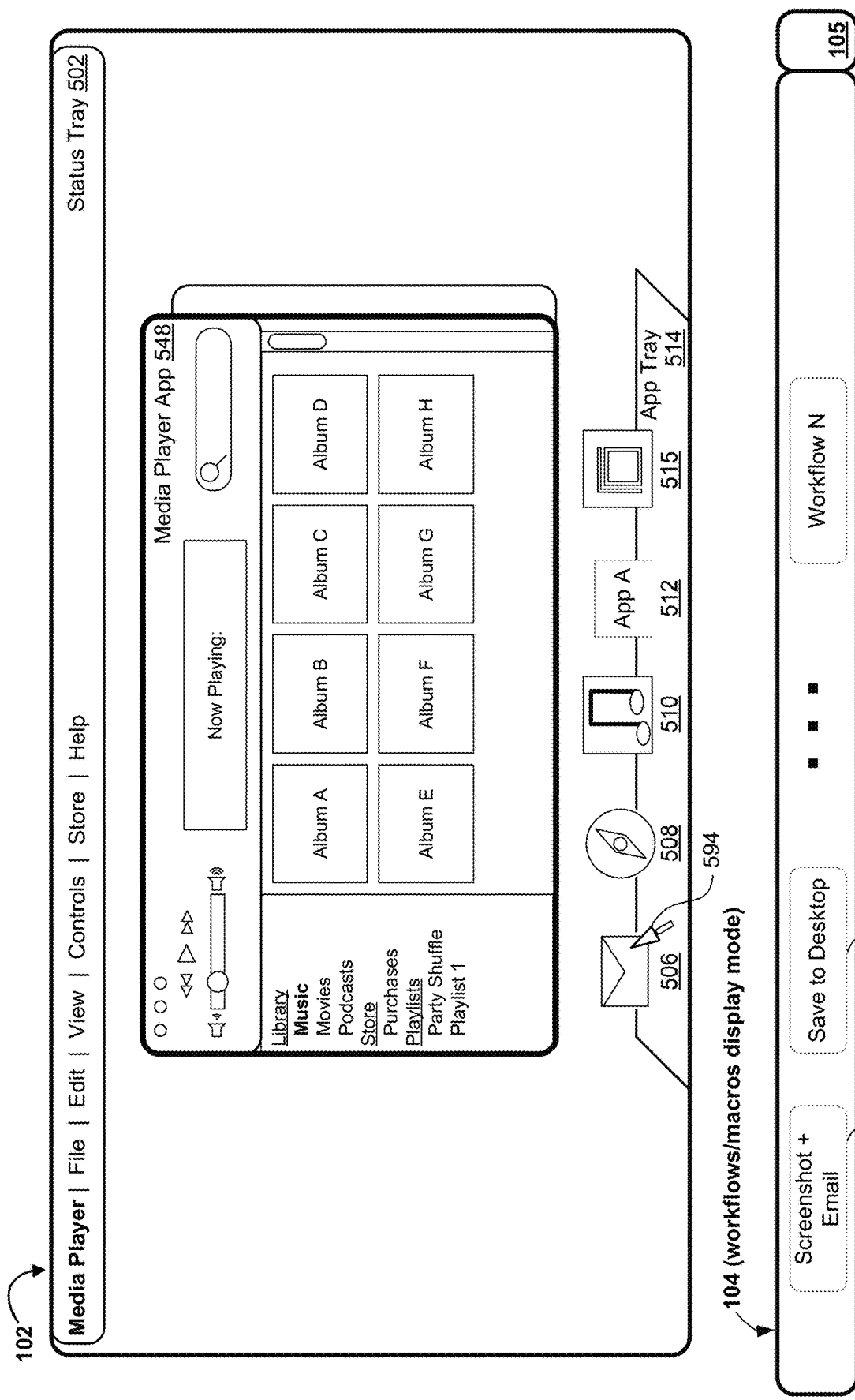

Similarly, the user may also switch back to the music player application (e.g., by providing input 593 at the primary display) and the secondary display will continue to operate in the text entry display mode (FIGS. 5P-5Q).

In this way, users are able to quickly switch to a desired display mode for the secondary display and have that selection remain even as they switch between applications and switch what content is displayed within individual applications.

In some embodiments, if an application is specifically associated with a particular display mode for the secondary display 104, then that association will override the user's prior selection of the workflows/macros display mode.

Figure 5R:
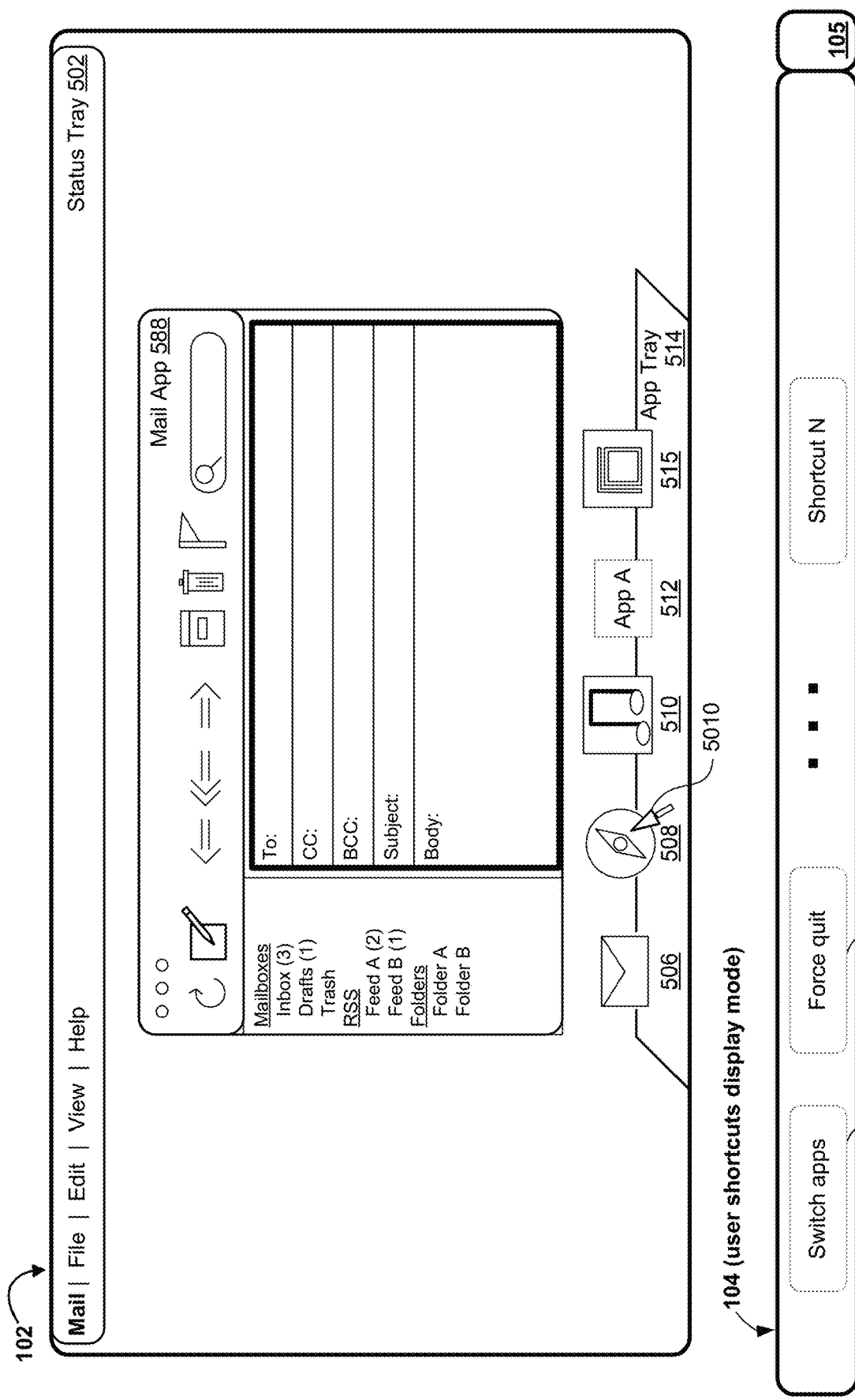

For example, with reference to FIG. 5Q, the user provides an input 594 to launch an application that has been specifically associated with a particular display mode (e.g., the input 594 corresponds to a request to launch the mail application, which was previously associated in the management user interface 516 with a user shortcuts display mode) and, in response, the secondary display switches to the particular display mode (e.g., as shown in FIG. 5R, the secondary display 104 is now operated in the user shortcuts display mode). As depicted in FIG. 5R, in some embodiments, the user shortcuts display mode includes user interface elements 5603, 5605 that each correspond to user-selected shortcuts, so that users may provide a single input at the touch bar instead of having to recall and use complicated keyboard shortcuts.

Figure 5S:
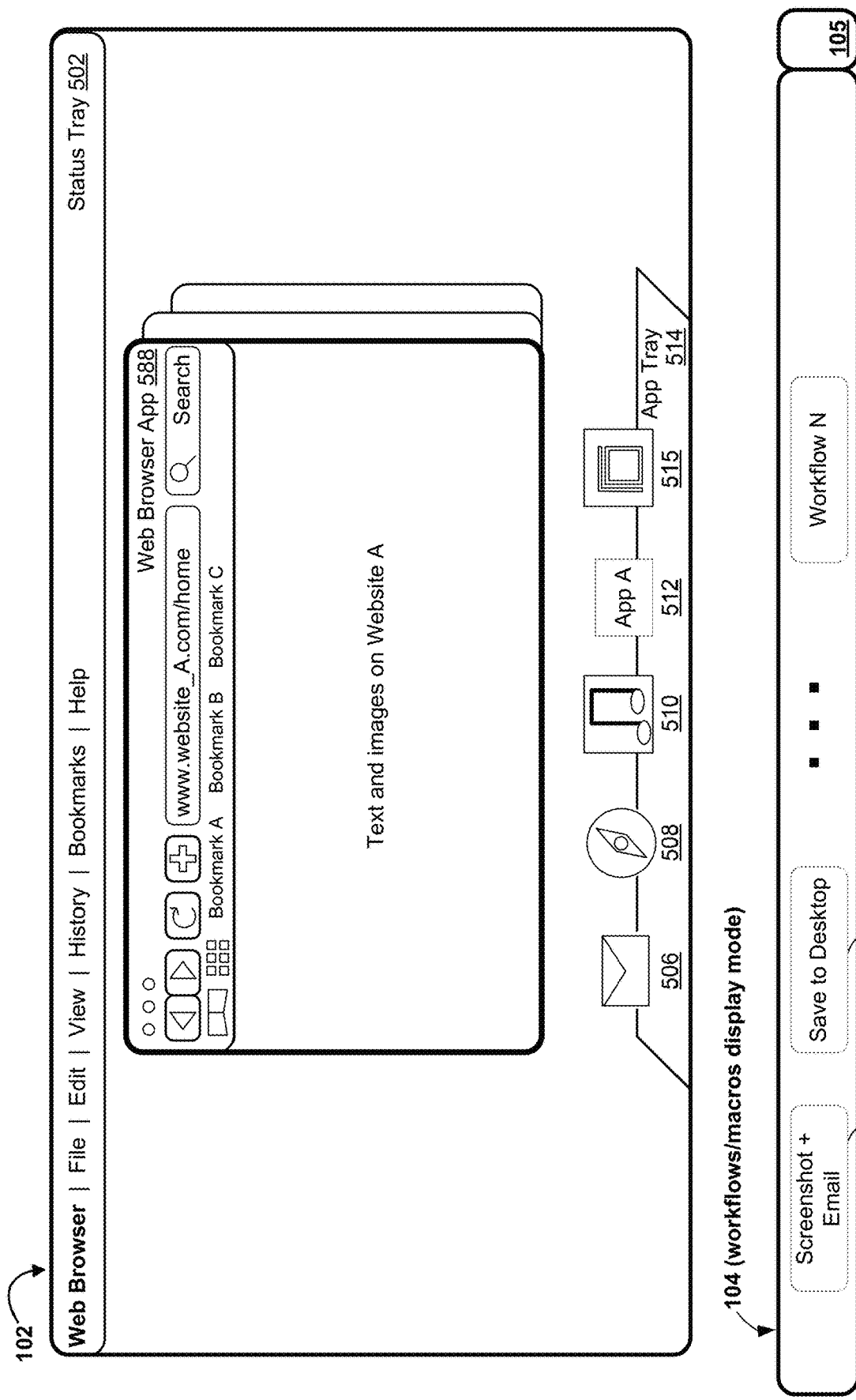

FIG. 5R also illustrates that switching back to an application that is not specifically associated with a particular display mode (e.g., providing input 5010 to launch the web browser application, which has not been specifically associated with a particular display mode using the management user interface 516), will cause the current system-wide display mode to be chosen for the secondary display 104 (e.g., the workflows/macros display mode is then used for the secondary display 104, as shown in FIG. 5S).

Figures 1, 5T:
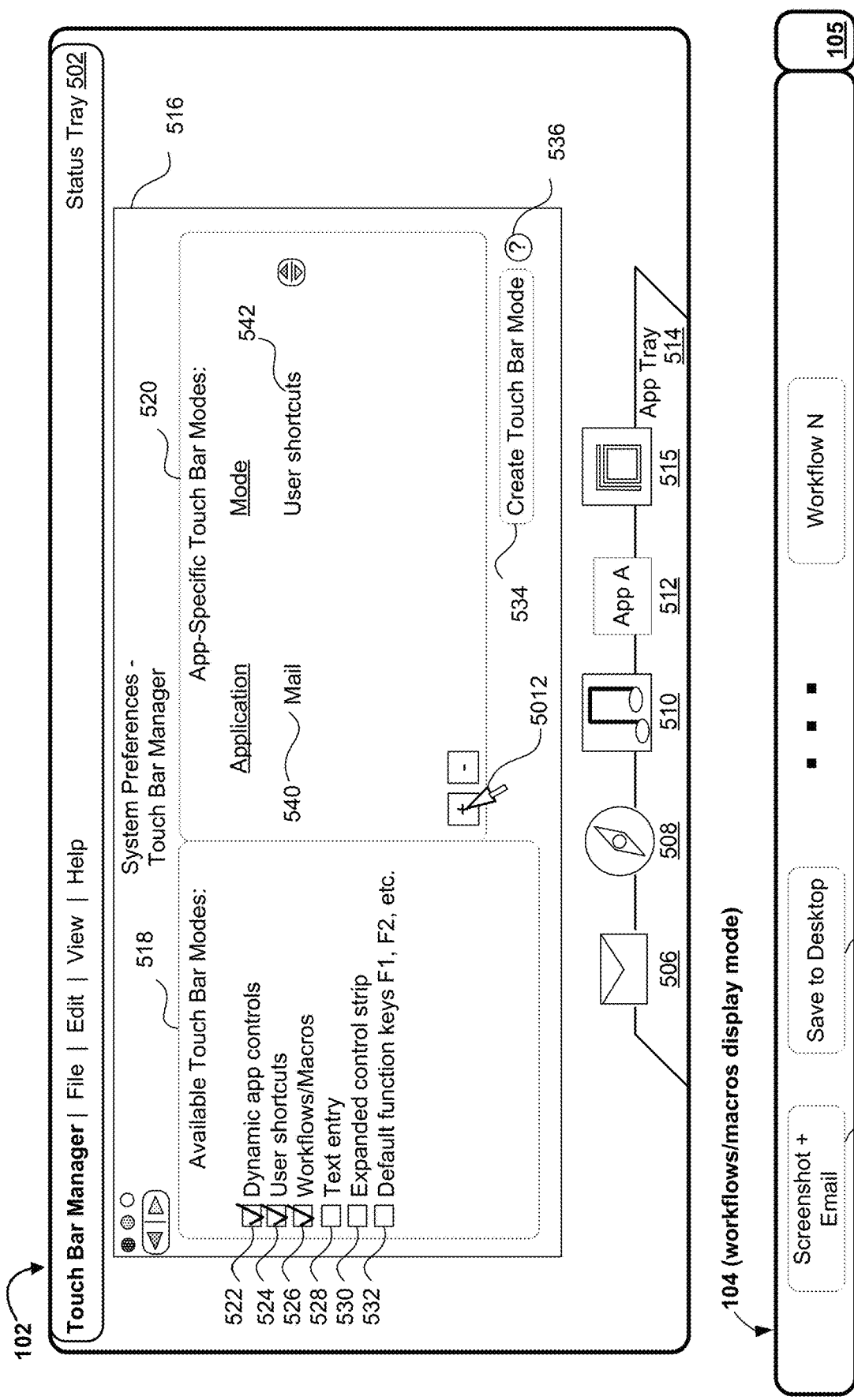
Figures 2, 5T:
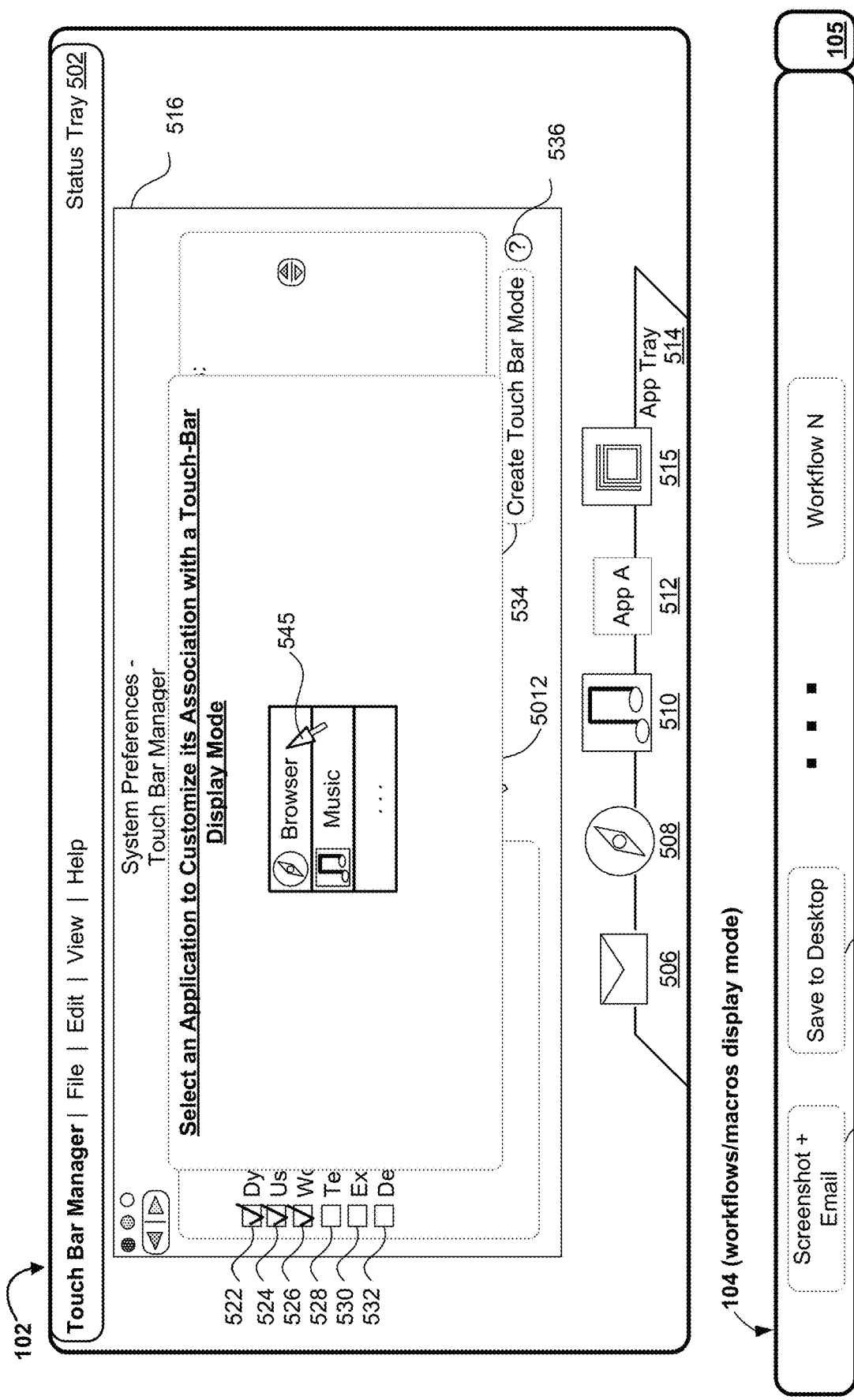
Figures 3, 5T:
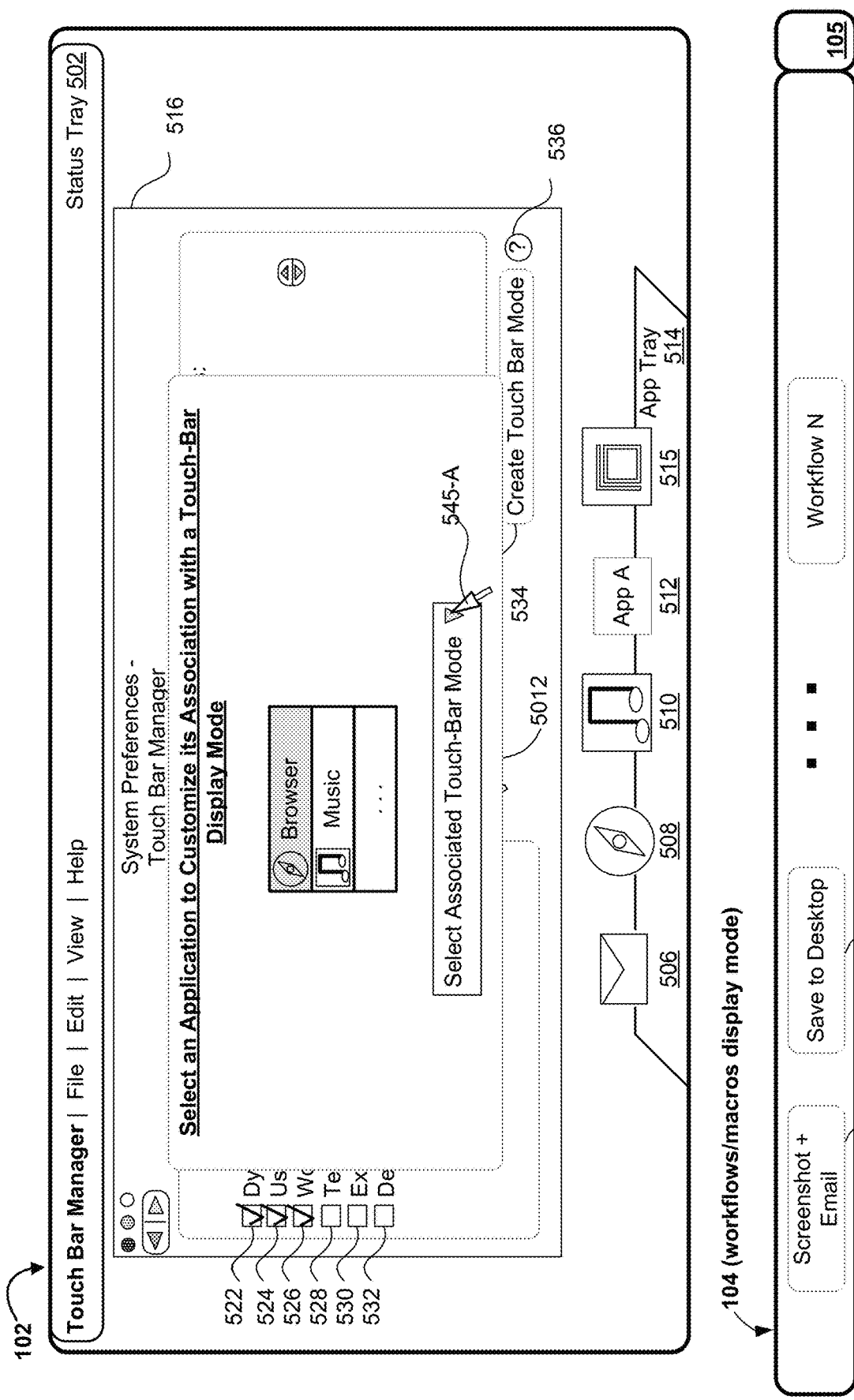
Figures 4, 5T:
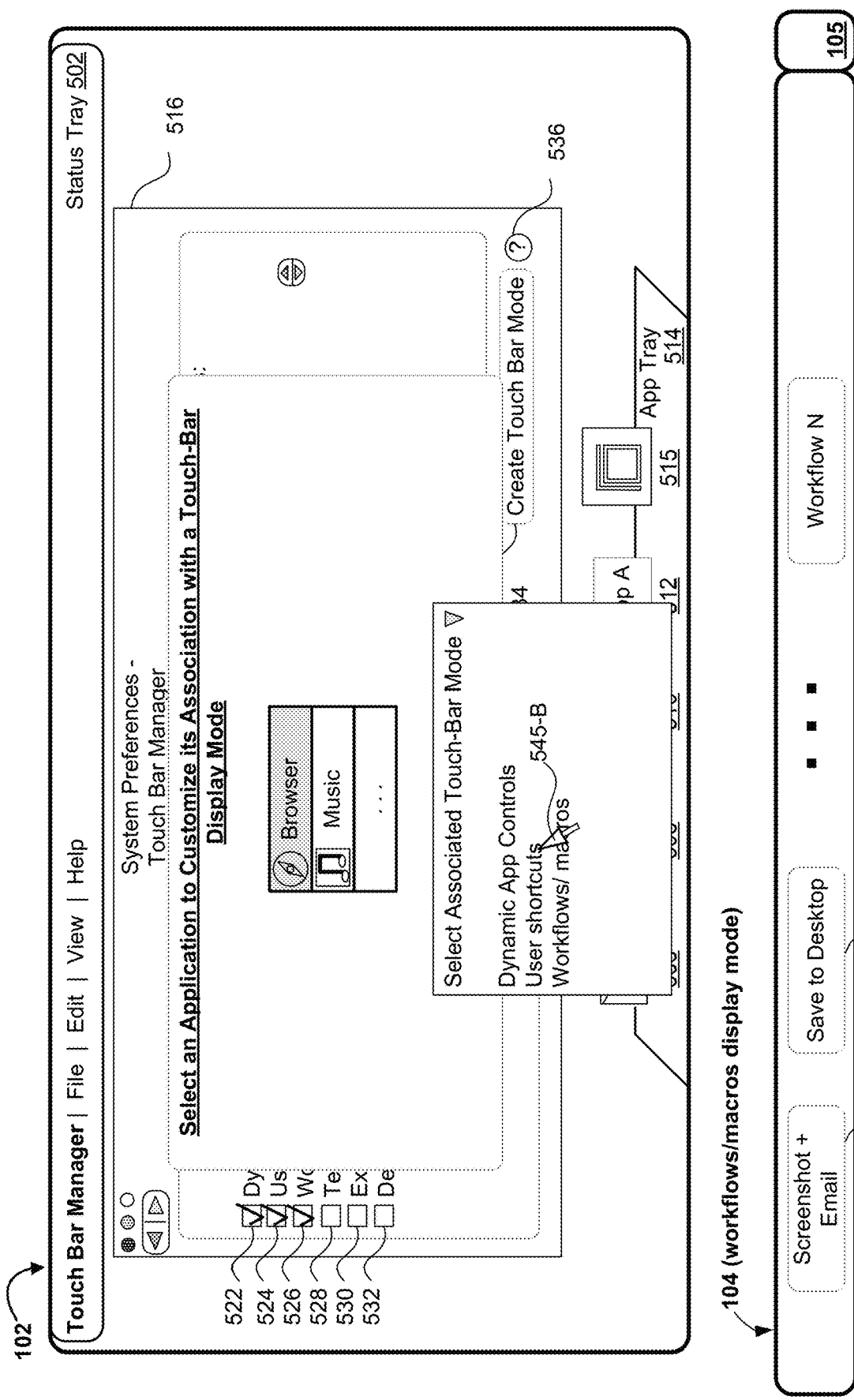

Next, with reference to FIG. 5T, the user has opened the touch-bar management user interface 516, which is shown on the primary display 102. FIG. 5T shows the user providing an input 5012 at the "+" affordance to allow for adding an additional application to the second portion 520 of the touch-bar management user interface 516. In response to the input 5012, the overlay window 517 is displayed, and the user selects to add the web browser application to the second portion 520 using input 547.

Figure 5U:
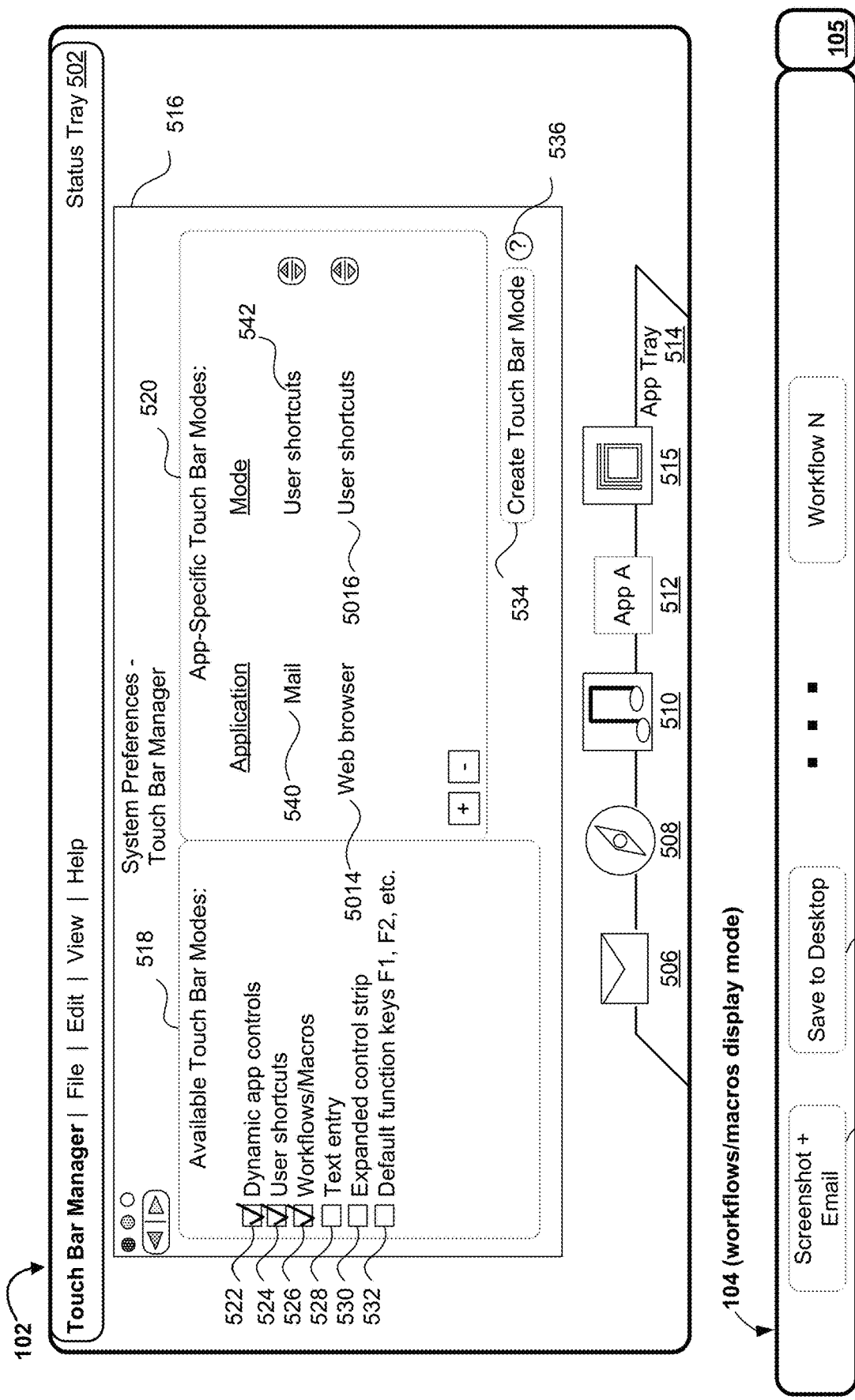

In some embodiments, the web browser application is added to the second portion 520 in response to the input 547 and is associated with a default display mode, as was previously discussed with respect to FIGS. 5E-1 to 5E-3. In other embodiments, and as shown in FIGS. 5T-1 to 5T-4, users are able to select the web browser application (e.g., using an input 545, FIG. 5T-2) and to also select an associated display mode directly within the overlay window 517 (e.g., using inputs 545-A and 545-B, FIGS. 5T-3 and 5T-4). Then, as shown in FIG. 5U, the web browser application and the display mode that was selected to be associated therewith are both shown within the second portion 520 of the touch-bar management user interface 516 (e.g., user interface elements 5014 and 5016 have been added to the second portion 520).

Figure 5V:
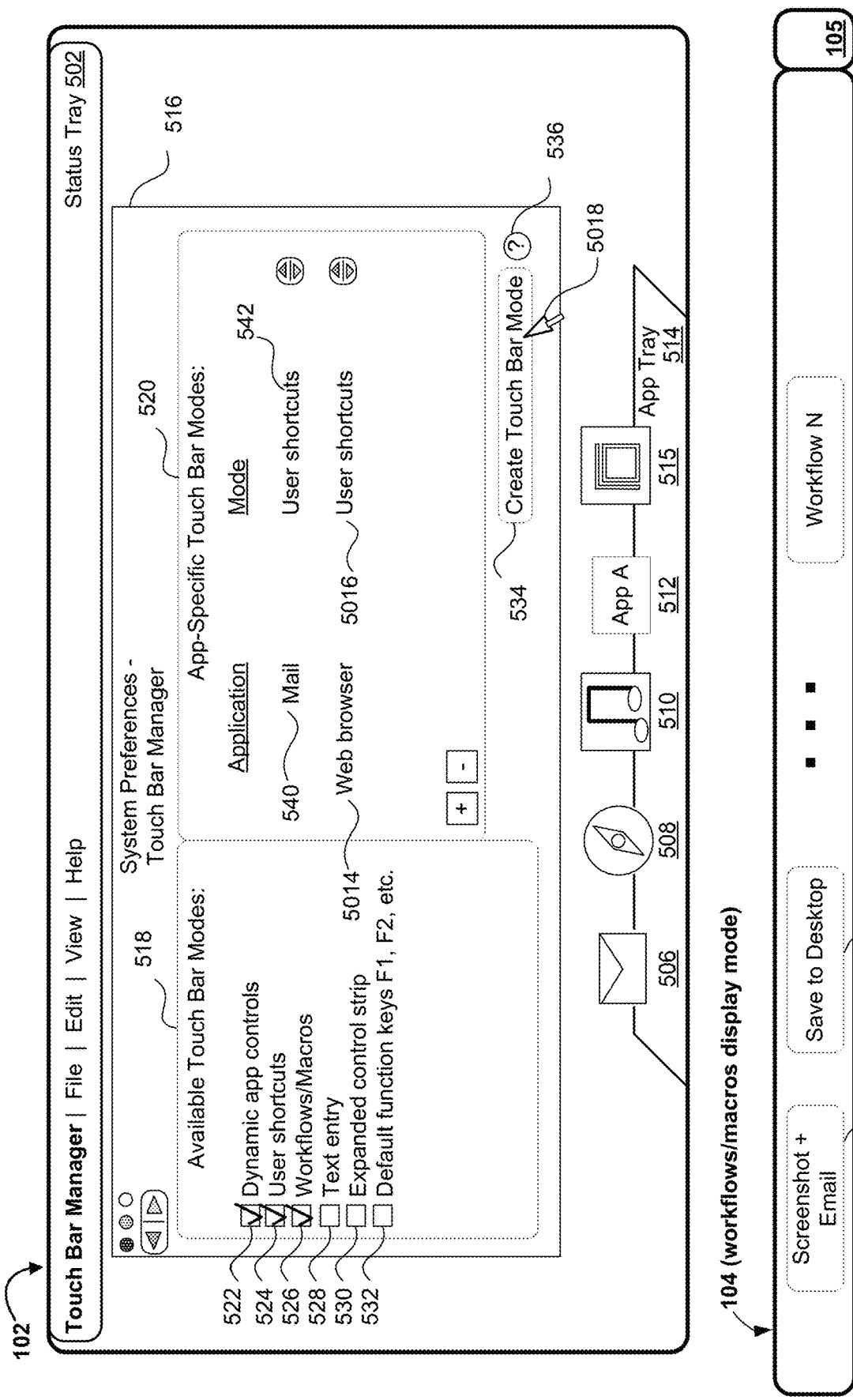
Figure 5W:
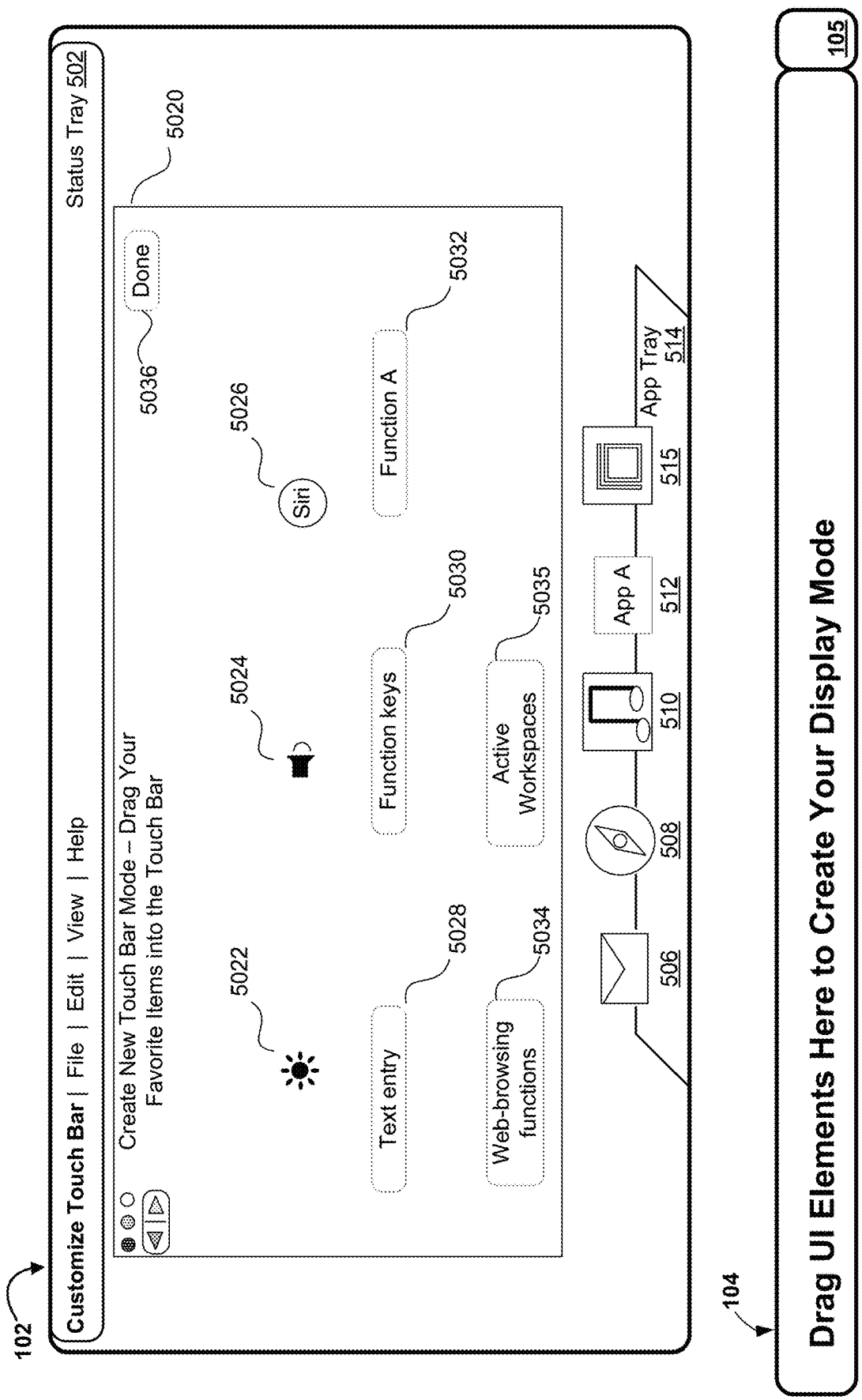
Figure 5X:
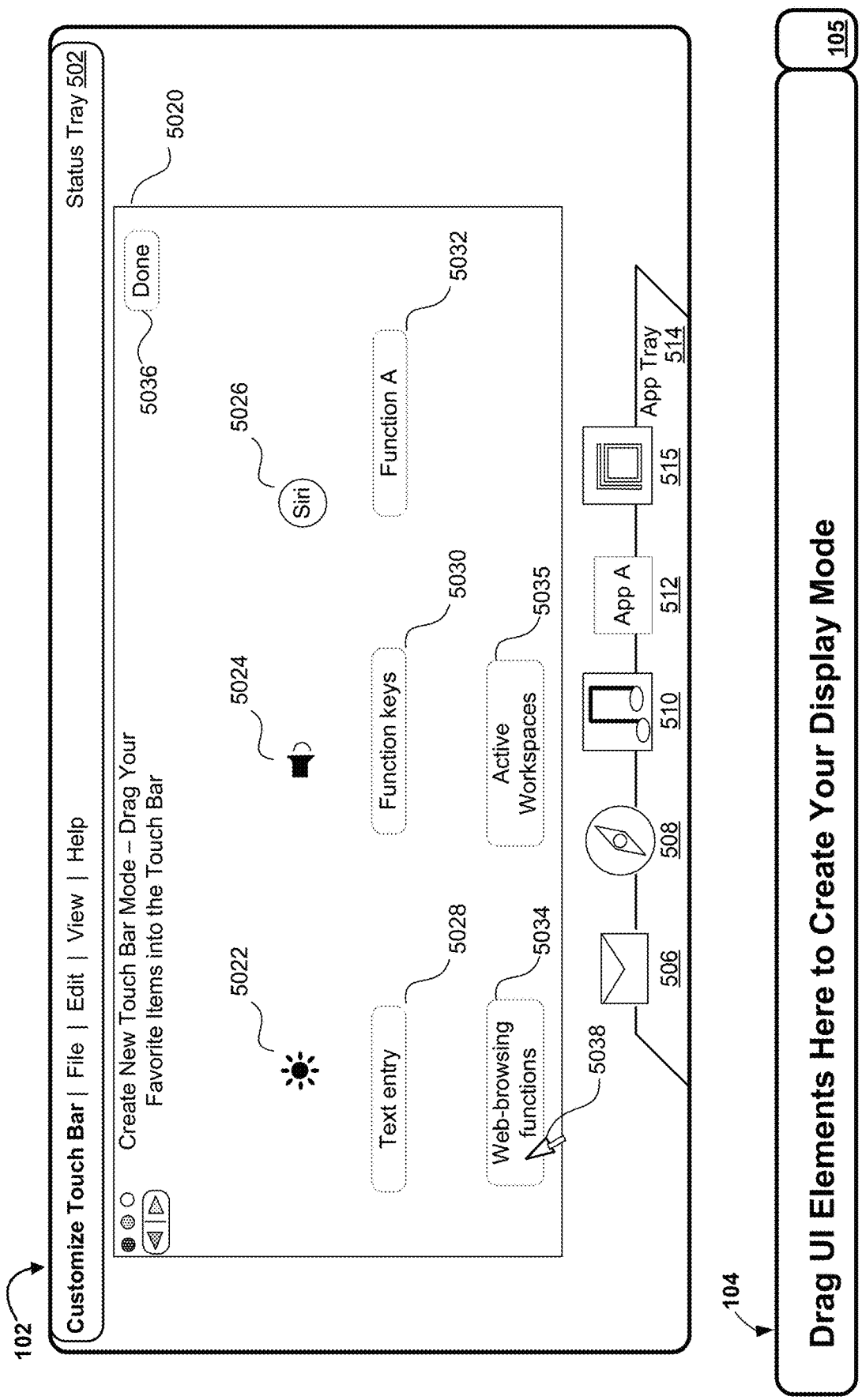
Figure 5Y:
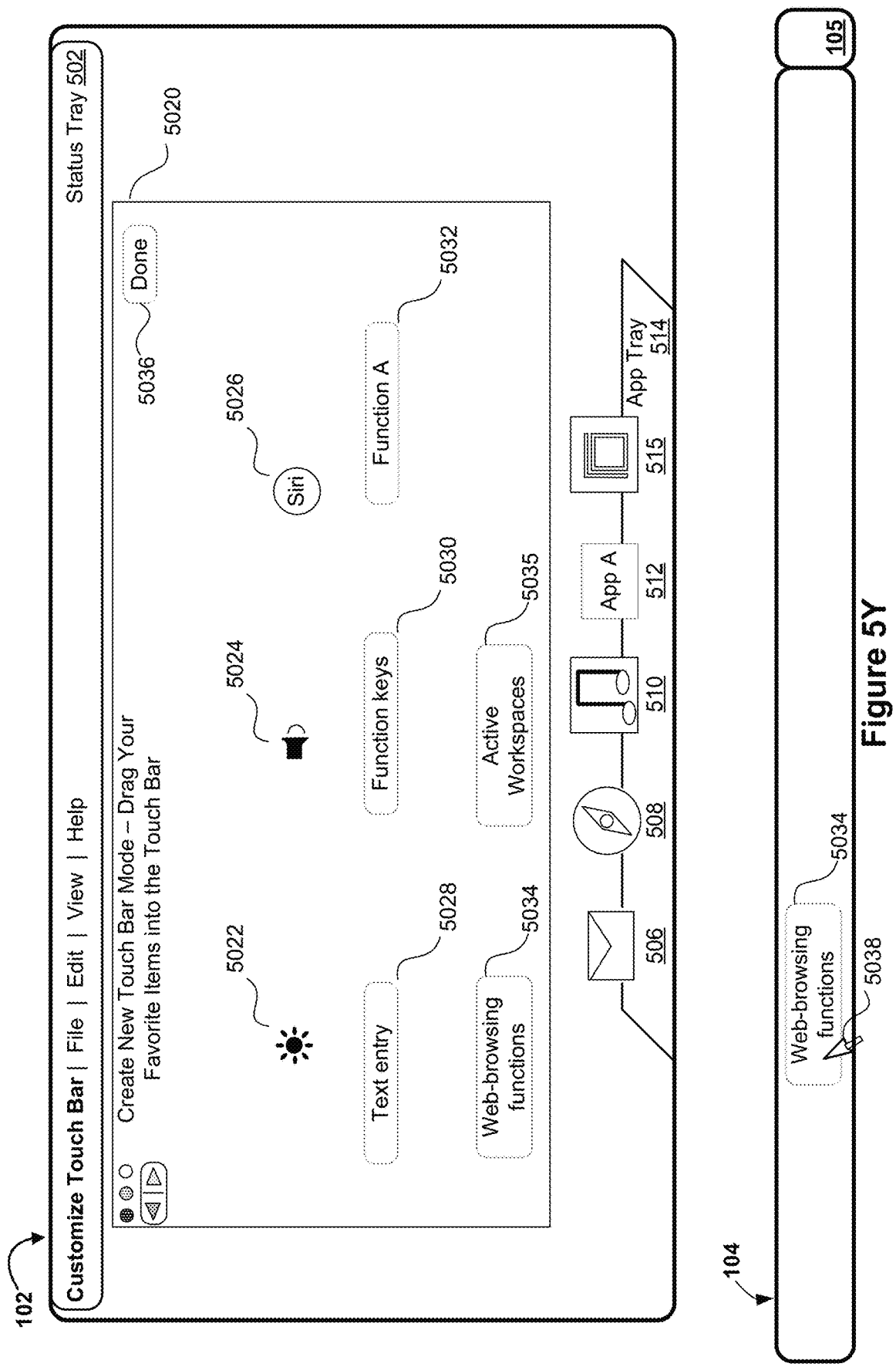
Figure 5Z:
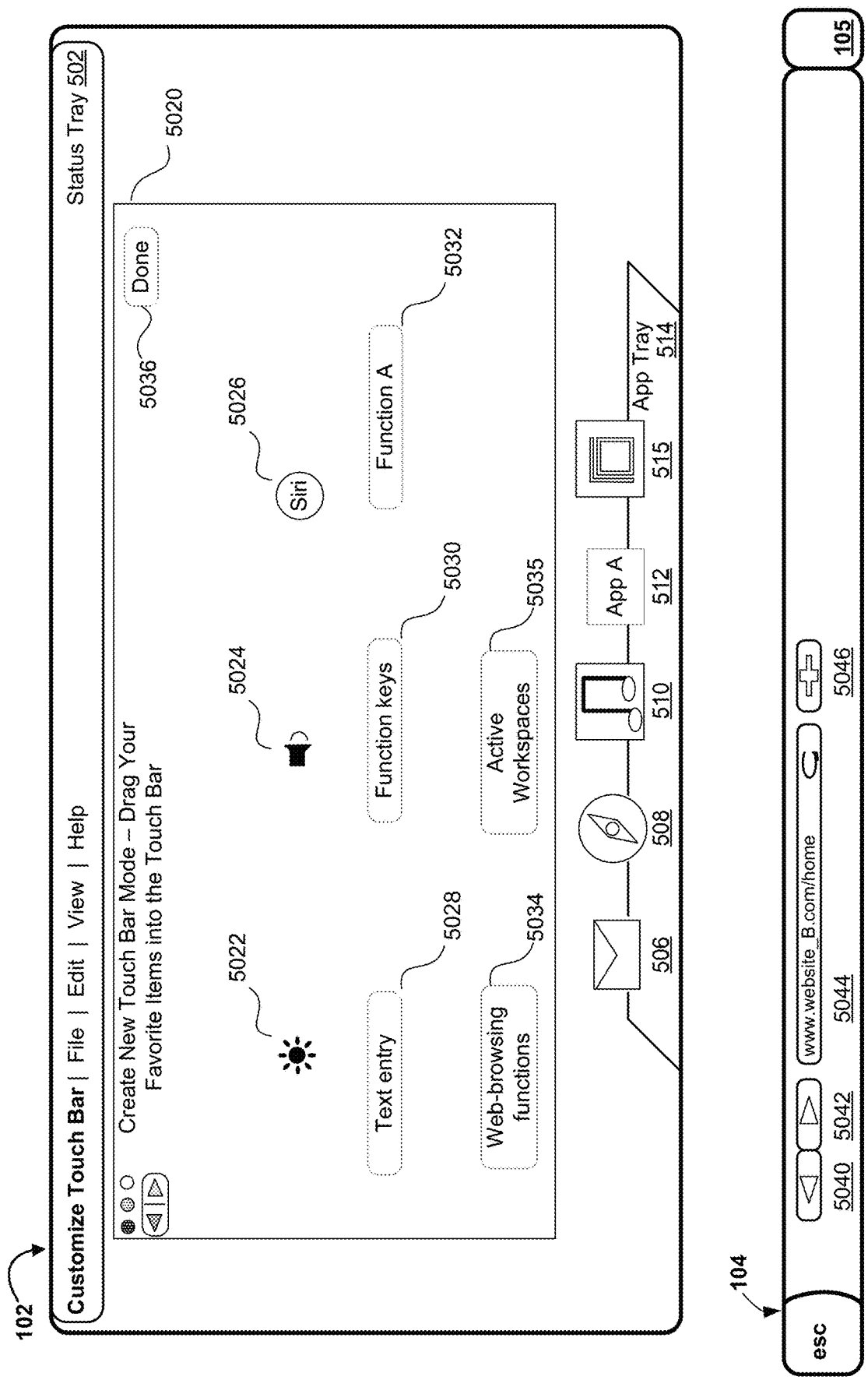
Figure 5A:
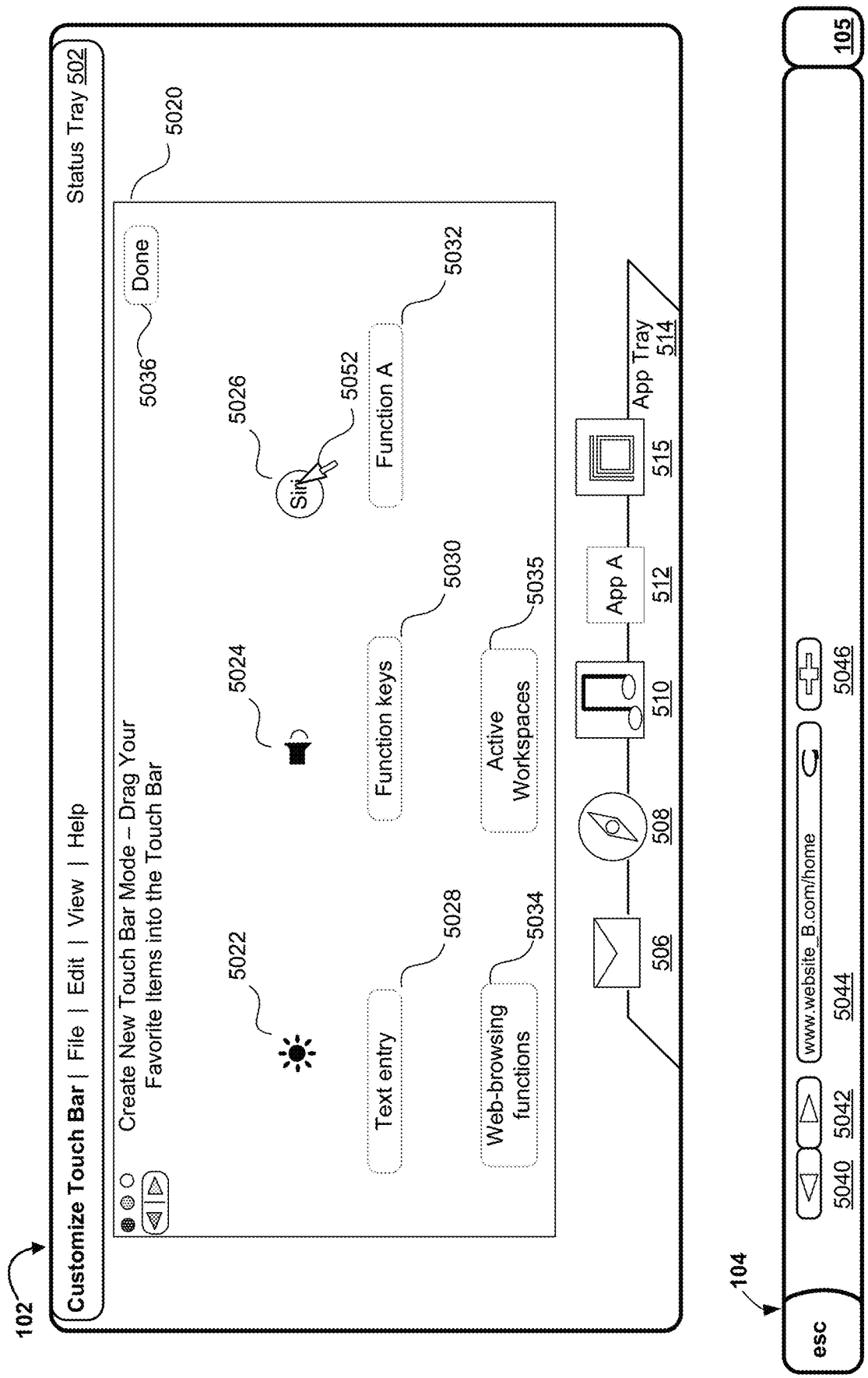
Figure 5A:
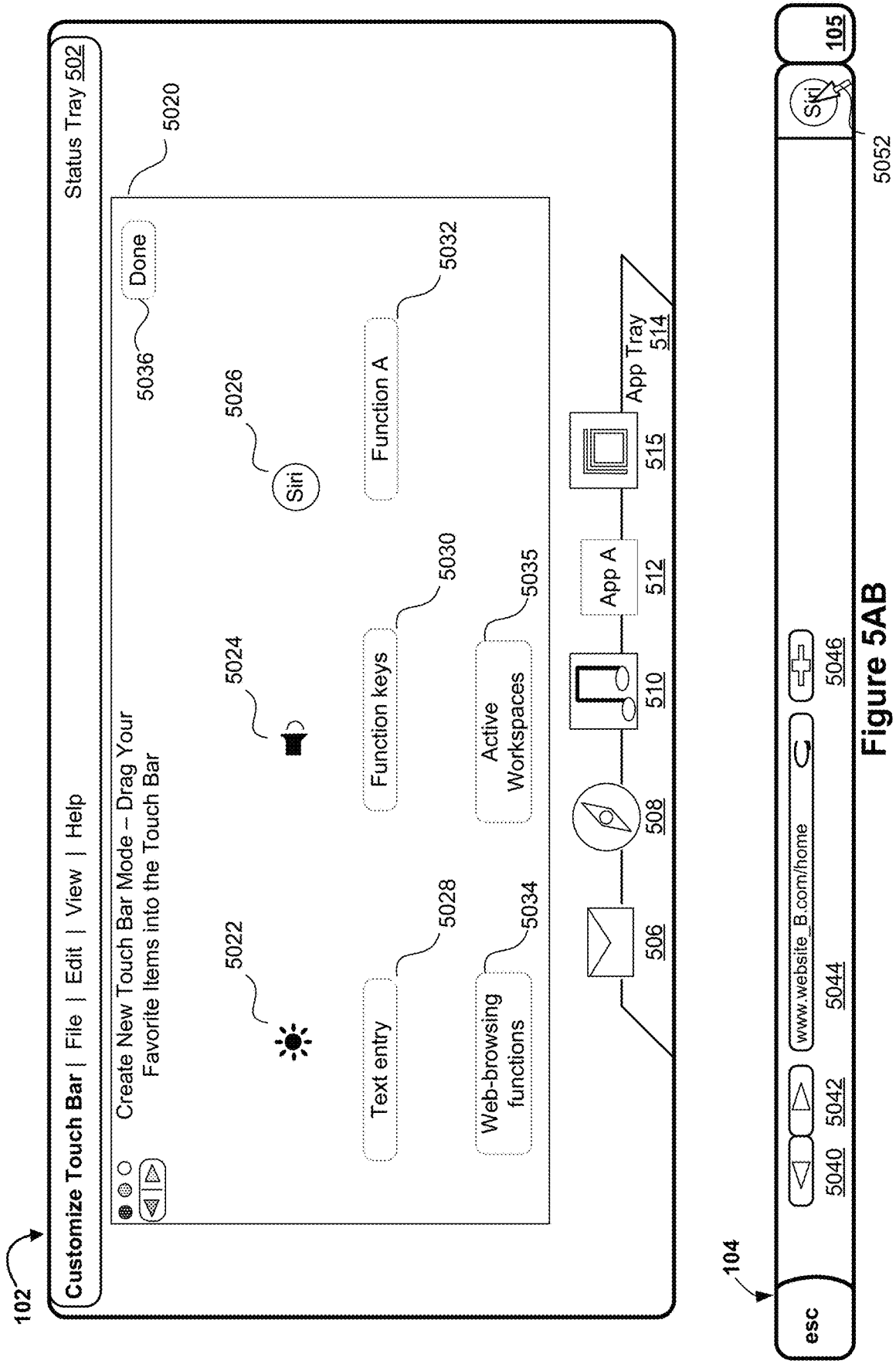
Figure 5A:
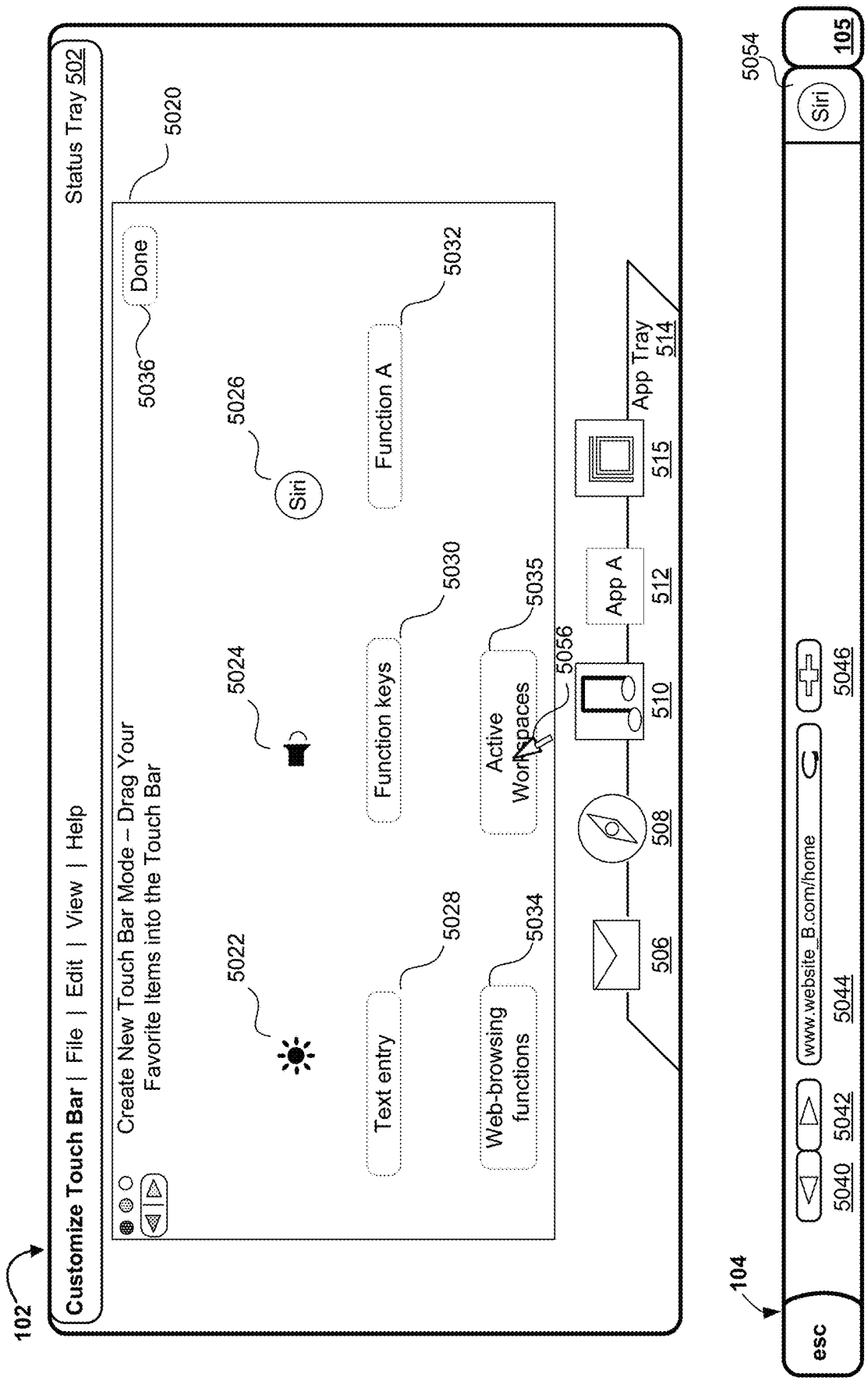
Figure 5A:
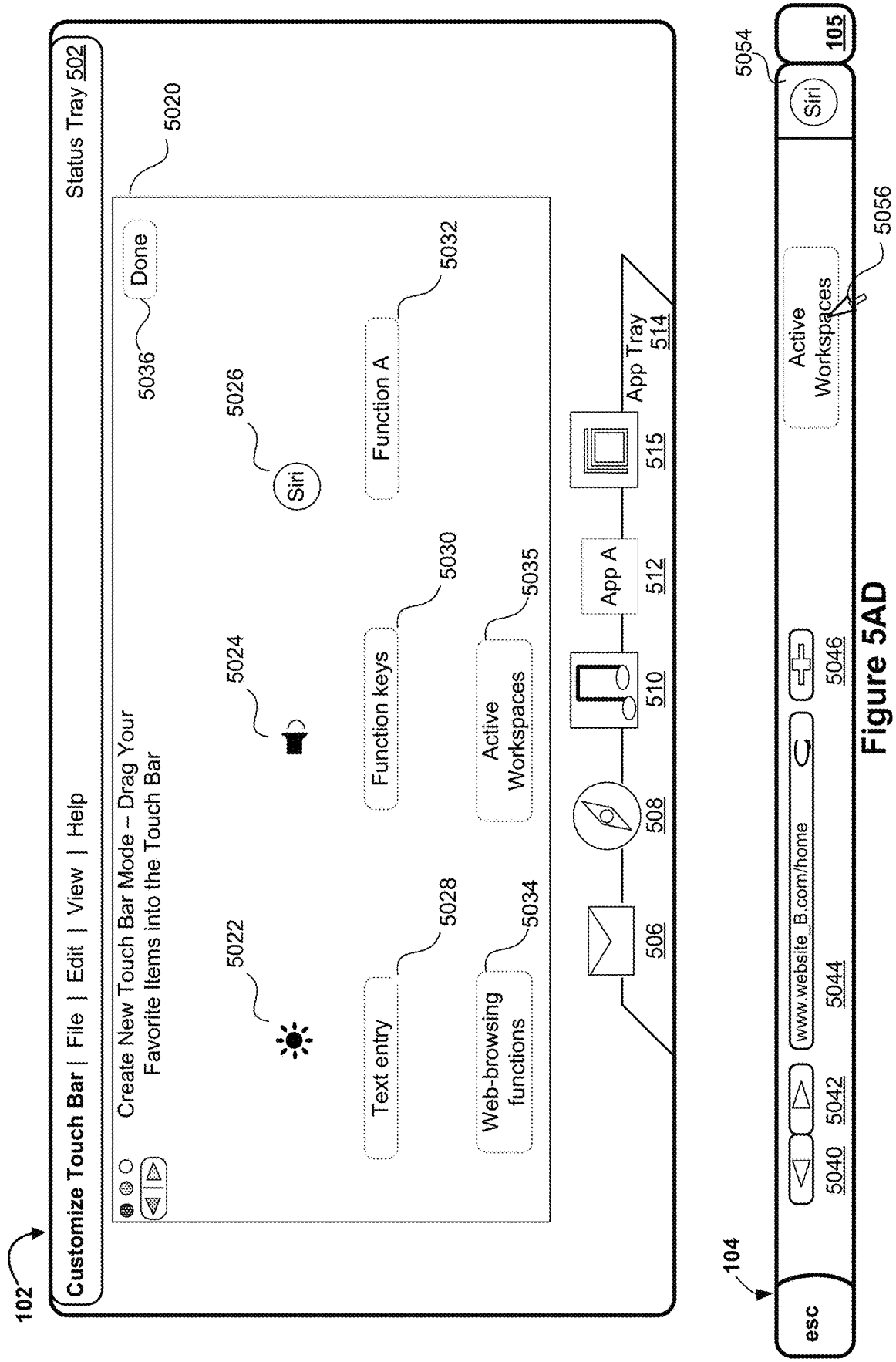
Figure 5A:
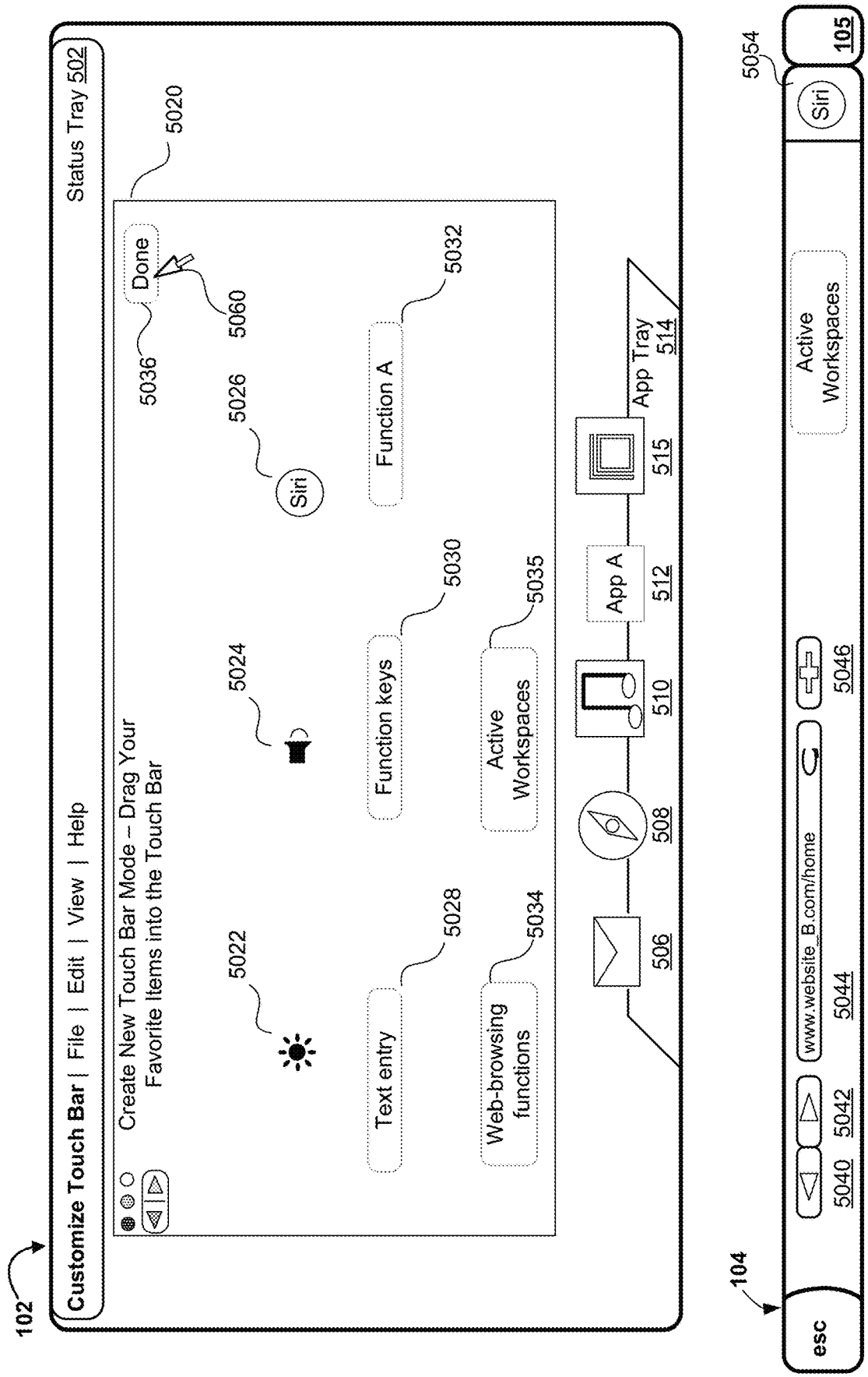
Figure 5A:
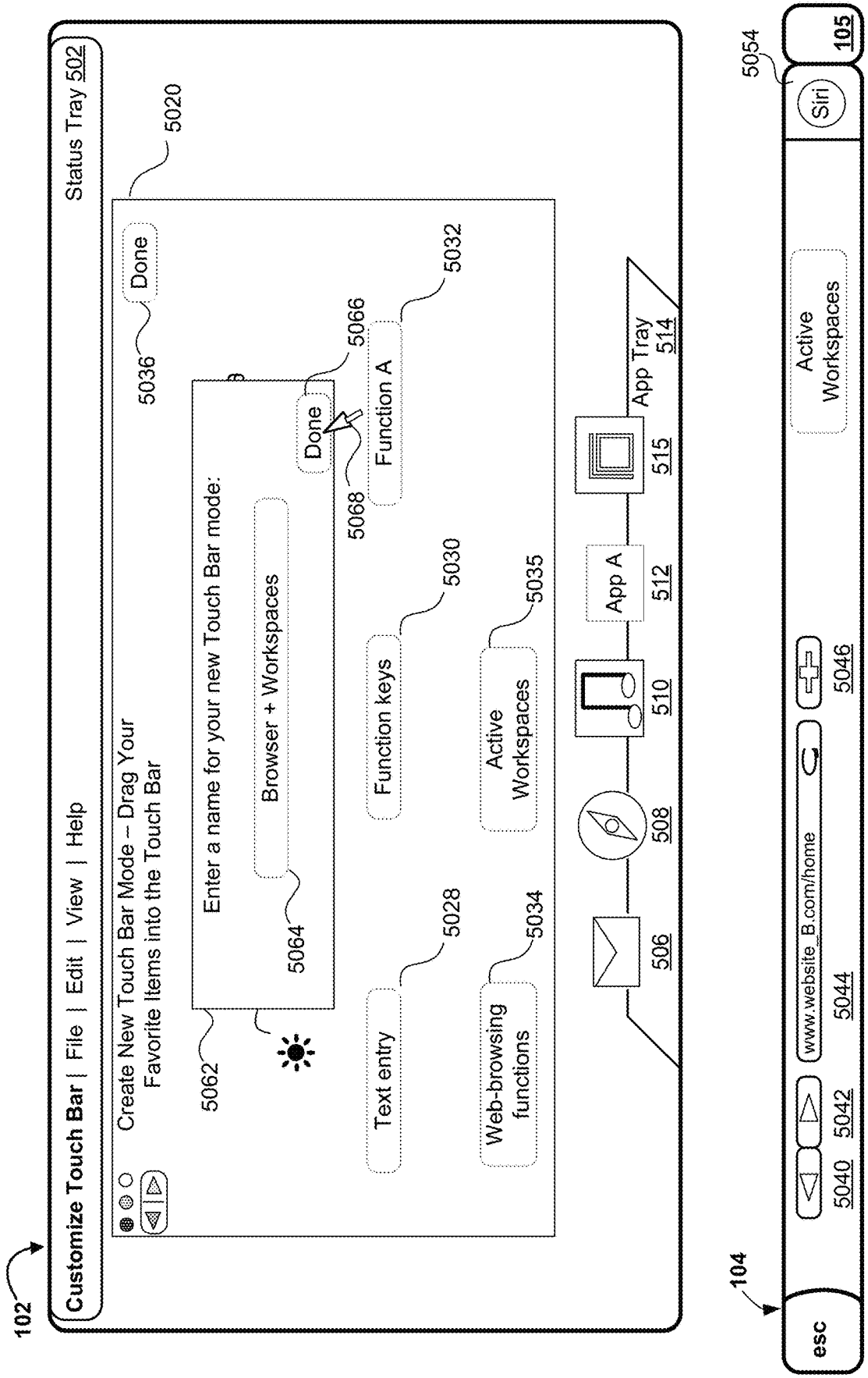
Figure 5A:
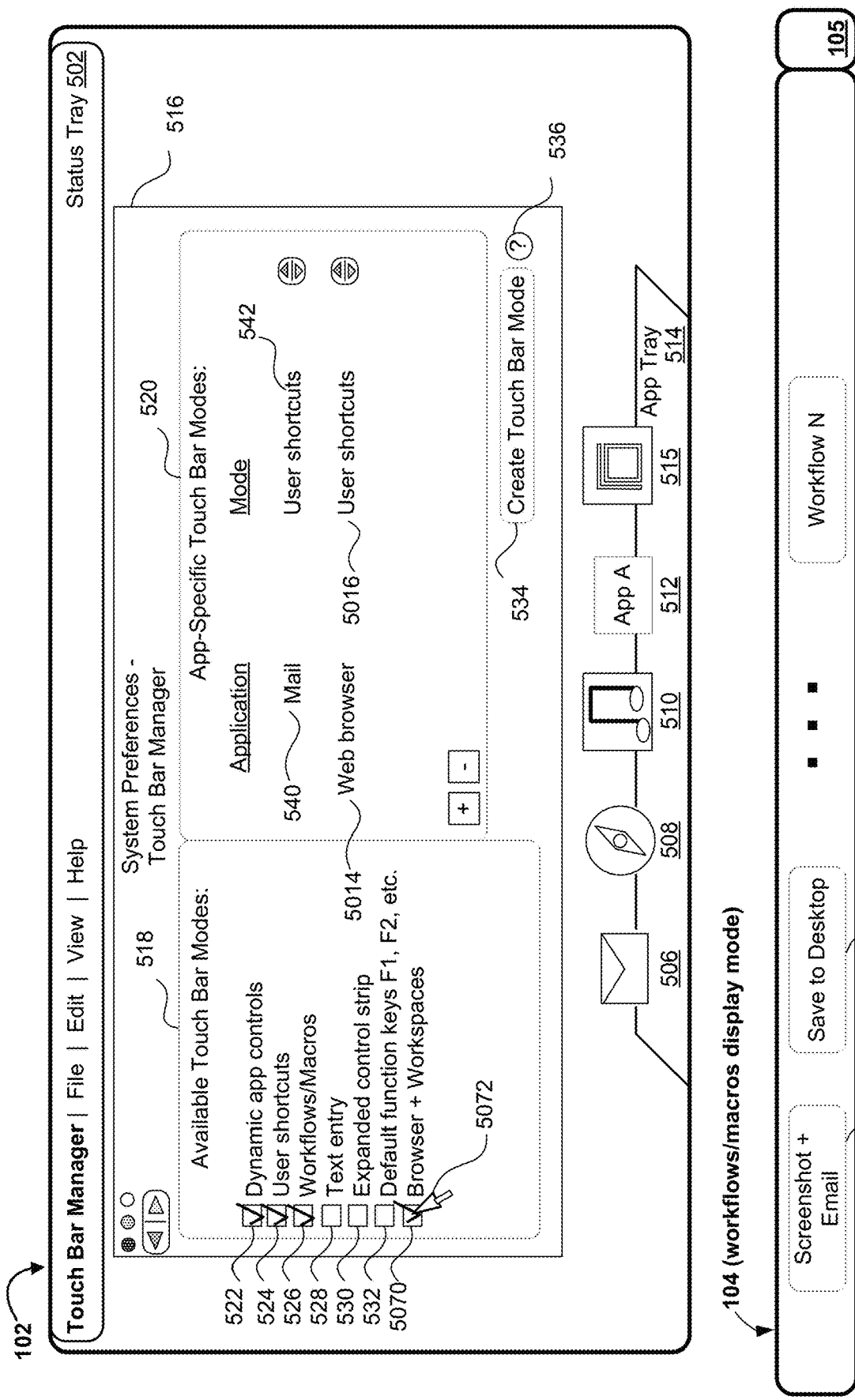
Figure 5A:
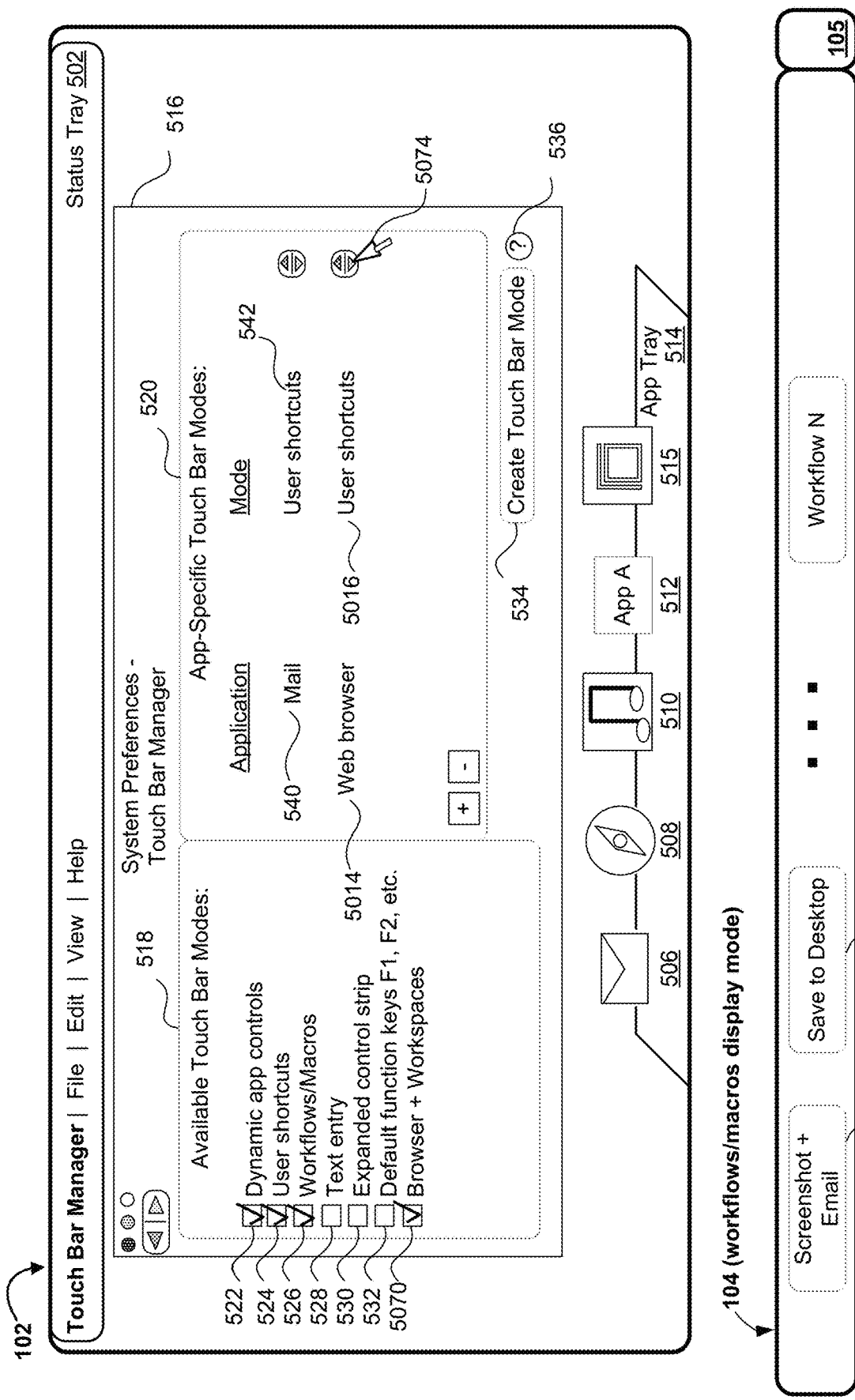
Figure 5A:
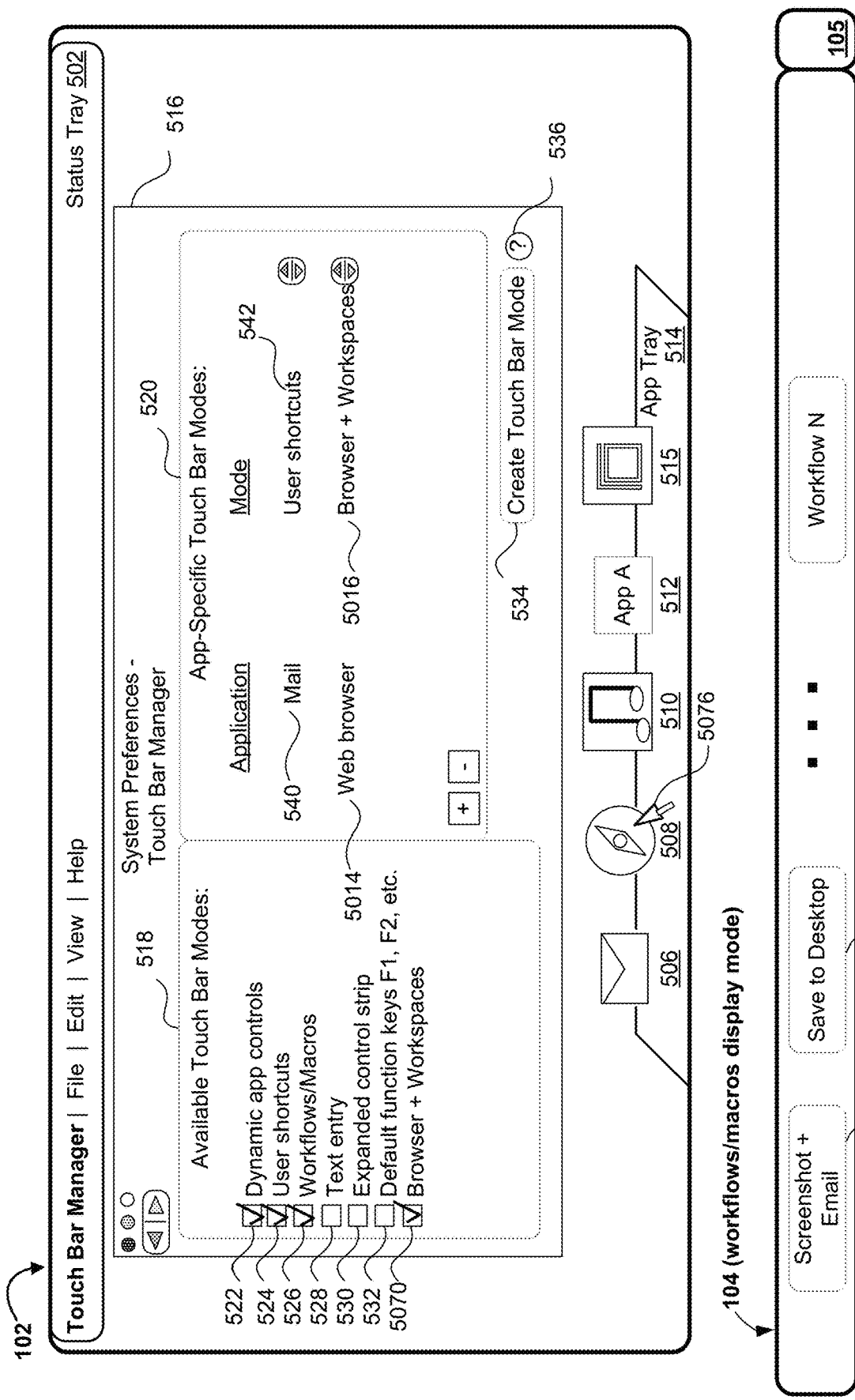
Figure 5A:
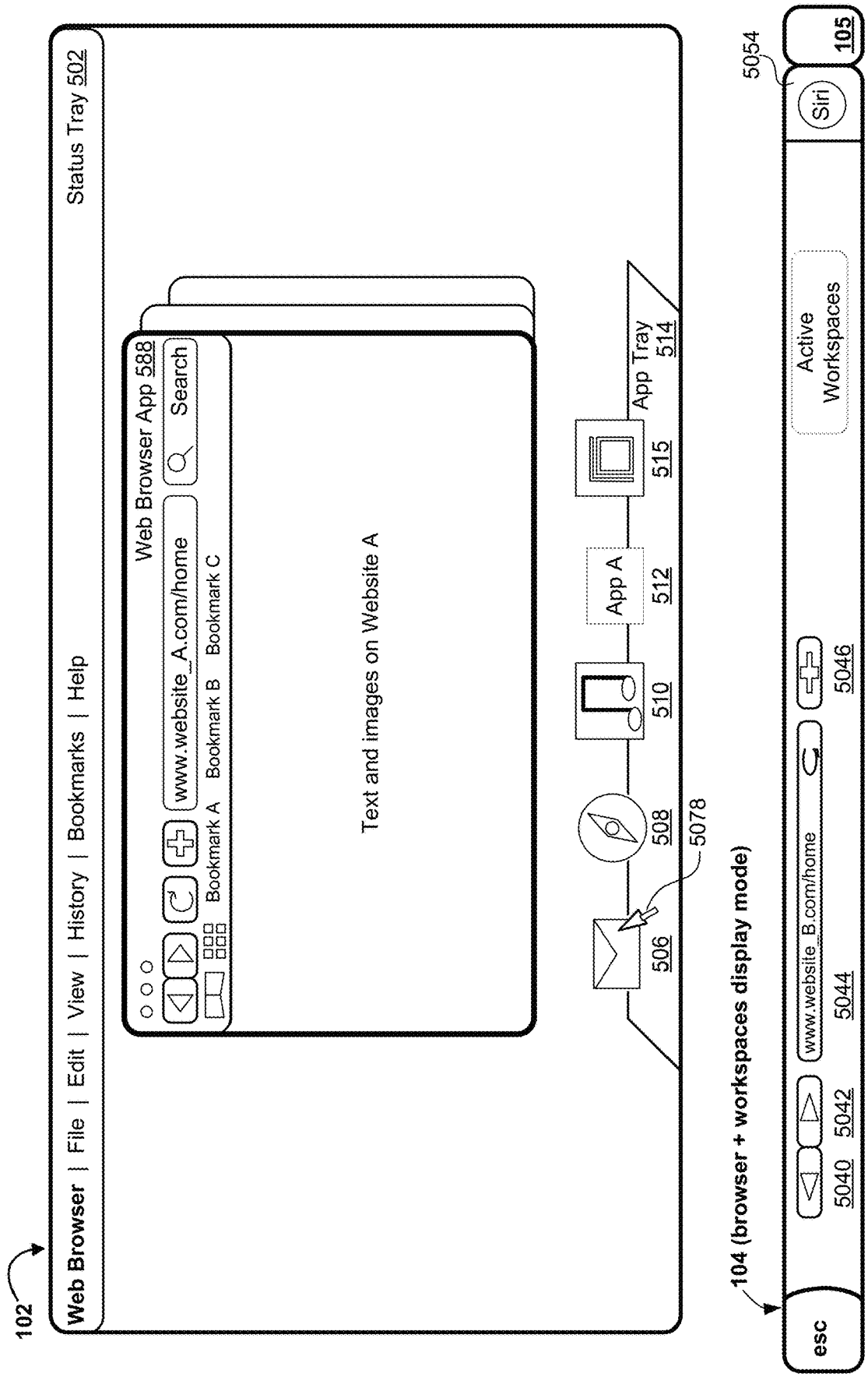
Figure 5A:
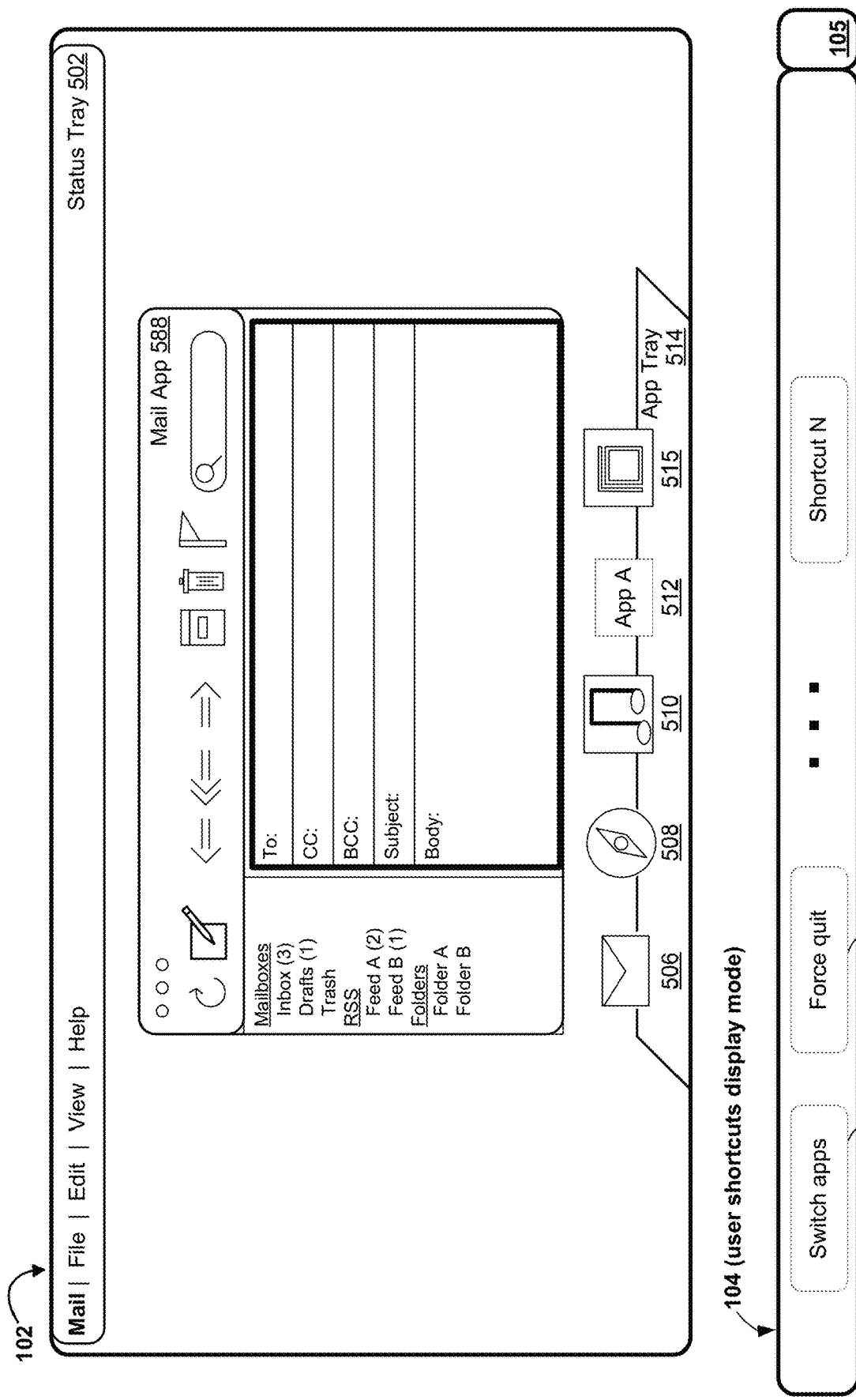
Figure 5A:
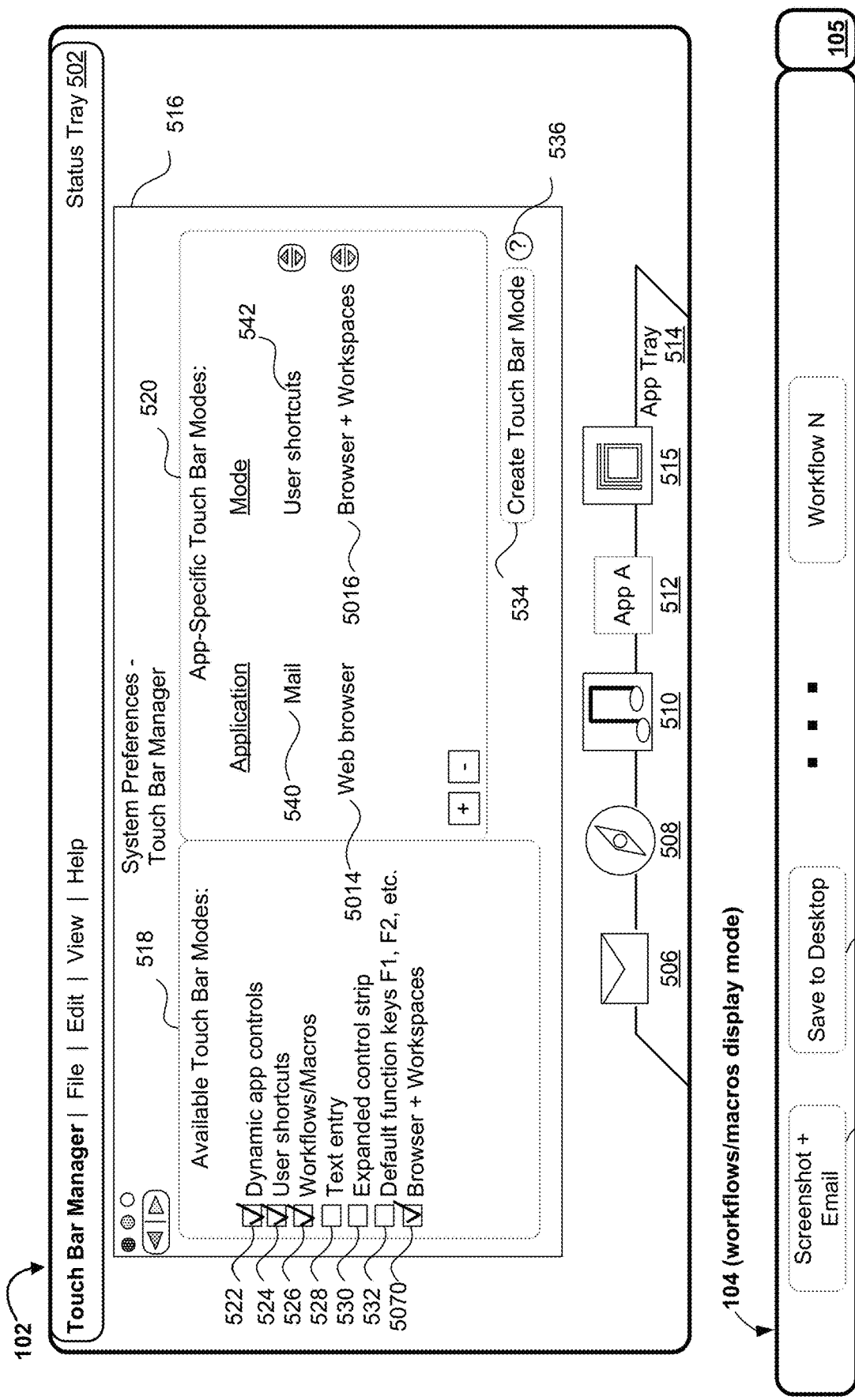
Figure 5A:
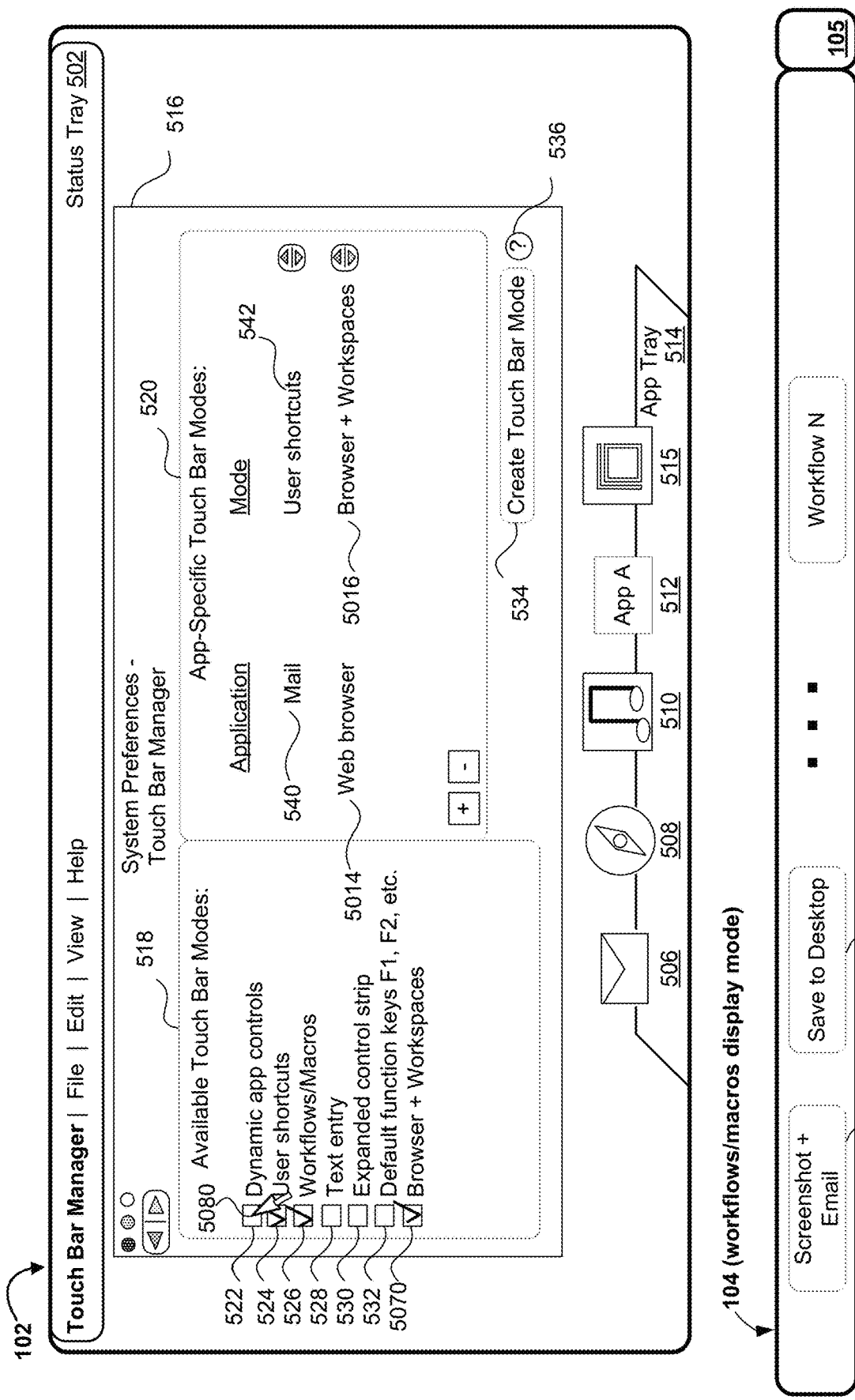
Figure 5A:
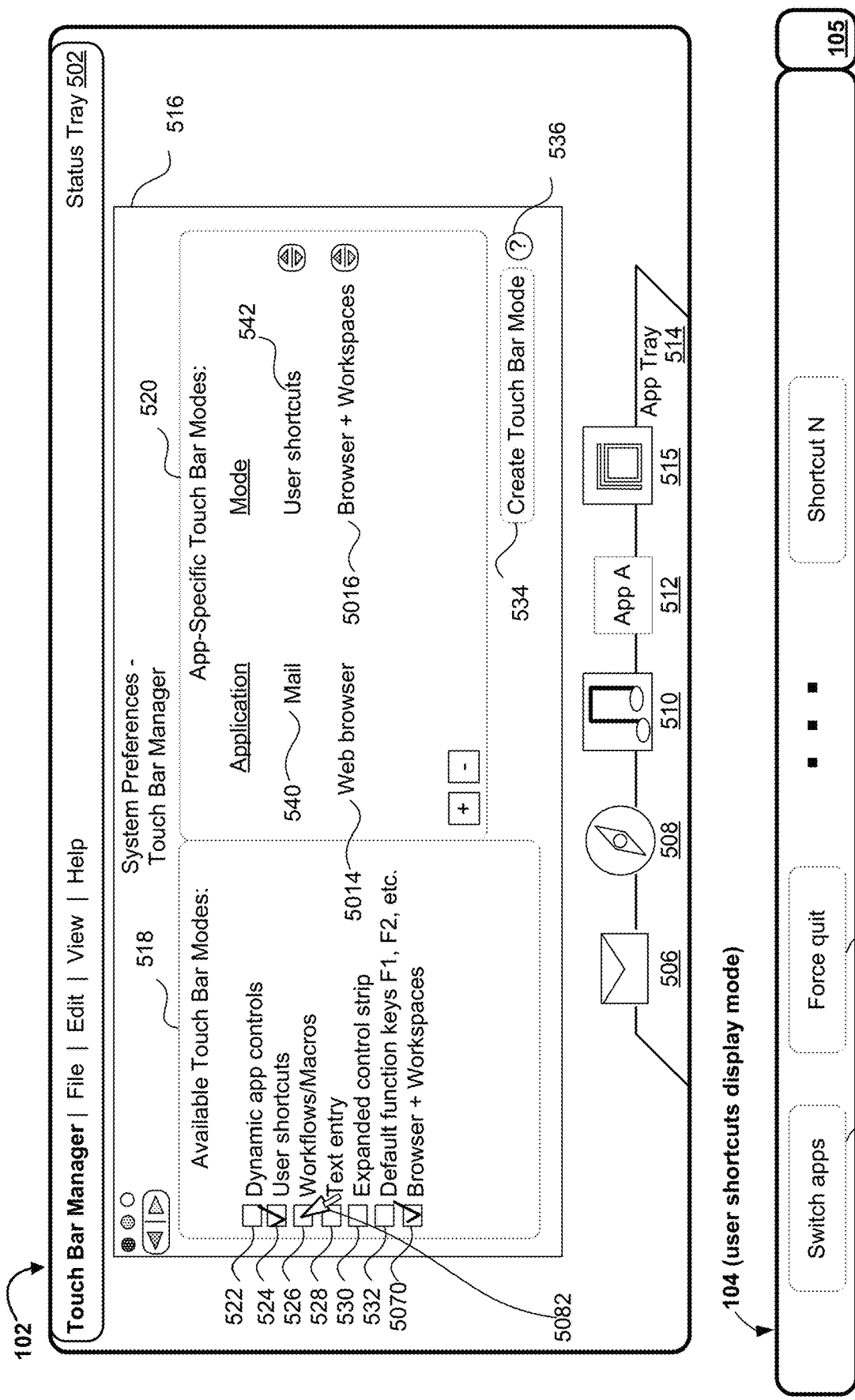
Figure 5A:
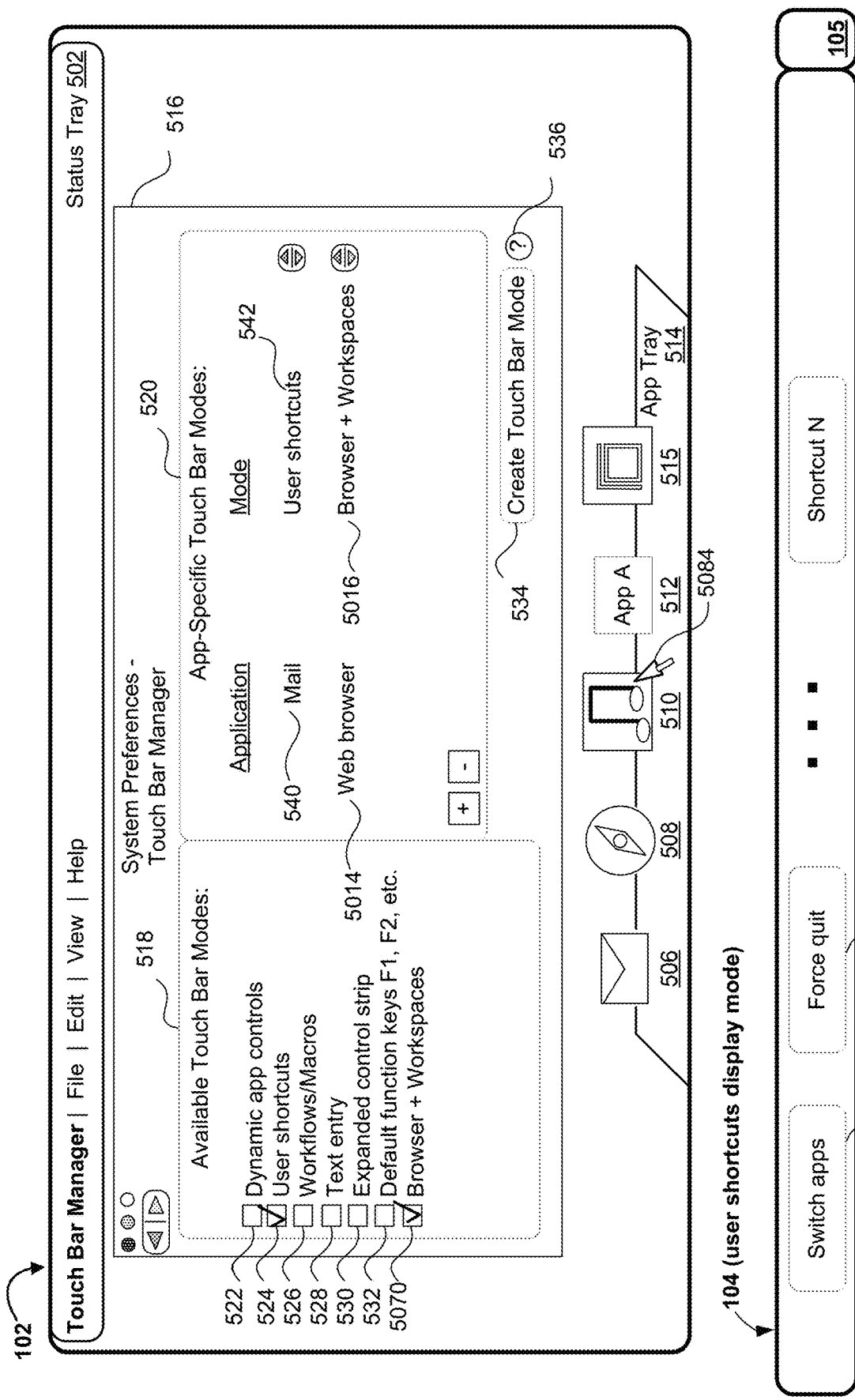
Figure 5A:
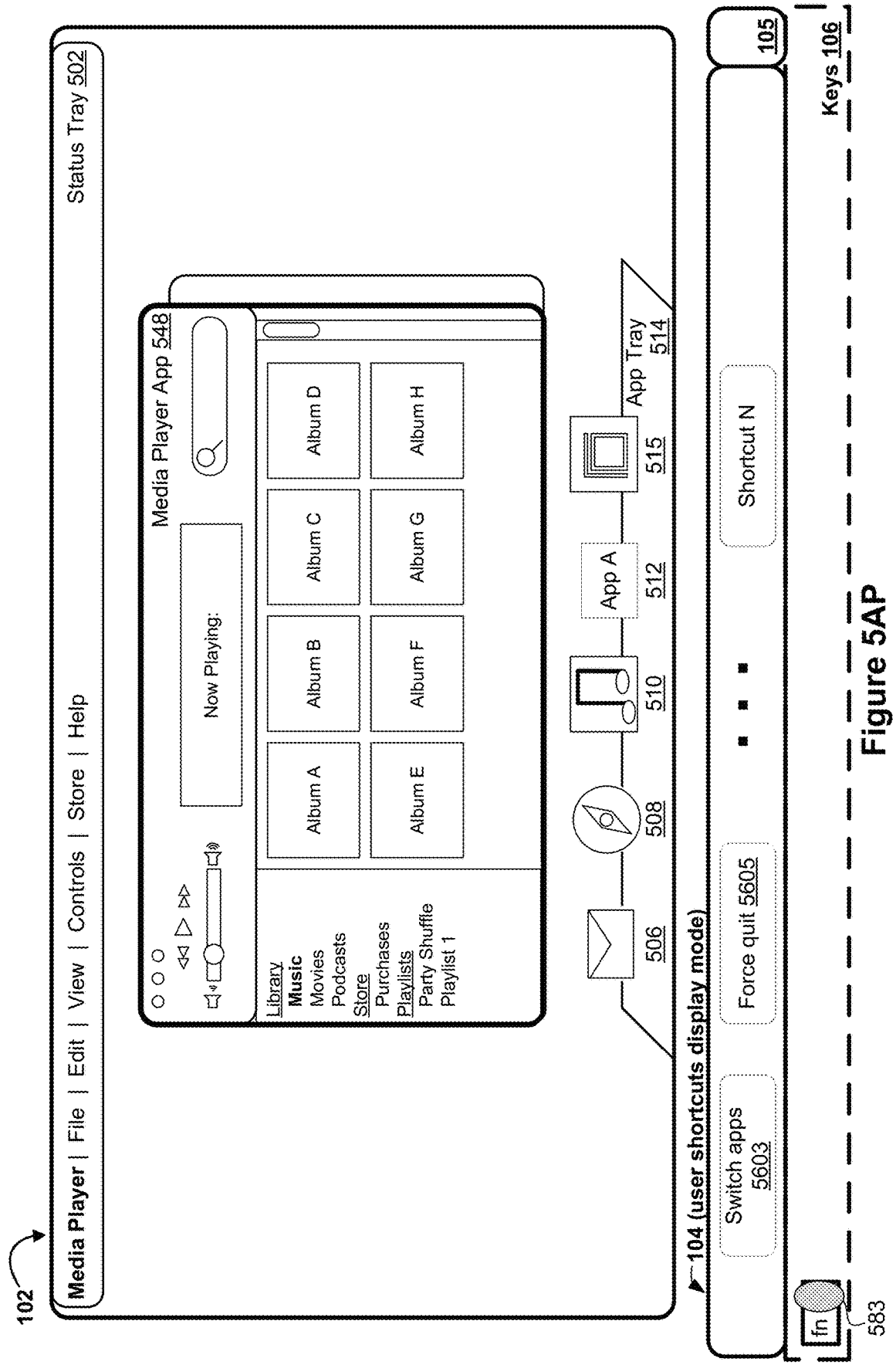
Figure 5A:
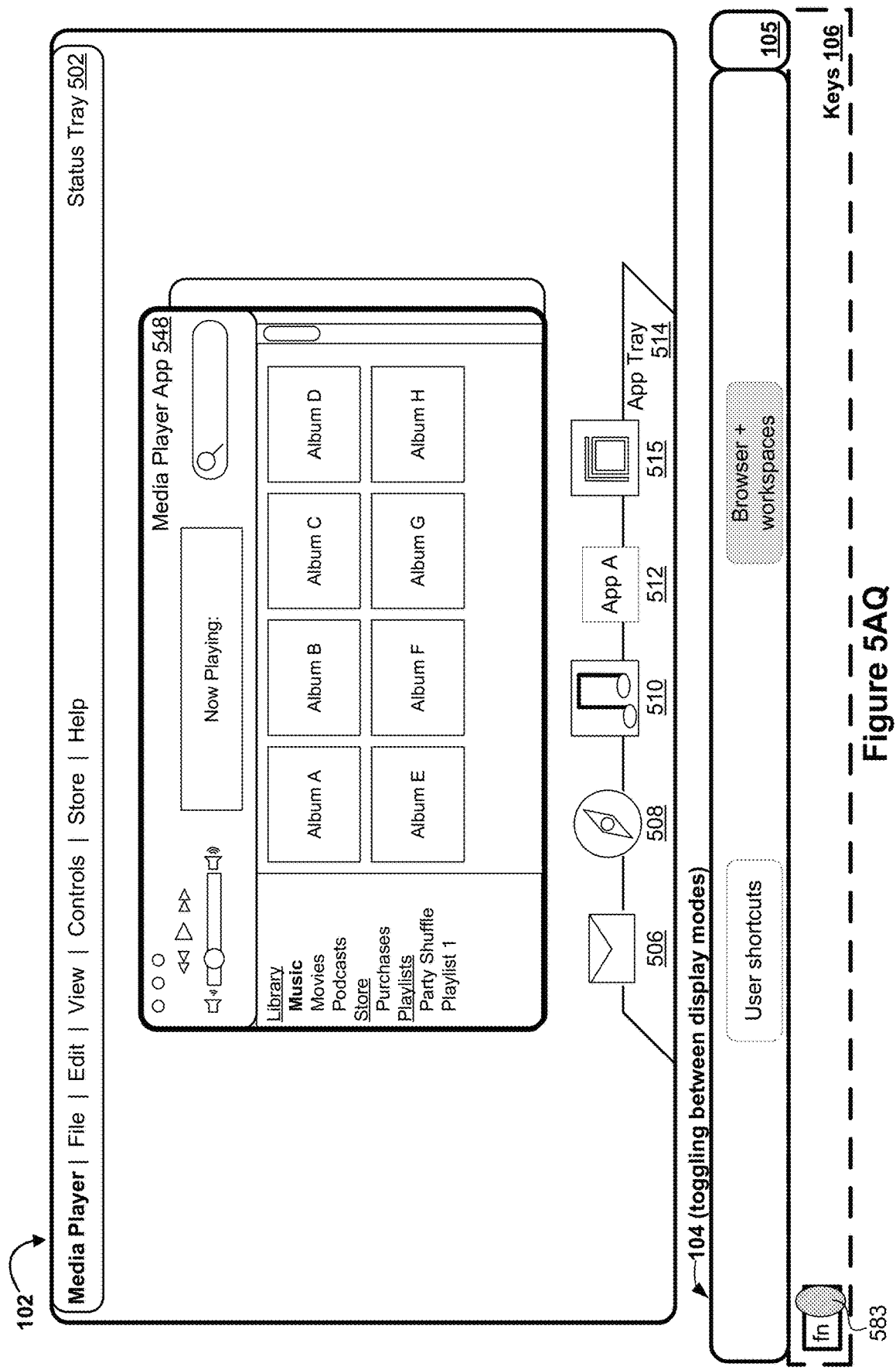
Figure 5A:
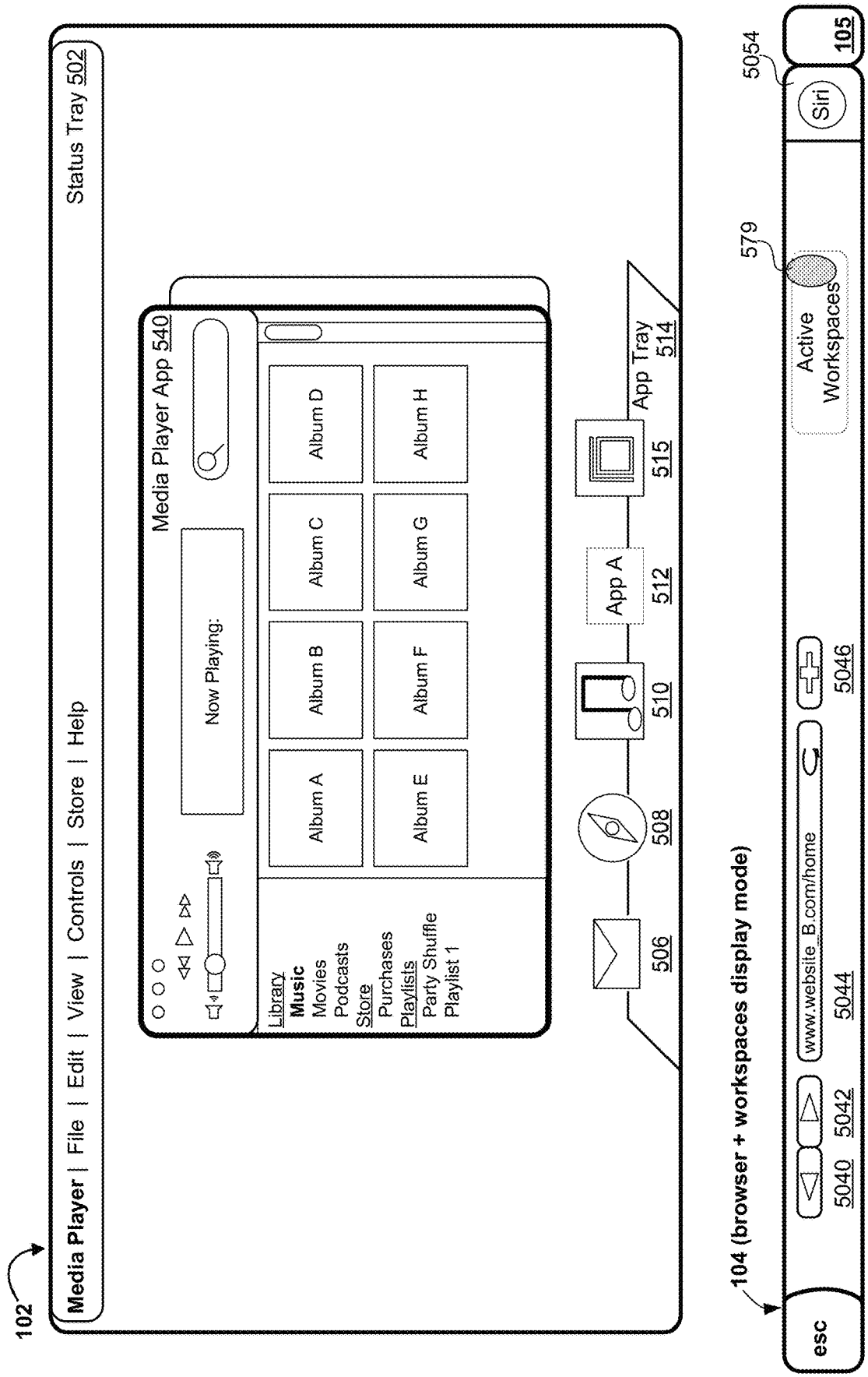
Figure 5A:
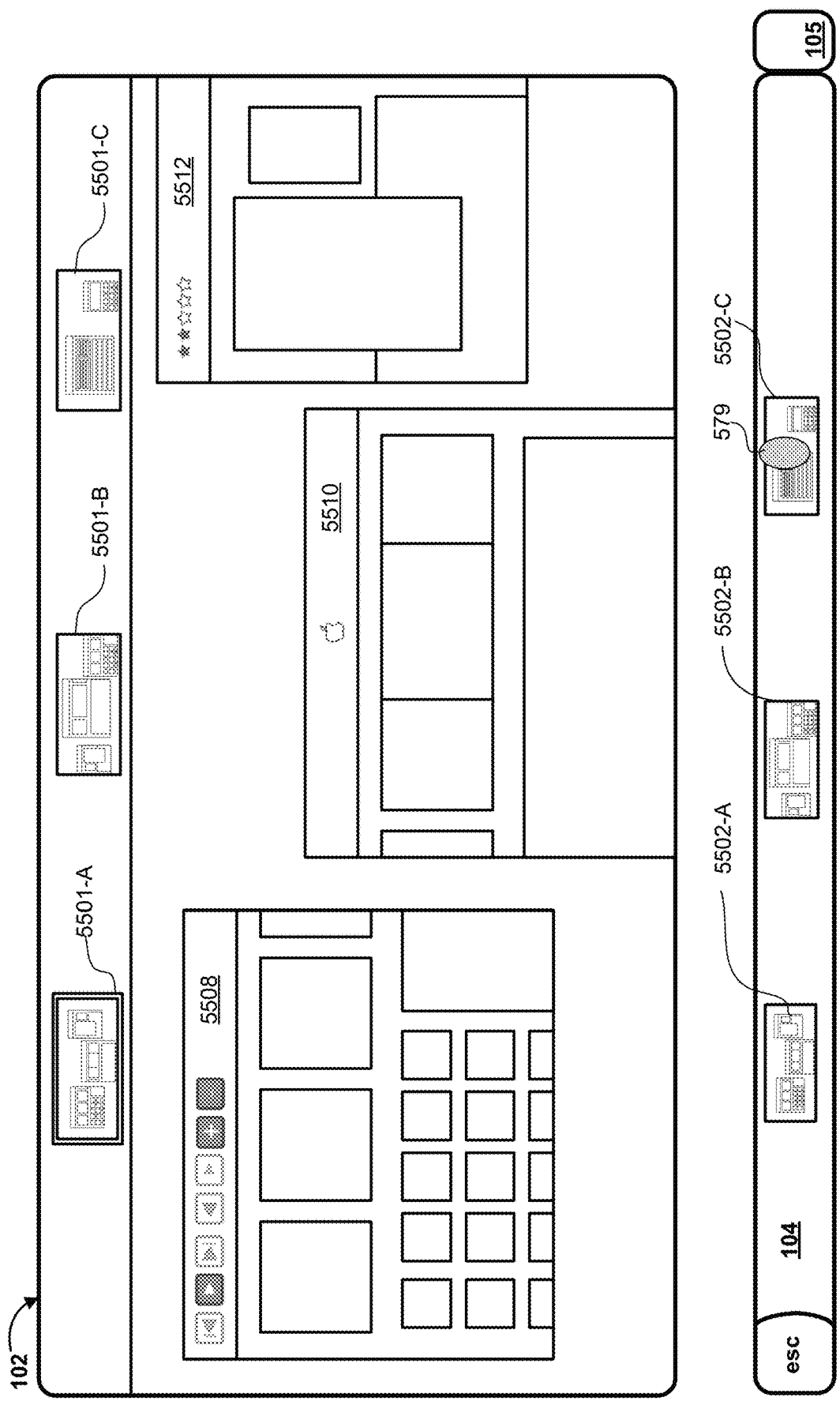
Figure 5A:
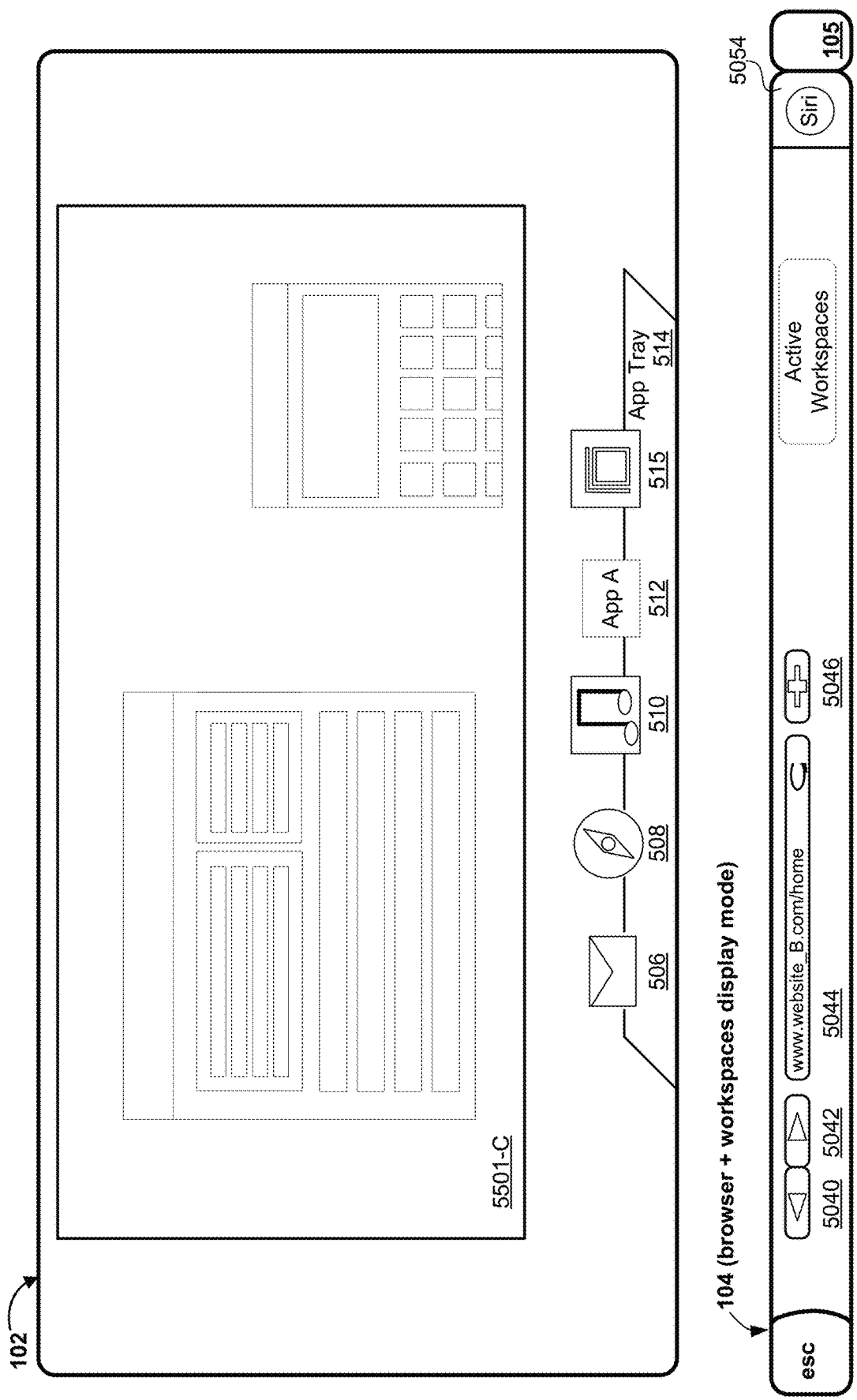
Figure 6B:
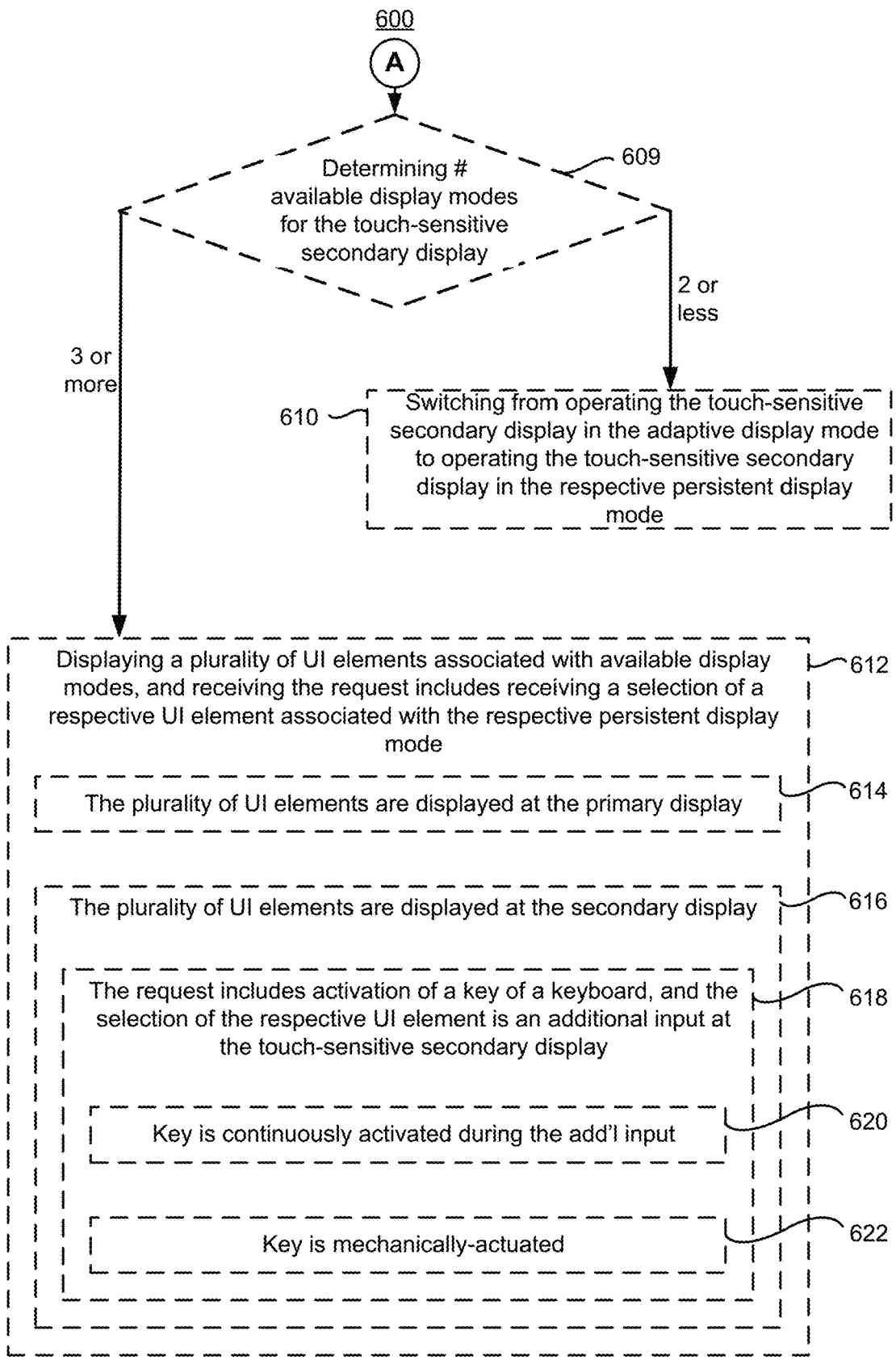

Users may also define new display modes for the touch-sensitive secondary display 104, as is shown in FIGS. 5W-5AF, in which the user creates a new display mode after providing an input 5018 (e.g., represented by an arrow in FIG. 5V) at button 534 (FIG. 5V), drags a variety of different user interface elements to within the secondary display 104 (FIGS. 5W-5AE), and then names the new display mode "Browser+Workspaces" (FIGS. 5AE-5AF). After creation of this new display mode, it is available for selection within the first portion 518 of the touch-bar management user interface 516 (and may be selected using an input 5072 to make it available system-wide to compatible applications), and may also be associated with an application that has been added to the second portion 520.

For example, as shown in FIG. 5AH, in response to an input 5074, the web browser application may be associated with the new display mode, as is pictured in FIG. 5AI. After this association has been established, then an input to open the web browser application (e.g., input 5076, FIG. 5AI) causes the secondary display to operate in the new display mode (e.g., in FIG. 5AJ the secondary display is operated in the new display mode, Browser+Workspaces).

Shifting to another application (e.g., mail application after input 5078 over an icon for the mail application, FIG. 5AJ causes the mail application to then be displayed in FIG. 5AK). Once the mail application is opened, the secondary display is operated in the workflows/macros display mode (FIG. 5AK) as the workflows/macros display mode is the current system-wide display mode for the secondary display.

In Figure 5AL, the user has opened the touch-bar management user interface and proceeds to deselect checkbox 522 (FIG. 5AM) and to deselect, checkbox 526 (FIG. 5AN), leaving just two display modes included with the available display modes as is shown in FIG. 5AO. FIG. 5AN also shows that, in some embodiments, when a request is received to remove the current system-wide default display mode from the available display modes (e.g., deselection of the checkbox 526 in FIG. 5AN), then a new system-wide default display mode is automatically (without any other user input) selected by the system. In this example, the user shortcuts display mode is selected as the new system-wide default display mode and, accordingly, the secondary display is switched to operate in the user shortcuts display mode in FIG. 5AN.

FIG. 5AO also shows that the user requests (via input 5084) to open the music player application, which is then opened in response to the input 5084 in FIG. 5AP.

In some embodiments, when just two display modes are available for system-wide usage, then providing the mode-switching input discussed above causes the display mode for the secondary display to toggle between these two display modes (instead of requiring the user to provide an additional input to select a desired display mode). For example, as shown in FIGS. 5AP and 5AQ, the user provides the mode-switching input (e.g., pressing a function key with input 583 at a keyboard with keys 106 that are adjacent to the secondary display 104) and, in response, the secondary display now shows representations of the two available display modes and a focus selector (grey highlighting depicted in FIG. 5AQ) is placed on the first representation associated the browser+workspaces display mode as that will be the current system-wide default display mode. The display mode of the secondary display 104 also switches from the user shortcuts display mode and to the browser+ workspaces display mode, as is shown in FIG. 5AR.

In some embodiments, the system moves directly from FIG. 5AP to FIG. 5AR, and does not display representations of the two available display modes on the secondary display, instead the system just directly toggles between the two available display modes.

FIG. 5AR additionally shows that a user may select the active workspaces affordance within the secondary display (e.g., by providing input 579) and, in response, the secondary display 104 and the primary display 102 are updated to include representations of the user's active workspaces (FIG. 5AS).

In certain embodiments, instead of having an active workspaces button, such as that shown in FIG. 5AR, the user may be able to use a mission control mode for the secondary display 104, in which representations of a user's active workspaces are persistently displayed within the secondary display 104. This mission control mode can be one of the display modes shown with associated checkboxes in the first portion 518 of the touch-bar management user interface 516.

FIG. 5AS shows an embodiment of a mission control mode that is displayed in response to selection of the active workspaces affordance from within the secondary display 104 or in response to launching an application that has been associated with the mission control mode. Once invoked by a user, the system displays one or more user interface elements each representing (e.g., via a miniaturized screenshot) a respective open desktop including its respective open and unhidden user interfaces or windows. In some embodiments, the one or more affordances 5502 of the open desktops are displayed on the secondary display 104. In other embodiments, the one or more affordances 5501 of the open desktops are displayed on the primary display 102. In yet other embodiments, the one or more affordances of the open desktops are displayed on both the primary 102 and secondary 104 displays.

In some embodiments, for the mission control mode and the user action mode, the user can long press (or deep press by applying more pressure with the input 579 depicted in FIG. 5AS) on a mission control affordance on the secondary display to display the one or more affordances of the open desktops on the secondary display (representations of the currently active spaces or desktops for the mission control mode (as is depicted in FIG. 5AS) or representations of the user actions for the user action mode). Once these affordances are displayed on the secondary display, the user can directly select one of these affordances to switch to that desktop/space or user action, or drag a finger over the affordances and lift-off to select the affordance under the user's finger (e.g., as shown in FIG. 5AS, the user lift-off while the input 579 is over affordance 5502-C and, in response, the workspace corresponding to affordance 5502-C is then displayed on the primary display for workspace 5501-C in FIG. 5AT).

Additional descriptions regarding FIGS. 5A-5AT are provided below in reference to methods 600-700.

FIGS. 6A-6D are a flowchart of a method 600 of using customized display modes for touch-sensitive secondary displays, in accordance with some embodiments. The method 600 is performed (602) at a computing system including one or more processors, memory, a first housing including a primary display, and a second housing at least partially containing a touch-sensitive secondary display that is distinct from the primary display. Some operations in method 600 are, optionally, combined and/or the order of some operations is, optionally, changed.

In some embodiments, the computing system is portable computing system 100 (FIG. 1A) or desktop computing system 200 (FIGS. 2A-2D). In some embodiments, the primary display is primary display 102 (FIG. 1A) which is implemented in display portion 110 (also referred to herein as a first housing 110 that includes the primary display 102) of portable computing system 100 (FIG. 1A) and the second housing is a body portion 120 of the portable computing system 100, and the second housing at least partially contains the touch-sensitive secondary display (e.g., dynamic function row 104, FIGS. 1A-1B) and a physical keyboard (e.g., the set of physical keys 106) (604).

In some embodiments, the second housing is not connected to the first housing (606), e.g., because the first housing is part of a first device and the second housing is part of a different device other than the first device (e.g., the second housing could be part of a mobile phone, a tablet device, or any other device that includes affordances that are displayed on a smaller secondary display while that other device is connected to a computing system that includes a larger primary display). As one non-limiting example, in some embodiments, the second housing is peripheral keyboard 206 (FIGS. 2A-2B) of desktop computing system 200, which at least partially contains the touch-sensitive secondary display (e.g., dynamic function row 104, FIGS. 2A-2B) and the physical keyboard (e.g., the set of physical keys 106, FIGS. 2A-2B). As another example, in some embodiments, the second housing is first peripheral input mechanism 212 (FIG. 2C) of desktop computing system 200, which at least partially contains the touch-sensitive secondary display (e.g., dynamic function row 104, FIG. 2C) and the second housing includes an input mechanism (e.g., touchpad 108, FIG. 2C) and does not include the physical keyboard. As one more example, in some embodiments, the secondary display is a narrow, rectangular OLED display that is positioned adjacent to a physical keyboard, such as the Touch Bar made by APPLE INC. of Cupertino, Calif. In other embodiments, the secondary display is any device that includes a smaller display than that of the primary display (e.g., the secondary display is a smart watch).)

As described below, the method 600 (and associated interfaces) enables use of customized display modes for touch-sensitive secondary displays. As shown in FIG. 6A, the method 600 initially includes displaying (602), on the primary display, a first user interface for a first application (e.g., a first application window for a music player application, as is shown in FIG. 5H), and the first user interface is in focus on the primary display. In this example, the first application has not been associated by a user with any one particular touch-bar display mode (see discussion below regarding use of a management user interface to associate applications with specific touch-bar display modes), which is depicted in FIG. 5G as the music player application is not included within the list of applications (also referred to as the second portion 520 of the touch-bar management user interface 516) that have been individually associated with a particular display mode. For the purposes of this disclosure, a user element "in focus" means that the user interface element is going to receive user input that is provided at the computing system (e.g., keyboard presses will be sent to the user interface that is in focus).

While the touch-sensitive secondary display is operating in an adaptive display mode in which at least some application-specific user interface elements are adaptively selected for display on a respective portion of the touch-sensitive secondary display based on a current state of the first user interface for the application (604) (e.g., the adaptive display mode is the current system-wide default display mode), the method includes: displaying, on the respective portion of the touch-sensitive secondary display, a plurality of application-specific user interface elements that are selected based on the current state of the first user interface for the application; and receiving a request to operate the touch-sensitive secondary display in a respective persistent display mode for the touch-sensitive secondary display, and the respective persistent display mode is distinct from the adaptive display mode. As an example, while the touch-sensitive secondary display 104 is operating in the adaptive display mode in FIG. 5I, the plurality of application-specific user interface elements shown in the secondary display of FIG. 5I are selected as the music player application is in a state in which it is currently displaying available podcast selections. Additionally, FIG. 5J shows that the request to operate the touch-sensitive display in a respective persistent display mode is received (e.g., a mode-switching input is received, such as a selection of a function key on a keyboard, and a selection is made of one of the workflows/macros display mode by tapping with input 558 on user interface element 556 in FIG. 5K).

In some embodiments, while the secondary display is operating in the adaptive display mode, the touch-sensitive secondary display also (in addition to the plurality of application-specific user interface elements) displays one or more system-level affordances that do not change based on the current state of the application (e.g., only each of the app-specific affordances are adaptively selected and the one or more system-level affordances are continuously displayed in the touch-sensitive secondary display, and examples of the one or more system-level affordances are the volume, brightness, and Siri controls shown in FIG. 5I).

In response to receiving the request, the method includes operating (606) the touch-sensitive secondary display in the respective persistent display mode (and ceasing to operate the touch-sensitive secondary display in the adaptive display mode), including updating the respective portion of the touch-sensitive secondary display to display a fixed set of user interface elements associated with the respective persistent display mode. For example, as shown in FIG. 5N, after the request is received to operate the secondary display 104 in the workflows/macros display mode, the secondary display 104 displays user interface elements associated with that display mode (e.g., user interface elements 5602, 5604, and other user interface elements associated with other workflow tasks up to Workflow N). In some embodiments, the user interface elements 5602, 5604 are selected by a user when the user creates a new touch-bar display mode (creating new touch-bar display modes is described elsewhere in this description and, for brevity, those details are not repeated here).

After changing focus to a second user interface for a second application (e.g., after detecting a request to open a second application (such as a user selecting a UI window for the second app), so that the second user interface for the second application then is in focus on the primary display instead of the first user interface for the first application): displaying (608), on the primary display, the second user interface for the second application; and maintaining display (608), on the respective portion (e.g., all) of the touch-sensitive secondary display, of the fixed set of user interface elements associated with the respective persistent display mode. An example of the request to open the second application is shown in FIG. 5N, in which a user provides an input 586 to launch a web browser application on the primary display and, in response to this input, (i) a second user interface for the second application is displayed (e.g., a user interface 588 for the web browser application, FIG. 5O) and (ii) display of the same fixed set of user interface elements that was displayed in FIG. 5N is maintained for the secondary display 104 (FIG. 5O).

In some instances, users of computing systems are unable to change the display mode of a touch-sensitive secondary display from an adaptive display mode to a persistent display mode. In the adaptive display mode, application-specific user interface elements are selected by the computing system and displayed on the touch-sensitive secondary display based on a state of an application that is currently in focus, while in the persistent display mode a fixed set of user interface elements is continuously/persistently displayed on the touch-sensitive secondary display and the fixed set continues to be displayed even as the state of the application may change. Receiving a request from the user to operate in the predefined persistent display mode provides the user with a convenient way to quickly switch to the persistent display mode. Providing this option to quickly switch between display modes enhances operability of the device and makes the human-machine interface more efficient (e.g., by allowing the users to easily customize their use of the touch-sensitive secondary display without having to waste time manually searching for desired user interface elements that may be difficult to locate or may be unavailable based on certain states of the application).

In some embodiments, users are able to quickly switch between display modes for the secondary display by simply providing the request discussed above (e.g., by providing a mode-switching input such as a press on a function key of a keyboard). Whether the secondary display simply toggles between available display modes or whether a user needs to select which display mode to switch to can depend on how many display modes are currently available display modes. For example, turning now to FIG. 6B and continuing from the "A" marker shown with operation 604 in FIG. 6A, the method also includes determining (609) a number of available display modes for the touch-sensitive secondary display (e.g., how many of the checkboxes within the first portion 518 of the touch-bar management user interface 516 are currently selected). In response to receiving the request: in accordance with the determination at operation 609 indicating that the touch-sensitive secondary display is associated with two available display modes for the touch-sensitive secondary display (609-2 or less, such as is shown on FIG. 5AN), the method includes switching (610) from operating the touch-sensitive secondary display in the adaptive display mode to operating the touch-sensitive secondary display in the respective persistent display mode (e.g., in FIGS. 5AQ-5AR, in response to a mode-switching input the secondary display toggles to a different display mode, such as from the user shortcuts display mode and switches to the browser+ workspaces display mode).

In some embodiments, this switching operation 610 is performed without receiving additional input at either the touch-sensitive secondary display or at the primary display, other than the mode-switching input. Therefore, display modes at the touch-sensitive secondary display are, optionally, switched between adaptive and persistent display modes using a single key press (e.g., by pressing a function key at a keyboard) and without providing any other input). In some embodiments, when only two display modes are available (e.g., just the predefined persistent display mode and the adaptive display mode), then representations of each of the two display modes can still be displayed at the secondary or primary display (e.g., as is shown in FIG. 5AQ), but no explicit selection of these display modes as needed as simply pressing the function key causes the secondary display to switch between the two display modes. In some embodiments switching between the two display modes is permanent and continues after activation of the function key ends, with a second activation of the function key switching back between the two display modes. In some embodiments, switching between the two display modes is temporary and only continues as long as activation of the function key continues, and the device switches back to the original display mode in response to detecting an end of activation of the function key.

Switching from operating the touch-sensitive secondary display in the adaptive display mode to operating the touch-sensitive secondary display in the predefined persistent display mode provides the user with a convenient way to quickly switch between two display modes. Providing this option enhances operability of the device and makes the human-machine interface more efficient (e.g., by helping the users easily select the predefined display mode without wasting computing resources, and thereby allow the users to easily customize their use of the touch-sensitive secondary display without having to waste time manually searching for desired display modes that may be difficult to locate).

If there are three or more display modes available, then simply toggling may be inefficient as users could more quickly select a desired display mode from among the three or more available display modes. Referring back to FIG. 6B, in response to receiving the request and before operating the touch-sensitive secondary display in the respective persistent display mode: in accordance with the determination at operation 609 indicating that three or more display modes are available for the touch-sensitive secondary display (609-3 or more, an example of which is depicted in FIG. 5F in which three display modes have been selected as being available display modes), the method includes displaying (612) a plurality of user interface elements associated with available display modes (e.g., user interface elements 552, 554, and 556 are shown in secondary display 104), including a first user interface element associated with the respective persistent display mode (e.g., user interface element 554, FIG. 5J), a second user interface element associated with the adaptive display mode (e.g., user interface element 552, FIG. 5J), and a third user interface element associated with an additional persistent display mode (e.g., user interface element 556, FIG. 5J). Receiving the request includes receiving a selection of a respective user interface element that is associated with the respective persistent display mode (e.g., a user taps on one the user interface element 556 associated with the workflows/macros available display mode, FIG. 5K).

In some instances, there may be three or more display modes associated with the secondary display and users are unable to easily toggle between these modes, without having to waste time navigating through complicated menu structures. Displaying user interface elements respectively associated with each of the three or more display modes provides the user with a convenient way to quickly select a predefined display mode where there are three or more display modes to select from. Providing this option to quickly select between display modes enhances operability of the device and makes the human-machine interface more efficient (e.g., by helping the users easily select the predefined display mode without wasting computing resources, and thereby allow the users to easily customize their use of either the primary display or touch-sensitive secondary display without having to waste time manually searching for desired display modes that may be difficult to locate).

In some embodiments, the plurality of user interface elements associated with available display modes are displayed at the primary display (614). An example of this is shown in FIGS. 5L and 5M. Displaying the three or more display mode options at the primary display provides the user with a convenient way to quickly select a display mode, while also being able to easily view which modes are available. Providing this option to quickly select between display modes enhances operability of the device and makes the human-machine interface more efficient (e.g., by helping the users easily select the predefined display mode without wasting computing resources, and thereby allow the users to easily customize their use of the primary display or touch-sensitive secondary display without having to waste time manually searching for desired display modes that may be difficult to locate).

Alternatively, or in addition to display of the plurality of user interface elements at the primary display with operation 614, the plurality of user interface elements associated with available display modes are displayed at the touch-sensitive secondary display (616). An example of this is shown in FIGS. 5J, 5K, and 5L. Displaying the three or more display mode options at the touch-sensitive secondary display provides the user with a convenient way to quickly select a display mode. Providing this option to quickly select between display modes enhances operability of the device and makes the human-machine interface more efficient (e.g., by helping the users easily select the predefined display mode without wasting computing resources, and thereby allow the users to easily customize their use of the primary display or touch-sensitive secondary display without having to waste time manually searching for desired display modes that may be difficult to locate).

In some embodiments, users can both provide the mode-switching input (e.g., pressing the function key at the keyboard) and also provide an additional input to select which display mode to use for the secondary display. For example, the request (e.g., provided via the mode-switching input) includes (618) activation of a key of a keyboard (e.g., a function key on the keyboard) that is at least partially contained within the second housing that contains the touch-sensitive secondary display (e.g., the touch-sensitive secondary display is positioned above the keyboard in the same plane as the keyboard, and the selection of the respective user interface element that is associated with the predefined persistent display mode is an additional input at the touch-sensitive secondary display). In some embodiments, the additional input (e.g., input 558, FIG. 5K) is used when the application is associated with 3 or more display modes, and is not used when the application is associated with 2 or fewer display modes (instead providing the mode-switching input toggles the active display mode).

Providing for an additional input at the touch-sensitive secondary display while the input remains in contact with a key of a keyboard during the additional input provides the user with a convenient way to quickly invoke the available predefined display modes to select from. Providing this option to quickly select between display modes enhances operability of the device and makes the human-machine interface more efficient (e.g., by helping the users easily select the predefined display mode without wasting computing resources, and thereby allow the users to easily customize their use of the primary display or touch-sensitive secondary display without having to waste time manually searching for desired display modes that may be difficult to locate).

In some embodiments, the key is continuously activated during the additional input (620). For example, as shown in FIG. 5K, the function key may be continuously activated while the user provides the additional input 558.

In some embodiments and as discussed previously, the key is a mechanically-actuated key (622), e.g., a function key that is mechanically-actuated on the keyboard.

In some embodiments, in conjunction with the mode-switching input (and/or the additional input discussed above), a focus selector can be moved between the plurality of user interface elements associated with the available display modes. With reference now to FIG. 6C, in response to receiving the request and before operating the touch-sensitive secondary display in the respective persistent display mode (624): displaying user interface elements respectively associated with each available display mode for the touch-sensitive secondary display, including a first user interface element associated with the adaptive display mode (e.g., the first user interface element is the button shown in FIG. 5AQ with the text "user shortcuts") and a second user interface element associated with the predefined persistent display mode (e.g., the second user interface element is the button shown in FIG. 5AQ with the text "browser+workspaces"); and moving a focus selector from the first user interface element to the second user interface element (e.g., the focus selector (providing a greyed background for the button) is now over the second user interface element in FIG. 5AQ to provide a clear visual cue that the browser+workspaces display mode will become the active display mode for the touch bar).

Example embodiments of the fixed set of user interface elements that are displayed in the respective portion of the secondary display after activation of the respective persistent display mode are provided next with reference to FIG. 6C.

In one example, the fixed set of user interface elements associated with the respective persistent display mode consists of (626) representations of one or more shortcuts chosen by a user that, when selected at the touch-sensitive secondary display, cause activation of a corresponding function associated with the respective shortcut. This is illustrated in FIG. 5AP in which the secondary display includes representations of one or more shortcuts including a first representation 5603 of a first shortcut for "switch apps," a second representation 5605 of a second shortcut for "force quit," and other representations for other shortcuts until Shortcut N. Activation of any of these representations causes activation of a corresponding function, e.g., activation of the first representation 5603 causes the system to perform a function of cycling between open applications (which might otherwise require a sequence of keyboard inputs instead of a single input at the secondary display 104). In some instances, a user is unable to perform various functions due to the high number of manual steps involved in performing the respective functions. Including representations of one or more shortcuts selected by a user as the display modes provides the user with a convenient way to select a display mode that can quickly perform these respective functions. This enhances operability of the device and makes the human-machine interface more efficient (e.g., by helping the users easily perform functions without wasting computing resources, and thereby allow the users to easily customize their use of the device without having to waste time manually performing the steps to carry out the desired functions).

As another example, the fixed set of user interface elements associated with the respective persistent display mode consists of (628) representations of function keys chosen by a user that, when selected at the touch-sensitive secondary display, cause activation of a corresponding function associated with the respective function key (e.g., examples of the default function keys include F1, F2, F3, etc. keys that are each associated with different functions assigned to those keys by a user or by the system). In some instances, a user is unable to utilize default function keys because the touch-sensitive secondary display is operating in a display mode that does not include function keys. Including representations of function keys as the display modes provides the user with a convenient way to select a display mode that allows the user to utilize function keys. This enhances operability of the device and makes the human-machine interface more efficient (e.g., by helping the users easily perform functions associated with the function keys without wasting computing resources, and thereby allow the users to easily customize their use of the device without having to waste time manually performing the functions associated with the function keys).

As one more example, the fixed set of user interface elements associated with the respective persistent display mode consists of (630) representations of text-entry options chosen by a user that, when selected at the touch-sensitive secondary display, cause a corresponding change to text that is displayed on the primary display. For example, the representations of text-entry options can include a first representation of a text-entry option that causes bolding of selected text, a second representation of a text-entry option that causes italicizing of selected text, etc. Examples of applications associated with text entry are word processing interfaces and the change to text that is displayed optionally includes bolding text, italicizing text, adding text, adding an emoji, and any other text entry modifications. In some instances, a user is unable to enter text at the touch-sensitive secondary display. Including representations of applications associated with text entry as the display modes provides the user with a convenient way to select a display mode that allows the user to enter text at the touch-sensitive secondary display. This enhances operability of the device and makes the human-machine interface more efficient (e.g., by helping the users easily enter text at the touch-sensitive secondary display without wasting computing resources, and thereby allow the users to easily customize their use of the device).

In one additional example, the fixed set of user interface elements associated with the respective persistent display mode consists of representations of one or more automated tasks chosen by a user that, when selected at the touch-sensitive secondary display, cause activation of a corresponding series of functions associated with the respective automated task. This is illustrated in FIG. 5AM in which representations of a number of different automated tasks are shown within the secondary display, including a first representation 5602 of a first automated task for taking a screenshot and adding that screenshot to an email application (labelled as "screenshot+email" in FIG. 5AM), a second representation 5604 of a second automated task for saving a currently open document to the user's desktop (labelled as "save to desktop" in FIG. 5AM), etc. to representation of Workflow N. Examples of the one or more automated tasks can include macros, workflow routines (e.g., AUTOMATOR routines such as those available on operating systems provided by APPLE INC. of Cupertino, Calif.), and other groupings of functions that allow users to perform multiple operations at once, based upon selection of a single user interface element. An example includes a user setting up a workflow automator task that, based on selection of a single representation at the touch bar, causes the computing system to copy a currently displayed image, add it to an email, and then send the email to a predefined list of email addresses (e.g., the user's family members). In some instances, a user is unable to perform various functions due to the high number of manual steps involved in performing the respective functions. Including representations of one or more macros selected by a user as the display modes provides the user with a convenient way to select a display mode that can quickly perform these respective functions. This enhances operability of the device and makes the human-machine interface more efficient (e.g., by helping the users easily perform functions without wasting computing resources, and thereby allow the users to easily customize their use of the device without having to waste time manually performing the steps to carry out the desired functions).

In one final example, the fixed set of user interface elements associated with the respective persistent display mode are representations of one or more system-level control options chosen by a user that, when selected at the touch-sensitive secondary display, cause activation of a corresponding system-level function. The representations of the one or more system-level control options may include a first representation of a first system-level control option (e.g., an option for controlling brightness at the primary display), a second representation of a second system-level control option (e.g., an option for controlling volume), etc.

Turning next to FIG. 6D, the method can optionally include: continuing to operate (636) the touch-sensitive secondary display in the respective persistent display mode until an additional request is received to operate the touch-sensitive secondary display in a display mode other than the respective persistent display mode. In some embodiments, the persistent display mode is only exited after an explicit request is received to switch to a different display mode. For example, the additional request may include a user activating (e.g., tapping or pressing) a function key to toggle from the predefined persistent display mode back to the adaptive display mode (if there are only 2 display modes associated with the application, such as the example discussed above in reference to FIGS. 5AP-5AR). As another example, the additional request may include the user activating (e.g., tapping or pressing) the function key and a user then selecting a representation of the adaptive display mode that is displayed within the secondary display in response to the activation of the function key (if there are 3 or more display modes associated with the application, then this example may apply, as is discussed above in reference to FIGS. 5I-5M).

In some instances, the touch-sensitive secondary display mode operates in the predefined persistent display mode and the user is unable to switch back to the adaptive display mode. Receiving an additional request to operate the touch-sensitive secondary display in the adaptive display mode allows the user to actively switch back to the adaptive display mode. Providing this option enhances operability of the device and makes the human-machine interface more efficient (e.g., by helping the users easily select the predefined display mode without wasting computing resources, and thereby allow the users to easily customize their use of the touch-sensitive secondary display without having to waste time manually searching for desired display modes that may be difficult to locate).

FIG. 6D also shows that the method also optionally includes, while the touch-sensitive secondary display is operating in the respective persistent display mode (638): in accordance with determining that focus has changed to a third user interface for a different application, the different application being associated with a user-selected display mode for the touch-sensitive secondary display: ceasing to operate the touch-sensitive secondary display in the respective persistent display mode and instead operating the touch-sensitive secondary display in the user-selected display mode. For example, as is shown in FIG. 5AI, the user provides a request to launch the web browser application using input 5076 and, in response, in FIG. 5AJ, focus changes to the third user interface for the different application (in this example the browsing interface for the web browser application). Based on this focus change, the secondary display 104 is then operated in the user-selected display mode that was previously associated with the web browser application, which is the browser+workspaces display mode that was associated with the web browser application in FIGS. 5AG-5AI.

In some instances, while the touch-sensitive secondary display mode operates in the predefined persistent display mode, a third application is opened. But the third application has been specifically associated (e.g., using the management UI discussed below) with a display mode that is distinct from the predefined persistent display mode. Detecting an additional request to open the third application overrides the predefined persistent display mode by displaying the third application in the display mode associated with the third application. This function enhances operability of the device and makes the human-machine interface more efficient (e.g., by automatically, and without input from the users, using a display mode that has been specifically associated with the third application, thereby allowing users to customize their use of the secondary display to suit their preferences and helping users to avoid wasting time having to manually switch to their preferred display mode every time they open (or are using) the third application).

It should be understood that the particular order in which the operations in FIGS. 6A-6D have been described is merely one example and is not intended to indicate that the described order is the only order in which the operations could be performed. One of ordinary skill in the art would recognize various ways to reorder the operations described herein.

The touch bar interface allows users to (i) choose a plurality of modes in which the touch bar can operate, and (ii) allow users to assign particular touch bar modes to particular applications. As described at least partially above, the tough bar can operate in a plurality of available touch bar modes, including without limitation, a dynamic application mode, a user shortcuts mode, a workflows or macros mode, a text entry mode, an expanded control strip mode, a default function keys mode, and a Siri with browser mode. These can be seen in FIG. 5AM. In the dynamic application mode, the affordances on the touch bar change depending on the application that is in-focus or currently in use and displayed on the primary display, e.g., a mail application will display mail specific affordances on the touch bar. In the user shortcuts mode, the user can customize the touch bar to include shortcuts. In the workflows/macros mode the user can create macros each having an affordance on the touch bar for invoking the workflow or macro. The text entry mode includes affordances related to text entry, like formatting, font size etc. The expanded control strip mode includes expanded system level controls like volume slides, screen brightness controls, etc. The default function keys mode includes affordances for standard keyboard function keys, like F1, F2, F3 and so on. The browser+workspaces mode includes affordances related to browser functionality, and an affordance that allows a user to easily access their current workspaces.

Some users, however, have found that changing the affordances on the touch bar, e.g., in dynamic applications control mode, is distracting, and would prefer having a persistent mode for particular applications. For example, when using the mail application, the user may prefer having a persistent text entry mode displayed on the touch bar instead of a dynamic applications control mode. As such, some embodiments allow the user to assign persistent modes on an application by application basis. FIG. 5AM shows a system preferences touch bar user interface 516 with application specific touch bar modes 520, such as a persistent text entry mode 542 of the touch bar assigned to the mail application 540 and a Siri with browser mode 5016 assigned to the web browser application 5014. FIG. 5AM also shows the touch bar 104 displaying the text entry mode that includes affordances for changing the font size 568, bold 574, italics 576, and underline 578.

FIGS. 7A-7F flowchart one or more embodiments of a method 700 that allows users to associate touch bar display modes with various applications, in accordance with some embodiments. The method 700 is performed (702) at a computing system including one or more processors, memory, a first housing including a primary display, and a second housing at least partially containing a touch-sensitive secondary display that is distinct from the primary display. Some operations in method 700 are, optionally, combined and/or the order of some operations is, optionally, changed.

In some embodiments, the computing system is portable computing system 100 (FIG. 1A) or desktop computing system 200 (FIGS. 2A-2D). In some embodiments, the primary display is primary display 102 (FIG. 1A) which is implemented in display portion 110 (also referred to herein as a first housing 110 that includes the primary display 102) of portable computing system 100 (FIG. 1A) and the second housing is a body portion 120 of the portable computing system 100, and the second housing at least partially contains the touch-sensitive secondary display (e.g., dynamic function row 104, FIGS. 1A-1B) and a physical keyboard (e.g., the set of physical keys 106) (704).

In some embodiments, the second housing is not connected (706) to the first housing, e.g., because the first housing is part of a first device and the second housing is part of a different device other than the first device (e.g., the second housing could be part of a mobile phone, a tablet device, or any other device that includes affordances that are displayed on a smaller secondary display while that other device is connected to a computing system that includes a larger primary display). As one non-limiting example, in some embodiments, the second housing is peripheral keyboard 206 (FIGS. 2A-2B) of desktop computing system 200, which at least partially contains the touch-sensitive secondary display (e.g., dynamic function row 104, FIGS. 2A-2B) and the physical keyboard (e.g., the set of physical keys 106, FIGS. 2A-2B). As another example, in some embodiments, the second housing is first peripheral input mechanism 212 (FIG. 2C) of desktop computing system 200, which at least partially contains the touch-sensitive secondary display (e.g., dynamic function row 104, FIG. 2C) and the second housing includes an input mechanism (e.g., touchpad 108, FIG. 2C) and does not include the physical keyboard. As one more example, in some embodiments, the second housing is part of a wearable computing device (708), such as a smart watch.

As described below, the method 700 (and associated interfaces) allows users to associate touch bar modes with various applications, and to define which touch bar modes are available system-wide. The examples and descriptions provided above in reference to method 600 are also applicable to method 700 and, for brevity, those examples and descriptions are generally not repeated here.

FIGS. 7A-F are flow charts of methods for using or interacting with a touch bar management user interface, such as the touch bar interface 516 introduced in FIG. 5A. In particular, FIG. 7 is flow chart of a method for allowing users to assign persistent modes on an application by application basis. The method is performed at a computing system comprising one or more processors, a first housing that includes a primary display, memory, and a second housing (that is preferably distinct from the first housing) at least partially containing a touch-sensitive secondary display that is distinct from the primary display and one or more input devices. This computing system is described above with respect to FIGS. 2A-2C. In some embodiments, the secondary display is a narrow, rectangular OLED display that is positioned adjacent to a physical keyboard. A suitable secondary display is Applicant (APPLE INC.'s) Touch Bar. In some embodiments, the secondary display is any device that includes a smaller display than that of the primary display (e.g., the secondary display is a smart watch).

Initially, a management user interface 516 (see also FIG. 5AG) for the touch-sensitive secondary display is displayed 702 on the primary display 102. The management user interface includes concurrently displayed representations of a plurality of applications (shown here as A1 and A2, and shown in FIG. 5AG as Mail 540 and Web Browser 5014), including a representation of a first application (e.g., A1 or Mail 540 in FIG. 5AG) that, before being displayed within the management user interface, was associated with one or more display modes of a first plurality of available display modes for the touch-sensitive secondary display. For example, the available display modes may include a dynamic application mode 522, a user shortcuts mode 524, a workflows or macros mode 526, a text entry mode 528, an expanded control strip mode 530, a default function keys mode 532, and a browser and workspaces mode 5072, as shown in FIG. 5AG. Also displayed is a representation of a second application (e.g., A2 in FIG. 7A or Web Browser 5014 in FIG. 5AG) that, before being displayed within the management user interface, was associated with one or more display modes of a second plurality of the available display modes for the touch-sensitive secondary display. In some embodiments, the first and second plurality of the available display modes are the same and in other embodiments they are different. In some embodiments, the first and second pluralities of available display modes may be different if the first or second application is incompatible with some of the available display modes, e.g., if the mail application is incompatible with the browser mode. A discussion of the selection of the plurality of available display modes is provided below.

In some embodiments, the management user interface 516 is accessed and/or invoked by navigating to the computing system's settings or system preferences to select a user interface element that invokes the management user interface for customizing the secondary display. In other embodiments, the management user interface 516 is accessed and/or invoked directly from a management user interface affordance on the secondary display (i.e., touch bar).

Next, it is detected at 706 whether one or more inputs (represented by the arrow 704) received at the one or more input devices correspond to a request to modify which of the available display modes is associated with the first application (e.g., A1 or Mail 540 in FIG. 5AG). For example, the user may select a touch bar display mode to associate with the A1 (or Mail 540 in FIG. 5AG) application from a pull-down list of available display modes. An example of step 706 is described above in relation to FIGS. 5E-1 to 5E-3, and 5F to 5G.

At 710, in response to detecting the one or more inputs, the first application (e.g., A1 or Mail 540 in FIG. 5AG) is associated with a first display mode (e.g., M1 or Text Entry mode 542 in FIG. 5AG) of the available display modes, and the management user interface 516 is updated to indicate that the first application (e.g., A1 or Mail 540 in FIG. 5AG) is associated with the first display mode (e.g., M1 or Text Entry mode 542 in FIG. 5AG) of the available display modes for the touch-sensitive secondary display. Thereafter, at 714, whenever there is a change in focus at the primary display to a user interface associated with the first application (e.g., A1 or Mail 540 in FIG. 5AG), the touch-sensitive secondary display 104 begins to operate in the first display mode (e.g., M1 or Text Entry mode 542 in FIG. 5AG), as shown by 716.

As described above, in some embodiments, the available display modes include an adaptive display mode for the touch-sensitive secondary display, at least one user-defined display mode (e.g., a user may go through a customization process in which they are able to select user interface elements to include on the secondary display in conjunction with a particular display mode, and that user-defined display mode may then be associated through the management user interface with different applications), at least one system-defined display mode (e.g., function keys, a browser mode, and a workspaces mode (As described in relation to FIGS. 5AS-5AT above). The available display modes include those display modes that are currently enabled and does not include display modes that have been disabled within the management user interface, such as ones for which an associated checkbox has been un-checked), as described in further detail below.

In prior systems, users were unable to associate available display certain modes of a touch-sensitive secondary display with certain applications displayed on a primary display. Displaying a management user interface on the primary display allows a user to predefine an association between such secondary display (i.e., touch bar) display modes and applications. In some embodiments, detecting an input selecting a first application and detecting an additional input at a respective option for a first display mode automatically associates the first application with the first display mode. Providing this option enhances operability of the device and makes the human-machine interface more efficient (e.g., by allowing the users to predefine an association between a display mode and an application without wasting computing resources during the operation of the application, and thereby allow the users to easily customize their use of the touch-sensitive secondary display without having to waste time manually searching for desired display mode features that may be difficult to locate).

In some embodiments, the display mode for an application is changed while maintaining display of other applications and their selected display modes. In particular, at 720 (FIG. 7B), the display of the representation of the second application (e.g., A2 or Web Browser 5014 in FIG. 5AG) is maintained when (i) the request is detected to associate the first application (e.g., A1 or Mail 540 in FIG. 5AG) with the first display mode (e.g., M1 or Text Entry mode 542 in FIG. 5AG), and (ii) the management user interface is updated, as shown at 722. In this way, the user is able to remove or change an associated display mode for a respective application while leaving untouched, i.e., maintaining, display of the other application(s) on the list of applications.

Allowing users to modify display modes for a respective application while continuing to display other applications on the list of one or more applications helps to ensure that users can make modifications to associated display modes in a way that requires a small number of inputs while also ensuring that users are still able to see information regarding the other applications. This, in turn, helps to enhance operability of the device and makes the human-machine interface more efficient.

In some embodiments, at 724, one or more additional inputs are detected, via the one or more input devices, that correspond to a request to modify which of the available display modes is associated with the second application. For example, an additional input is shown by the arrow 726. In response to detecting the one or more additional inputs, at 728, associating the second application with a second display mode of the available display modes, and updating the management user interface to indicate that the second application is associated with the second display mode for the touch-sensitive secondary display. In some embodiments, the second display mode is distinct from the first display mode, while in other embodiments, they are the same. Thereafter, at 734, a change in focus at the primary display to a user interface associated with the second application causes the touch-sensitive secondary display to begin operating in the second display mode. This is shown, for example, by 732. The available display modes include the display modes described above.

In some embodiments, the display mode for an application can be changed while maintaining display of other applications and their selected display modes. In particular, as described above for the first application and display mode, at 738 (FIG. 7C) (i) detecting the request to modify which of the available display modes is associated with the second application, (ii) the associating the second application with the second display mode, and (iii) updating the management user interface to indicate that the second application is associated with the second display mode, are all performed while maintaining display of the representation of the first application within the management user interface. In this way, the user is able to remove one of the associated display modes for the respective application while maintaining display of the other application on the list of applications.

Allowing users to modify display modes for a respective application while continuing to display other applications on the list of one or more applications helps to ensure that users can make modifications to associated display modes in a way that requires a small number of inputs while also ensuring that users are still able to see information regarding the other applications. This, in turn, helps to enhance operability of the device and make the human-machine interface more efficient.

In some embodiments, at 742, while the touch-sensitive secondary display is operating in a display mode (M?) other than the first display mode (e.g., M1) (e.g., an adaptive or persistent display mode), receiving a request to change focus on the primary display to a user interface for the first application on the primary display. For example, the request includes a user clicking on an affordance on the primary display to invoke the first application, as shown by the arrow 744, or selecting a user interface associated with the first application but that was previously not in-focus on the primary display. In response to receiving the request, at 746, (i) ceasing to operate the touch-sensitive secondary display in the display mode (M?) other than the first display mode and instead operating the touch-sensitive secondary display in the first display mode (e.g., M1), and (ii) displaying, on the touch-sensitive secondary display, user interface elements associated with the first display mode (e.g., M1), as depicted by 738.

Ensuring the user-specified associations between applications and second-display display modes are maintained as a user opens different applications helps to ensure that users are easily able to find the user interface elements within the secondary display that they would like to use. In this example, ensuring that the secondary display is switched to operate in the new user-selected display mode, which was specifically associated with the particular application, once that particular application is open, ensures that the user's preference is followed. This enhances operability of the device and makes the human-machine interface more efficient (e.g., by ensuring that user's expectations are met and that they are able to fluidly interact with the secondary display, consistent with their preferences for what should be displayed therein, as they move between different applications).

In some embodiments, user can enable display modes available for selection. At 750 (FIG. 7D), respective options for enabling or disabling display modes for the touch-sensitive secondary display are displayed within the management user interface on the primary display. For example, the various available secondary display modes described above are depicted in a window within the management user interface, as depicted by 752. This can occur at any time, e.g., before or after an application is associated with a particular display mode. In some embodiments, the options (e.g., radio buttons or check-boxes) for enabling or disabling display modes for the touch-sensitive secondary display are displayed adjacent to the list of one or more applications. Reference numeral 752 shows an example where check-boxes are used to allow for a binary choice between enabling or disabling a respective option associated with one of the available display modes. display modes for the touch-sensitive secondary display, wherein enabling a respective option for a respective display mode of the plurality of display modes causes the respective display mode to be one of the available display modes. This is also described in relation to FIGS. 5A-5D.

In some embodiments, the plurality of available display modes described above are those display modes for which checkboxes have been selected within a management user interface of the computing system, i.e., those display modes that have been added to the list of one or more default display modes.

Providing users with the option to select one or more display modes to add to the available display modes for the touch-sensitive secondary display enhances operability of the device and makes the human-machine interface more efficient (e.g., by allowing the users to add one or more desired display modes to the available display modes without wasting computing resources during the operation of the management user interface, and thereby allow the users to easily customize their use of the management user interface without having to waste time manually searching for desired display modes that may be difficult to locate).

In some embodiments, a selection of an additional application to add to the plurality of applications for which representations are concurrently displayed within the management user interface is received at 754. For example, the selection may include the user selecting an "+" button 756, and, in response, a menu of applications is then displayed to allow the user to choose additional applications to add to the list of one or more applications. In response to receiving the selection, a representation of the additional application with an indication that the additional application is associated with one of the available display modes for the touch-sensitive secondary display is displayed 758 within the management user interface. In some embodiments, the selection causes the additional application to be immediately added to the list of one or more applications and one of the multiple available display modes is by default associated with the additional application. A user is then able to choose a display mode (e.g., M3) of the multiple available display modes to associate with the additional application (e.g., by selecting one of the up or down arrow keys shown in FIG. 7D to scroll through the multiple available display modes). Reference numeral 760 shows the addition of a third application (A3) and third display mode (M3).

In some instances, within the management user interface, users are unable to associate an application with a display mode because the application does not appear within the management user interface. Providing the user with the option to select one or more additional applications to include in the management user interface enhances operability of the device and makes the human-machine interface more efficient (e.g., by allowing the users to add a desired application to the management user interface without wasting computing resources during the operation of the management user interface, and thereby allow the users to easily customize their use of the management user interface without having to waste time manually searching for desired applications that may be difficult to locate).

In some embodiments, the touch-sensitive secondary display has one or more default display modes, and each application of the plurality of applications for which a representation is displayed within the management user interface is associated with a respective user-selected display mode that is distinct from the default display mode(s).

In some embodiments, the one or more default display modes includes an adaptive display mode. In some embodiments, the one or more default display modes are each activated or de-activated (e.g., using a checkbox or radio button) by a user within the management user interface. For example, as shown by reference numerals 750 and 752 in FIG. 7D, a user is able to select any of the checkboxes to activate or de-activate available default display modes for the touch-sensitive secondary display. In some embodiments, at 764 (FIG. 7E), a respective application on the list of one or more applications may be associated with the default display mode for the touch-sensitive secondary display, and the respective application must also be associated with some other display mode (e.g., a user-defined display mode that is specific to the respective application) in order for that respective application to also be displayed in the list of one or more applications in the management user interface). In some embodiments, the default mode includes a plurality of available display modes for the secondary display, while the other display mode is a particular one of the plurality of available display modes that is persistently associated with a particular application until the user changes it or removes the particular application from the list.

In conventional systems, users were unable to associate a first application with a single display mode of a plurality of available display modes instead of being permanently assigned to the one or more default display modes. Providing the user with the option to associate the first application with a particular display mode of the available display modes and not the default display mode(s) enhances operability of the device and makes the human-machine interface more efficient (e.g., by allowing the users to predefine an association between a display mode and an application without wasting computing resources during the operation of the application, and thereby allow the users to easily customize their use of the touch-sensitive secondary display without having to waste time manually searching for desired display mode features that may be difficult to locate).

In some embodiments, displaying the management user interface for the touch-sensitive secondary display comprises displaying 766 each of the concurrently displayed representations for the plurality of applications (e.g., A1, A2, A3) concurrently with displaying information regarding respective user-selected display modes (e.g., M1, M2, M3) for the touch-sensitive secondary display associated with each of the plurality of applications. In some embodiments, each application and its associated display mode is aligned in a row or column.

In conventional systems, the user is unable to view and manipulate the list of one or more applications and their corresponding indications of one or more display modes simultaneously because they are displayed on different screens, at different times, and/or in different locations. Displaying the list of one or more applications concurrently while displaying the corresponding indications of the respective one or more display modes enhances operability of the device and makes the human-machine interface more efficient (e.g., by allowing the users to view and manipulate the one or more applications and their corresponding display modes simultaneously, and thereby allow the users to efficiently navigate within the management user interface without having to waste time manually switching between separate user interfaces).

In some embodiments, at 770 (FIG. 7F), the available display modes include at least one user-defined display mode 772 created by a user of the computing system. The user-defined display mode is a display mode for the secondary display that a user can create or customize. In some embodiments, the user is able to select a button within the management user interface to initiate a process that invokes a process for creating a new touch bar display mode. An example of a user selecting a "create touch bar mode affordance" 534 by moving input 5018 (e.g., represented by an arrow in FIG. 5V) over the affordance and selecting it, is shown in FIG. 5V. FIGS. 5W-5AF show an example of the process for creating a new touch bar display mode.

Returning to FIG. 7F, in some embodiments, the available display modes include 774 at least one system-defined display mode that was not created by a user of the computing system. For example, the system-defined display mode may be a function row 776 having function keys F1, F2, F3, etc.

In some embodiments, disabling 778 a respective option (e.g., by unchecking 780 a check-box) for a respective display mode of the plurality of display modes causes the respective display mode to be removed from the available display modes. For example, removing a display mode from the available display modes prevents the respective mode of operation from being enabled for applications on the device (e.g., applications can no longer be associated with the removed display mode), and also removes the respective mode of operation from any applications for which the respective mode of operation was previously enabled).

Figure 7A:
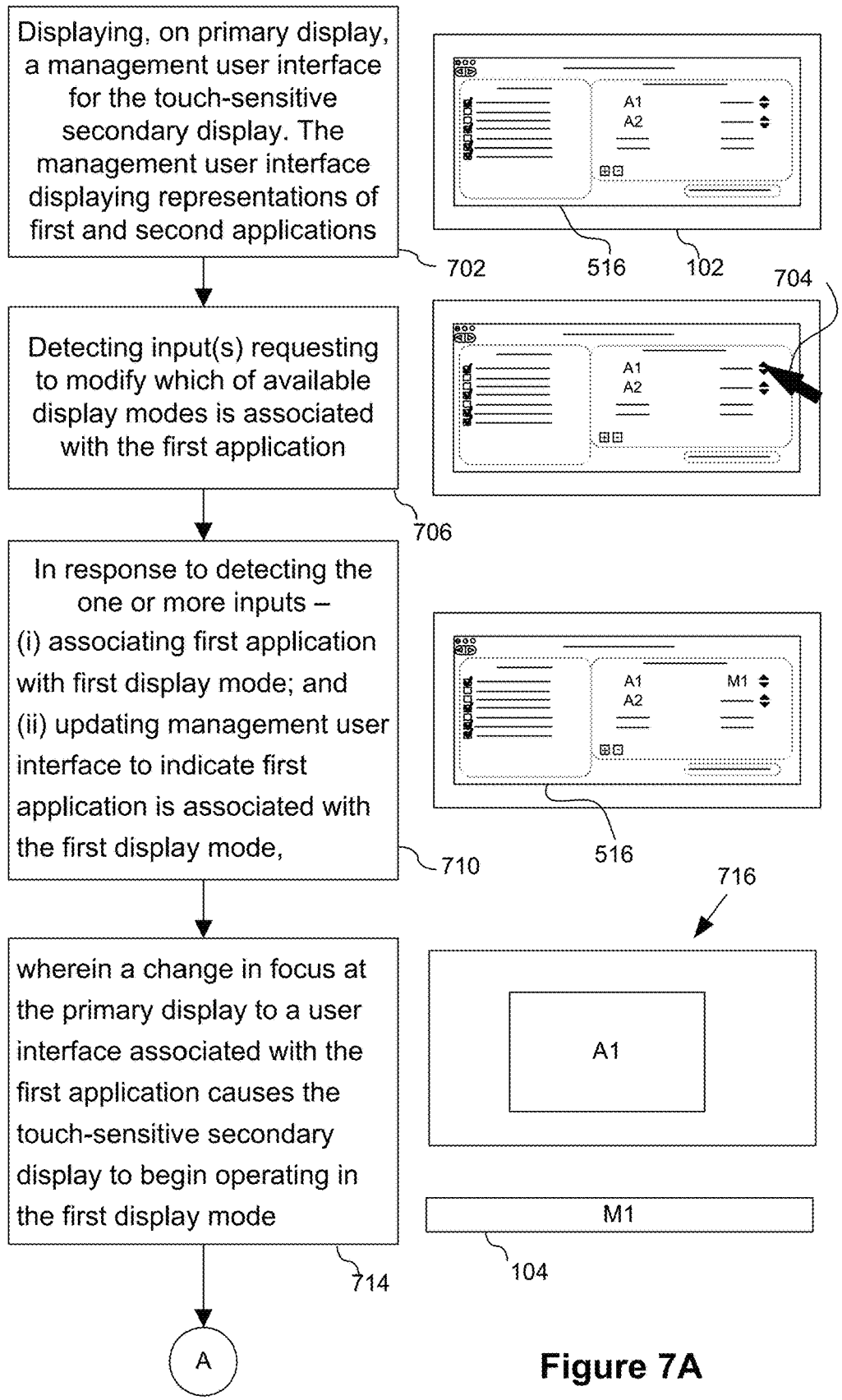
Figure 7B:
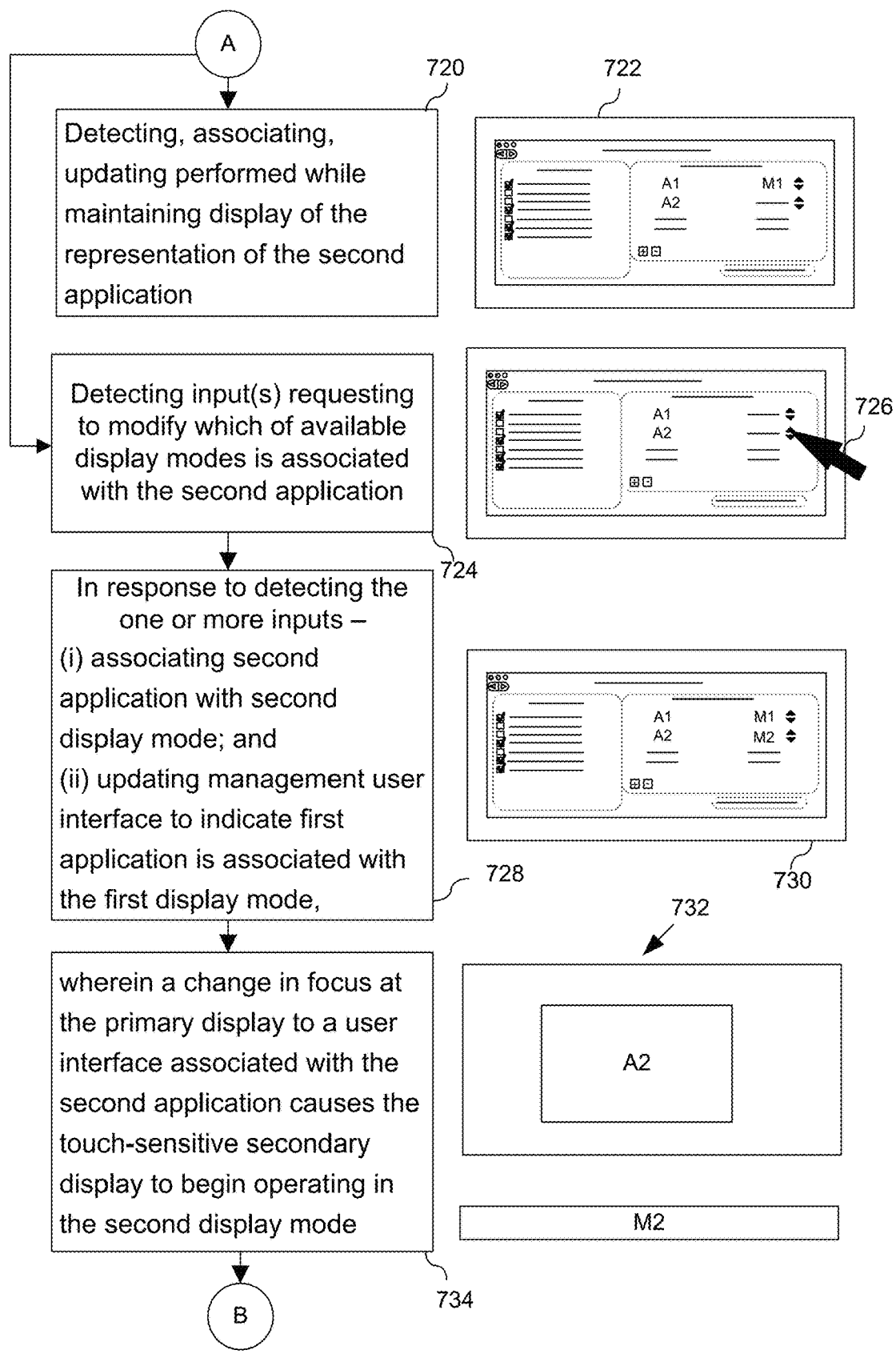
Figure 7C:
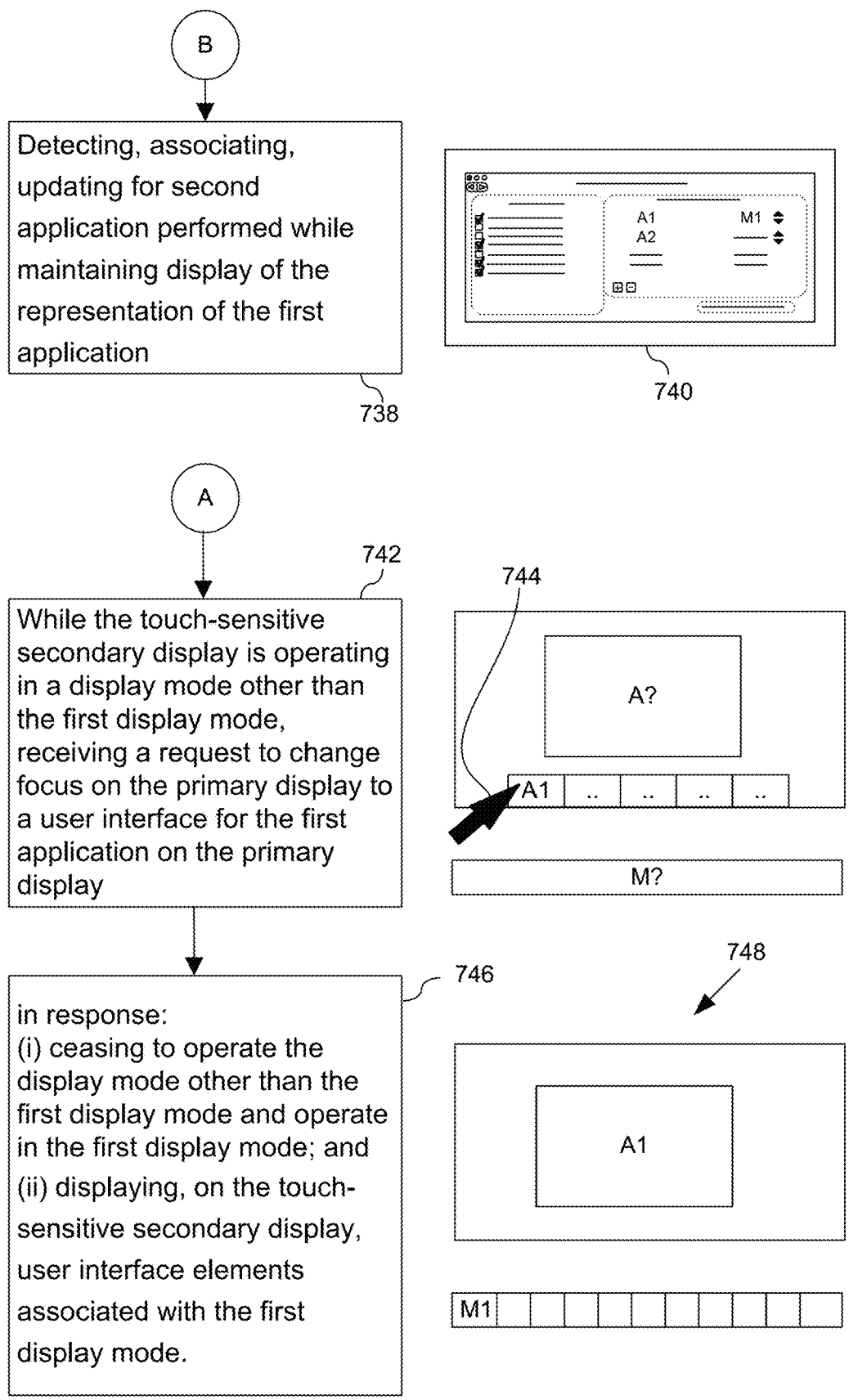
Figure 7D:
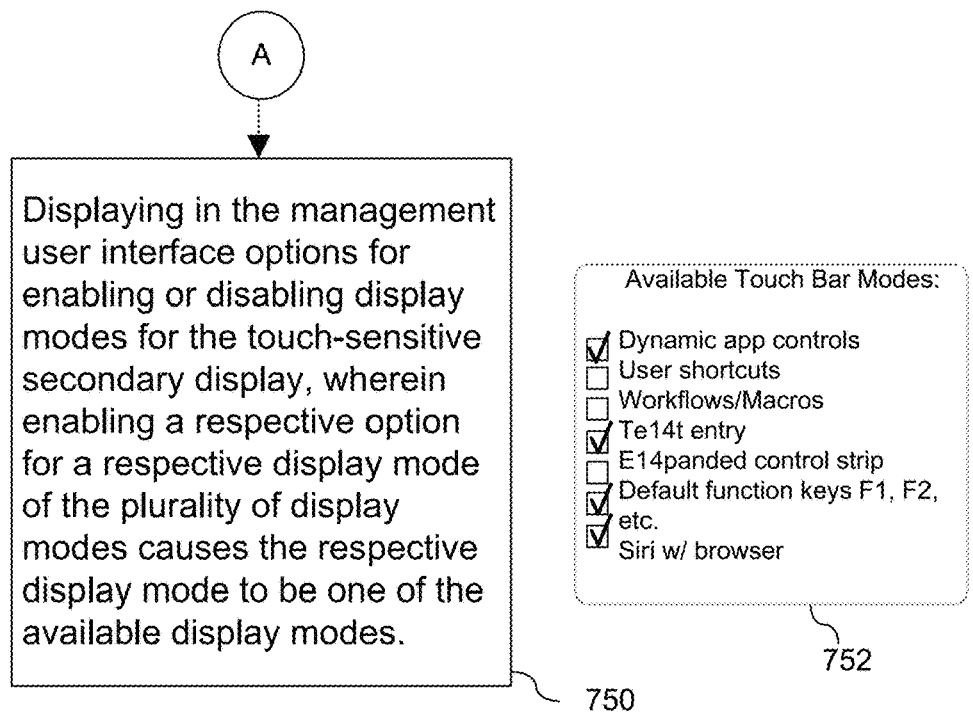
Figure 7D:
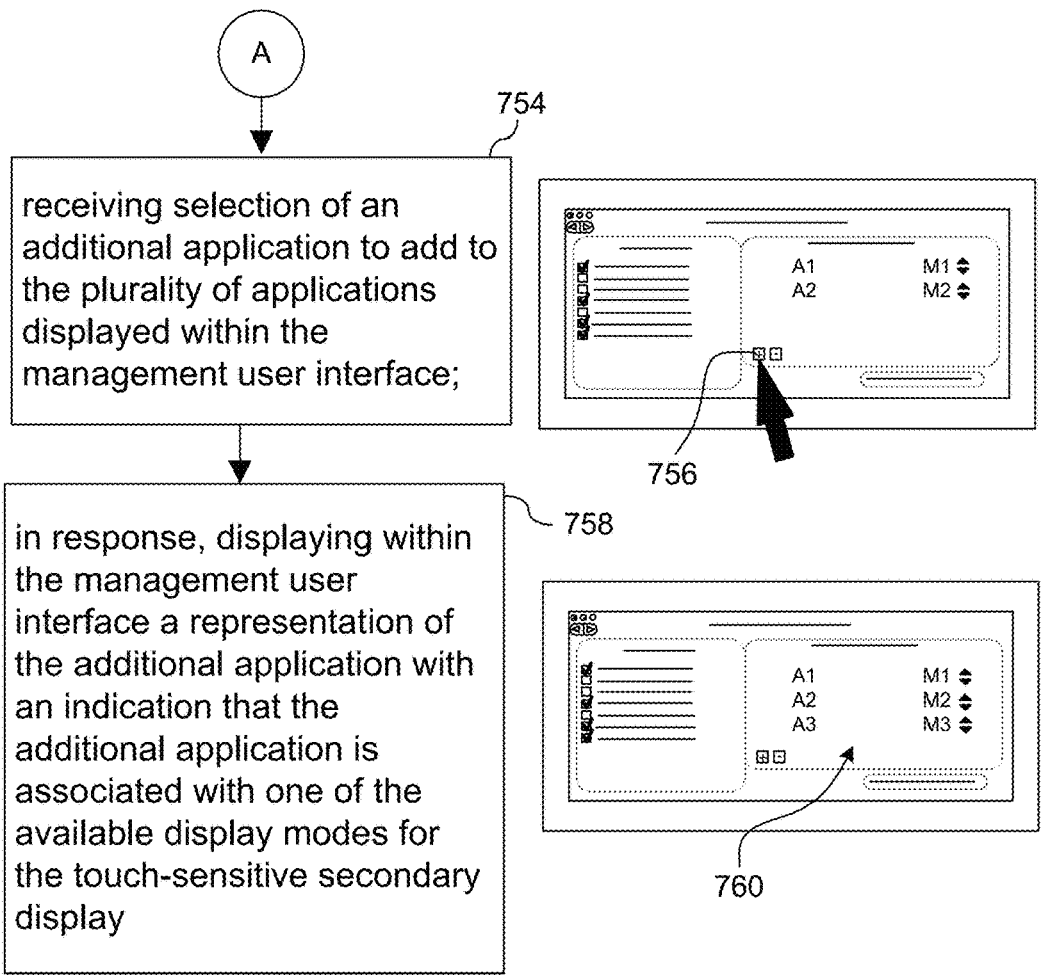
Figure 7F:
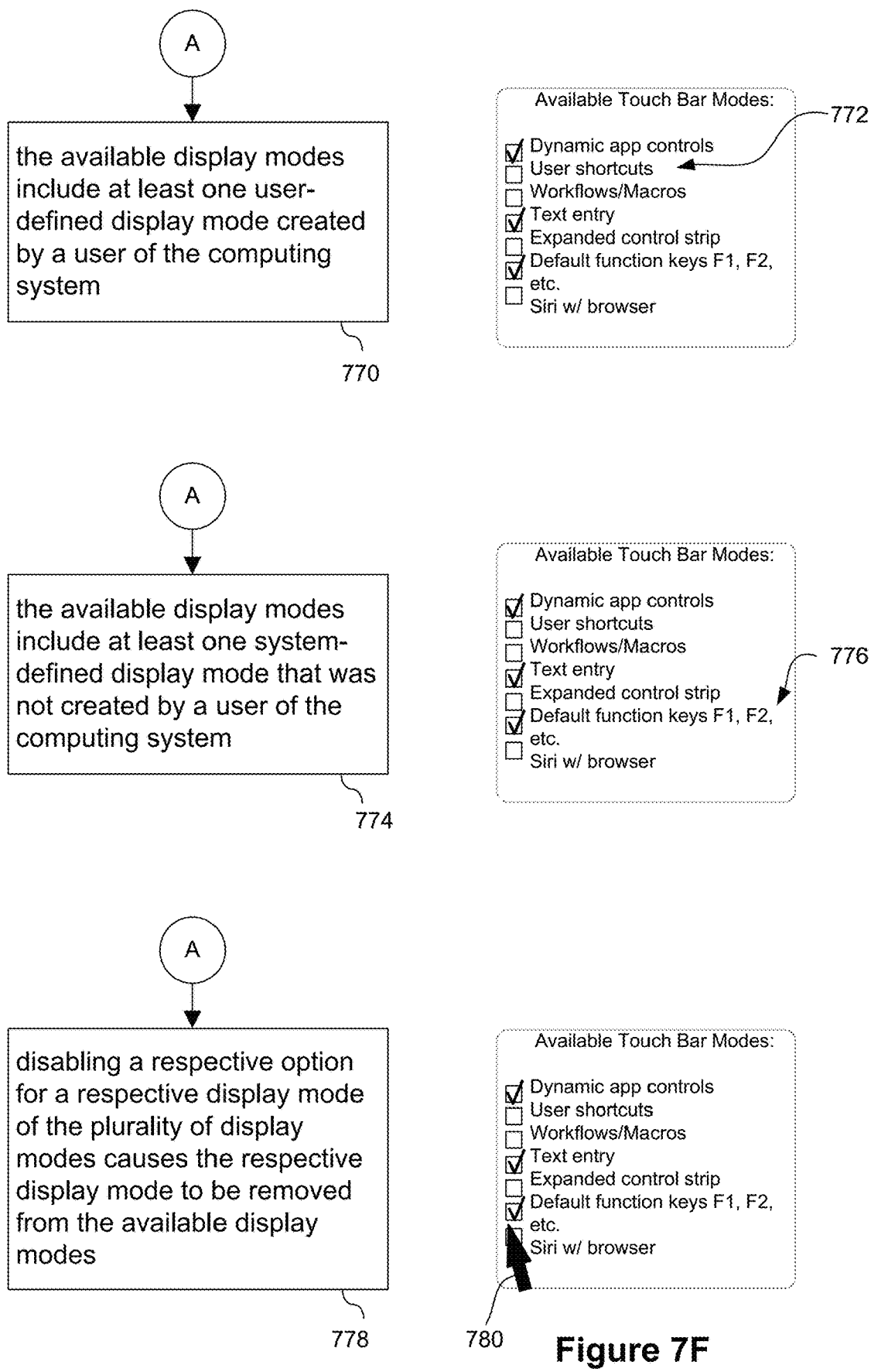

It should be understood that the particular order in which the operations in FIGS. 7A-7C have been described is merely one example and is not intended to indicate that the described order is the only order in which the operations could be performed. One of ordinary skill in the art would recognize various ways to reorder the operations described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at a computing system comprising one or more processors, a first housing that includes a primary display, memory, and a second housing at least partially containing a touch-sensitive secondary display that is distinct from the primary display and one or more input devices:
   displaying, at the touch-sensitive secondary display, at least a system-level affordance for controlling a system-level feature and an affordance for causing display of representations of user-defined workspaces at the touch-sensitive secondary display;
   receiving a first input at the affordance for causing display of the representations the user-defined workspaces;

in response to receiving the first input, displaying, at the touch-sensitive secondary display, a selectable user interface object corresponding to a first window from a first application and a second window from a second application;

receiving a selection, via a second input, corresponding to selection of the selectable user interface object corresponding to the first window from the first application and the second window from the second application;

in response to receiving the second input corresponding to selection of the selectable user interface object corresponding to the first window from the first application and the second window from the second application, displaying the first window from the first application and the second window from the second application.

2. The method of claim 1, including:
in response to receiving the second input corresponding to selection of the selectable user interface object corresponding to the first window from the first application and the second window from the second application, ceasing to display the selectable user interface object.

3. The method of claim 2, including:
in response to receiving the first or second inputs, ceasing to display the system-level affordance.

4. The method of claim 1, wherein the second housing includes a keyboard and a trackpad, wherein the trackpad is distinct and separate from the touch-sensitive secondary display.

5. The method of claim 4, wherein the keyboard and trackpad are located farther away from the primary display than the touch-sensitive secondary display while the computing system is an opened state.

6. The method of claim 1, including:
in response to receiving the first input, displaying, at the touch-sensitive secondary display, another selectable user interface object corresponding to a third window from a third application and a fourth window from a fourth application.

7. The method of claim 1, wherein displaying the first window from the first application comprises displaying the first window on the primary display.

8. The method of claim 1, wherein displaying the first window from the first application comprises displaying the first window on the primary display, and wherein displaying the second window from the second application comprises displaying the second window on the primary display.

9. The method of claim 1, including:
before receiving the first input, displaying, at the primary display, another user interface associated with an application; and
in response to receiving the second input, ceasing to display the user interface associated with the application.

10. The method of claim 1, wherein the selectable user interface object includes a respective thumbnail that previews the first window from the first application and the second window from the second application.

11. The method of claim 1, wherein the primary display is a touch-sensitive display.

12. An electronic device, comprising:
one or more processors;
a first housing that includes a primary display;
a second housing at least partially containing a touch-sensitive secondary display distinct from the primary display; and
memory storing one or more programs that are configured for execution by the one or more processors, the one or more programs including instructions for:
displaying, at the touch-sensitive secondary display, at least a system-level affordance for controlling a system-level feature and an affordance for causing display of representations of user-defined workspaces at the touch-sensitive secondary display;
receiving a first input at the affordance for causing display of the representations the user-defined workspaces;
in response to receiving the first input, displaying, at the touch-sensitive secondary display, a selectable user interface object corresponding to a first window from a first application and a second window from a second application;
receiving a selection, via a second input, corresponding to selection of the selectable user interface object corresponding to the first window from the first application and the second window from the second application;
in response to receiving the second input corresponding to selection of the selectable user interface object corresponding to the first window from the first application and the second window from the second application, displaying the first window from the first application and the second window from the second application.

13. The electronic device of claim 12, wherein the one or more programs include instructions for:
in response to receiving the second input corresponding to selection of the selectable user interface object corresponding to the first window from the first application and the second window from the second application, ceasing to display the selectable user interface object.

14. The electronic device of claim 13, wherein the one or more programs include instructions for:
in response to receiving the first or second inputs, ceasing to display the system-level affordance.

15. The electronic device of claim 12, wherein the second housing includes a keyboard and a trackpad, wherein the trackpad is distinct and separate from the touch-sensitive secondary display.

16. The electronic device of claim 15, wherein the keyboard and trackpad are located farther away from the primary display than the touch-sensitive secondary display while the electronic device is an opened state.

17. The electronic device of claim 12, wherein the one or more programs include instructions for:
in response to receiving the first input, displaying, at the touch-sensitive secondary display, another selectable user interface object corresponding to a third window from a third application and a fourth window from a fourth application.

18. The electronic device of claim 12, wherein displaying the first window from the first application comprises displaying the first window on the primary display.

19. The electronic device of claim 12, wherein displaying the first window from the first application comprises displaying the first window on the primary display, and wherein displaying the second window from the second application comprises displaying the second window on the primary display.

20. The electronic device of claim 12, wherein the one or more programs include instructions for:

before receiving the first input, displaying, at the primary display, another user interface associated with an application; and in response to receiving the second input, ceasing to display the user-interface associated with the application.

21. The electronic device of claim 12, wherein the selectable user interface object includes a respective thumbnail that previews the first window from the first application and the second window from the second application.

22. The electronic device of claim 12, wherein the primary display is a touch-sensitive display.

23. A non-transitory computer-readable storage medium storing executable instructions that, when executed by one or more processors of a computing system with a first housing that includes a primary display and a second housing at least partially containing a touch-sensitive secondary display distinct from the primary display, cause the computing system to:

display, at the touch-sensitive secondary display, at least a system-level affordance for controlling a system-level feature and an affordance for causing display of representations of user-defined workspaces at the touch-sensitive secondary display;

receive a first input at the affordance for causing display of the representations the user-defined workspaces;

in response to receiving the first input, display, at the touch-sensitive secondary display, a selectable user interface object corresponding to a first window from a first application and a second window from a second application;

receive a selection, via a second input, corresponding to selection of the selectable user interface object corresponding to the first window from the first application and the second window from the second application;

in response to receiving the second input corresponding to selection of the selectable user interface object corresponding to the first window from the first application and the second window from the second application, display the first window from the first application and the second window from the second application.

24. The non-transitory computer-readable storage medium of claim 23, wherein the executable instructions, when executed by the one or more processors of the computing system, also cause the computing system to:

in response to receiving the second input corresponding to selection of the selectable user interface object corresponding to the first window from the first application and the second window from the second application, cease to display the selectable user interface object.

25. The non-transitory computer-readable storage medium of claim 24, wherein the executable instructions, when executed by the one or more processors of the computing system, also cause the computing system to:

in response to receiving the first or second inputs, cease to display the system-level affordance.

26. The non-transitory computer-readable storage medium of claim 23, wherein the second housing includes a keyboard and trackpad, wherein the trackpad is distinct and separate from the touch-sensitive secondary display.

27. The non-transitory computer-readable storage medium of claim 26, wherein the keyboard and trackpad are located farther away from the primary display than the touch-sensitive secondary display while the computing system is an opened state.

28. The non-transitory computer-readable storage medium of claim 23, wherein the executable instructions also cause the computing system to:

in response to receiving the first input, display, at the touch-sensitive secondary display, another selectable user interface object corresponding to a third window from a third application and a fourth window from a fourth application.

29. The non-transitory computer-readable storage medium of claim 23, wherein displaying the first window from the first application comprises displaying the first window on the primary display.

30. The non-transitory computer-readable storage medium of claim 23, wherein displaying the first window from the first application comprises displaying the first window on the primary display, and wherein displaying the second window from the second application comprises displaying the second window on the primary display.

31. The non-transitory computer-readable storage medium of claim 23, wherein the executable instructions, when executed by the one or more processors of the computing system, also cause the computing system to:

before receiving the first input, display, at the primary display, another user interface associated with an application; and in response to receiving the second input, cease to display the user interface associated with the application.

32. The non-transitory computer-readable storage medium of claim 23, wherein the selectable user interface object includes a respective thumbnail that previews the first window from the first application and the second window from the second application.

33. The non-transitory computer-readable storage medium of claim 23, wherein the primary display is a touch-sensitive display.

* * * * *

UNITED STATES PATENT AND TRADEMARK OFFICE
CERTIFICATE OF CORRECTION

| | |
|---|---|
| PATENT NO. | : 11,243,570 B2 |
| APPLICATION NO. | : 17/145146 |
| DATED | : February 8, 2022 |
| INVENTOR(S) | : Sepulveda et al. |

It is certified that error appears in the above-identified patent and that said Letters Patent is hereby corrected as shown below:

In the Claims

Claim 1, Column 60, Line 66, delete "of the representations the user-defined" and insert --of the representations of the user-defined--;

Claim 12, Column 62, Line 10, delete "of the representations the user-defined" and insert --of the representations of the user-defined--;

Claim 23, Column 63, Line 26, delete "of the representations the user-defined" and insert --of the representations of the user-defined--.

Signed and Sealed this
Nineteenth Day of April, 2022

Katherine Kelly Vidal
*Director of the United States Patent and Trademark Office*